US012294645B2

(12) United States Patent
Kunz et al.

(10) Patent No.: US 12,294,645 B2
(45) Date of Patent: May 6, 2025

(54) SYSTEMS AND METHODS FOR SECURING A QUANTUM-SAFE DIGITAL NETWORK ENVIRONMENT

(71) Applicant: QDS Holdings Inc., Rapid City, SD (US)

(72) Inventors: Tilo Alexander Kunz, Dollard-des-Ormeaux (CA); Gary Paul Swatton, Phoenix, AZ (US); William Arthur Yakamovich, Fall River (CA)

(73) Assignee: QDS Holdings Inc., Rapid City, SD (US)

( * ) Notice: Subject to any disclaimer, the term of this patent is extended or adjusted under 35 U.S.C. 154(b) by 273 days.

(21) Appl. No.: 17/937,923

(22) Filed: Oct. 4, 2022

(65) Prior Publication Data

US 2024/0073011 A1 Feb. 29, 2024

Related U.S. Application Data

(60) Provisional application No. 63/412,868, filed on Oct. 3, 2022, provisional application No. 63/252,062, filed on Oct. 4, 2021.

(51) Int. Cl.
*H04K 1/00* (2006.01)
*H04L 9/08* (2006.01)
*H04L 9/40* (2022.01)

(52) U.S. Cl.
CPC .......... *H04L 9/0852* (2013.01); *H04L 9/0869* (2013.01); *H04L 63/0236* (2013.01)

(58) Field of Classification Search
CPC .. H04L 9/0852; H04L 9/0869; H04L 63/0236
(Continued)

(56) References Cited

U.S. PATENT DOCUMENTS 5,940,002 A   8/1999   Finn et al.
7,602,919 B2  10/2009  Berzanskis et al.
(Continued)

FOREIGN PATENT DOCUMENTS

EP   2173055 A1   4/2010
EP   2611062 B1   7/2013
(Continued)

OTHER PUBLICATIONS

Magiq Technologies, MagiQ QPN—Ultimate Cryptography Solution for Network Security, Sep. 19, 2018.

*Primary Examiner* — Brandon Hoffman
*Assistant Examiner* — Samuel Ambaye
(74) *Attorney, Agent, or Firm* — C. Tumey Law Group PLLC

(57) ABSTRACT

A secure digital network environment is provided by integrating OTP keys as part of quantum-safe data systems solutions (QPN Solutions), including the use of one-time-pad (OTP) keys to encrypt data, support multi-factor authentication and secure all communications between devices in the secure digital network environment. The OTP keys are "pre-loaded" to endpoint (EP) devices to render them quantum-safe (QS) when connected into the secure digital network environment, or are otherwise provided through removable media to be loaded into user supplied appliances, devices and accessories to render them QS when connected into the secure digital network environment. The application of QPN Solutions refers to the application of QPN enabled technologies to provide a secure digital network environment includes risk assessment and management solutions for establishing and managing cyber security insurable risks and policies.

22 Claims, 42 Drawing Sheets

(58) Field of Classification Search
USPC .......................................................... 380/255
See application file for complete search history.

(56) References Cited

U.S. PATENT DOCUMENTS

| | | | |
|---|---|---|---|
| 7,725,671 | B2 | 5/2010 | Prahlad et al. |
| 8,467,533 | B2 | 6/2013 | Hammersmith |
| 8,635,451 | B2 | 1/2014 | Zsolt |
| 9,450,749 | B2 | 9/2016 | Hammersmith |
| 9,584,313 | B2 | 2/2017 | Thompson |
| 9,602,220 | B2 | 3/2017 | Azuma et al. |
| 10,348,688 | B2 | 7/2019 | Thompson |
| 10,348,704 | B2 | 7/2019 | Figueira |
| 11,082,211 | B2 | 8/2021 | McCarthy et al. |
| 11,153,074 | B1 | 10/2021 | Nikitas et al. |
| 11,177,950 | B2 | 11/2021 | Lo et al. |
| 11,233,628 | B2 | 1/2022 | Figueira |
| 11,271,724 | B2 | 3/2022 | Ragan |
| 11,444,751 | B2 | 9/2022 | Thompson et al. |
| 2003/0026431 | A1 | 2/2003 | Hammersmith |
| 2008/0031456 | A1 | 2/2008 | Harrison et al. |
| 2013/0283034 | A1 | 10/2013 | Marlow |
| 2014/0177826 | A1 | 6/2014 | Zsolt |
| 2014/0369498 | A1 | 12/2014 | Hammersmith |
| 2015/0043730 | A1 | 2/2015 | Thompson |
| 2015/0229621 | A1 | 8/2015 | Kariman et al. |
| 2017/0005992 | A1 | 1/2017 | Zsolt et al. |
| 2018/0026944 | A1* | 1/2018 | Phillips ............... H04L 63/1433 726/4 |
| 2018/0027006 | A1 | 1/2018 | Zimmermann et al. |
| 2020/0137097 | A1 | 4/2020 | Zimmermann et al. |
| 2020/0274697 | A1* | 8/2020 | Ragan .................... H04L 63/06 |
| 2020/0382288 | A1 | 12/2020 | Solomon et al. |
| 2021/0192023 | A1 | 6/2021 | Bryant et al. |
| 2021/0334073 | A1 | 10/2021 | Wang et al. |
| 2022/0012814 | A1 | 1/2022 | Crabtree et al. |
| 2022/0129990 | A1 | 4/2022 | Roudaut |
| 2022/0209938 | A1 | 6/2022 | Ragan et al. |
| 2022/0272082 | A1 | 8/2022 | Gupta et al. |
| 2022/0286289 | A1 | 9/2022 | Pellizzer et al. |
| 2023/0020193 | A1* | 1/2023 | Williams .............. H04L 9/0855 |

FOREIGN PATENT DOCUMENTS

| | | |
|---|---|---|
| EP | 3432509 B1 | 1/2019 |
| EP | 3560140 B1 | 10/2019 |
| KR | 20180136641 | 12/2018 |
| WO | 2004010637 A1 | 1/2004 |
| WO | 2004010638 A1 | 1/2004 |
| WO | 2006012638 A2 | 2/2006 |
| WO | 2007109373 A3 | 11/2007 |
| WO | 2012130575 A1 | 10/2012 |
| WO | 2016145071 A1 | 9/2016 |
| WO | 2020118071 A1 | 6/2020 |
| WO | 2023057652 A1 | 4/2023 |

* cited by examiner

| Feature Categories (bold) and Examples (Italics) ||
|---|---|
| QSOC (Security Operations Centers) <br><br> QSOCs such as those listed below, are deployed within a set of globally distributed data centers and host the core QDS solutions, including management & control, user / system / data security, providing access to different QDS solutions | Q-Devices <br><br> QDS enabled devices using QPad (OTP) technology and may include a variety of user and consumer products (e.g. a nanny cam) that can be generally categorized as one of the following types of devices) |
| *QPad* (includes removable media products) | *Q-Book* |
| *QPad Exchange* <br><br> Alternatively referred to as a QPad Management System, this QDS Solution utilizes one-time-pad (OTP) key material, libraries and related process as part of a QDS Ecosystem | *Q-Phone* |
| *QPad Directory* <br><br> A QDS Solution for Device Management and Control comprising a bundle of QDS management and control libraries and services that support provisioning / revocation, security (user & system), and monitoring of the QDS Ecosystem products and services) | *Q-Tablet* |
| *QPad Distribution System* <br><br> Contemplated future quantum key distribution (QKD) solutions to support distribution of key material used for encrypting data at rest as well as data in flight (i.e. communication transmissions). A QDS Ecosystem is configured to be able to apply "pre-loaded" Q-Pad random key material on end-point (Q-Devices) that will be able to encrypt and decrypt data leveraging proven OTP encryption. methods. | *Q-Embedded Systems* <br><br> QDS solutions that provide the ability to create and manage a variety of different business use cases leveraging QS hardened terminal devices, such as ATMs, POS registers, SWIFT and Bloomberg terminals, etc. |

FIG. 21A

| | |
|---|---|
| *QPad Initialization Station* (for loading Q-Apps with QPads) | Q-SCADA<br><br>A type of embedded system including QDS applications, tools, and devices that provide the ability to manage IoT and SCADA devices and hosted applications for industrial sites and critical infrastructure) |
| *QAuth* (authorization) | *Q-Adapter* (e.g. QPad enabled BITW devices) |
| QPN – (Quantum-safe Private Network)<br><br>A QDS Solution for networking that provides the ability to define and manage multiple QS private networks through the open and insecure Internet. | *Q-Points* (QPad enabled endpoints) |

| Q-Services | Q-Accessories |
|---|---|
| *Q-ComSec*<br><br>QDS Solutions that provide the ability for different devices (phones, tablets, e-books) to securely communicate and collaborate with different applications within the QDS Ecosystem | *QPad 2FA* (wearable devices – ie. Q-Watch) |
| *Q-Blocks*<br><br>QDS Solutions that support blockchain technologies within the QDS Ecosystem to secure infrastructures for leading blockchain multi-layer protocols, exchanges, and applications | *Q-Pods* (secure earpiece) |
| *Q-Drive*<br>Q Drive (QDR) provides ecosystem members secure key storage, encrypted file storage for applications, and synchronized workspaces for shared documents and folders | |
| *Q-Apps*<br><br>Software applications hosted within the QDS Ecosystem and rendered quantum-safe using QDS enabling technology. | Insurance Bundles<br>Warranty to include cyber insurance for Q-Devices and Q-Appliances based on the use of QPad. General cyber insurance will be available for enterprises (organizations) within a perimeter that is comprised of QDS cyber bundled products. |

FIG. 21B

| | |
|---|---|
| Q-Appliances | |
| Q-Firewall (QS network security devices that manage and monitor incoming and outgoing network traffic based on a set of security rules and may include Q-Routers and Q-Stream Cipher) | |
| Q-Router | |
| Q-Stream Cipher | |

FIG. 21C

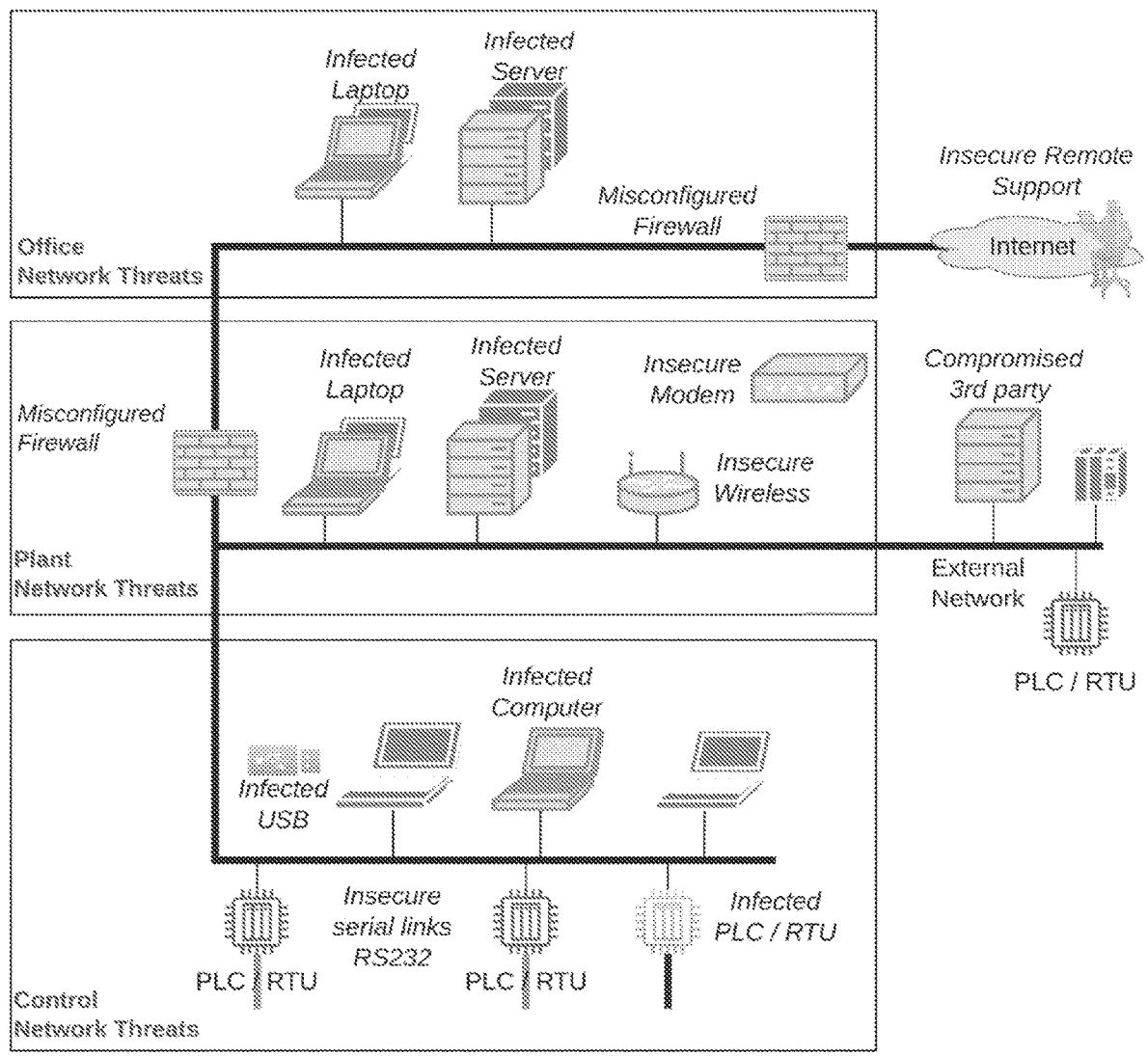
FIG 24 – (Prior Art)

| Attack Vectors | Description |
|---|---|
| Social Engineering | Reliant on the manipulation of people to provide information or break security procedures and gain unauthorized access. |
| Email Compromise | Scenario where a hacker poses as an employee (CEO) to manipulate others to initiate wire transfers or other fraud. Hacker gained access to internal systems and email accounts or has obtained email credentials from other methods. |
| System Error | Error in system configuration leads to an exploit path. Most common misconfiguration error is allowing default usernames/passwords for software / devices and appliances. |
| Accidental data loss / device | Resulting from a lost or stolen device. |
| Malicious Insider | Employees / contractors exposing private information, data exfiltration or providing details on specific vulnerabilities. |
| Physical Security Compromise | Circumventing or disabling of physical security and access controls. CCTV cameras, motion sensors, keycard systems, unattended systems, eavesdropping. |
| Third Party Vulnerability | Exploited vulnerabilities in the digital supply chain or third-party software and services vendors. |
| Cloud Misconfiguration | System configuration errors in applications and services. Default settings and lack of configuration controls. |
| Phishing (& Spear Phishing) | Tactics targeting individuals though email, telephone, text, misrepresentation. This is part of the larger social engineering attack vector. |
| Compromised Credentials | Username password compromise because of any number of attacks. Phishing, social engineering, identity theft, fake websites, default accounts, human error. |

FIG. 25

| Account Takeover | DDoS Attack | Phishing |
|---|---|---|
| Advanced Persistent Threat | Disabling Security Tools | Phishing Payloads |
| Application Access Token | DNS Amplification | Ransomware |
| Bill Fraud | DNS Hijacking | Shadow IT |
| Business Invoice Fraud | DNS Tunneling | SIM jacking |
| Brute Force Attack | Drive-by Download Attack | Social Engineering Attack |
| Compromised Credentials | Host Redirection | SQL Injection |
| Credential Dumping | Insider Threat | Spear Phishing |
| Credential Reuse Attack | IoT Threats | Spyware |
| Credential Stuffing | IoMT Threats | System Misconfiguration |
| Cloud Access Management | Macro Viruses | Typosquatting |
| Cloud Cryptomining | Malicious Powershell | Watering Hole Attack |
| Command and Control | Man-in-the-Middle Attack | Web Session Cookie |
| Cross-Site Scripting | Masquerade Attack | Whale Phishing |
| Cryptojacking Attack | Meltdown and Spectre Attack | Wire Attack |
| Data From Information Repositories | Network Sniffing | Zero Day Exploit |
| DoS Attack | Pass the Hash | |

FIG. 26

| Threat Sources | Type |
|---|---|
| Adversarial | Nation State, Individual (insider), Group, Organization |
| Accidental | User, Privileged Administrator |
| Structural | IT Equipment, Environment Controls, Software |
| Environmental | Natural or man-made disaster, Infrastructure failure |

FIG. 27

| QPN Ecosystem Components ||
|---|---|
| QSOC (Security Operations Centers) | Q-Devices |
| QPad (includes removable media products) | Q-Book |
| QPad Exchange (QPad Management System) | Q-Phone |
| QPad Directory (Device Mgmnt and Control) | Q-Tablet |
| QPad Distribution System | Q-Embedded Systems |
| QPad Initialization Station | Q-SCADA (a type of embedded system) |
| QAuth | Q-Adapter |
| QPN | Q-Points |
| | |
| Q-Services | Q-Accessories |
| Q-ComSec | QPad 2FA (wearable devices – ie. Q-Watch) |
| Q-Blocks (Blockchain Solutions) | Q-Pods (secure earpiece) |
| Q-Drive | |
| Q-Apps | Insurance Bundles (Patentable Insurance Products) |
| | Warranty to include cyber insurance for Q-Devices |
| Q-Appliances | and Q-Appliances based on the use of the QPad. |
| Q-Firewall | General cyber insurance will be available for |
| Q-Router | enterprises within a perimeter that is comprised |
| Q-StreamCipher | of QPN cyber bundled products. |

FIG. 28

SYSTEMS AND METHODS FOR SECURING A QUANTUM-SAFE DIGITAL NETWORK ENVIRONMENT

FIELD OF THE INVENTION

The present invention relates to the field of cybersecurity, for example cybersecurity for communications and data management. More particularly, the present invention can relate to systems and methods for securing a digital network environment, for example against present day security threats and potential future quantum computing derived threats.

BACKGROUND

Global ransomware damages totaled US$325 M in 2015. By 2021 they reached US$20 B, a 60-fold increase. Ten years from now ransomware will cost its victims US$265 B annually (Cybercrime Magazine, Jun. 3, 2021). These statistics represent damages from conventional threats that will unfortunately be dwarfed by the disruption projected from pending quantum threats. Furthermore, since mid-2020 organizations throughout the world have had to adapt to remote working, dramatically increasing the attack vectors available to cybercriminals and rogue nation states. It is self-evident that these risks are rapidly becoming uninsurable.

In addition to persistent cyber threats quantum disruption is at our doorstep. The theoretical is quickly becoming reality with the looming quantum revolution threatening the cryptographic underpinnings of our global digital infrastructure.

Quantum computers are computers that are built using a unique property of quantum mechanics, the superposition principle. Quantum computers use quantum bits, or "qubits," which can exist in a superposition state. In this state qubits have a value of both 0 and 1 simultaneously. (Schrödinger's paradox of a cat in a box). This quantum physics-based behavior potentially allows a quantum computer with sufficient power to exponentially perform certain math-based calculations that no classical computer would ever be able to perform. Conventional thought is that in a number of math-based cryptographic operations (for example, prime factorization), a quantum computer could break Elliptic Curve and RSA encryption algorithms 1000's of times faster than any conventional system. For the RSA encryption algorithm (the mainstay of conventional cryptography), a conventional computer would need about 300 trillion years to crack communications protected with a 2,048-bit digital key, however an adequately powered quantum computer with ~4,100 (Quintessence Labs June 2019 Breaking RSA encryption) qubits would need just 10 seconds.

Many security organizations are working on Post-Quantum-Cryptography (PQC) to counter the quantum threat, but this is only a stop gap measure as none are provably quantum-safe (QS).

Currently (2021) existing public-key (RSA for example) algorithms (asymmetric) could be broken by a suitably powered quantum computer.

"Post quantum cryptography" (PQC) are cryptographic algorithms (typically public-key) that are thought to be resistant to a cryptanalytic attack by a quantum computer. These algorithms have a common trait; namely that they are complex math-based solutions that in some cases have been studied for years assessing their security strength and effectiveness. Yet none of these algorithms are information-theoretically secure (ITS) (e.g. provably unbreakable). Regardless of the success or acceptance of any of these algorithms from a standards perspective, an operational problem is that these algorithms require larger key sizes and greater complexity than commonly used "pre-quantum" public key algorithms such as RSA. The larger key size and more complex algorithms require computationally more power, reduced efficiencies, and larger footprints for ciphertext and signatures. In addition, the carbon footprints required for these PQC solutions are unsustainable In contrast to this, symmetric cryptographic algorithms, such as AES or DES and hash functions are considered relatively secure from attack provided that a sufficiently large key size is used. Cryptographic symmetric-key algorithms are algorithms that use the same cryptographic keys for both the encryption of plaintext and the decryption of ciphertext. Keys may be identical, or there may be simple transformation functions to go between the two keys. To the best of the inventors' knowledge, however, there are no symmetric cryptographic algorithms that are provably quantum-safe (QS).

The current thinking is to make incremental improvements as opposed to an approach that is future proof against further advances. Industry cannot remove and replace infrastructure every time there is an advance in quantum capability or further future technological breakthroughs. Furthermore, current systems are protected with a patchwork of security solutions that continuously require additional patches as new leaks and holes are discovered.

There remains a need for "secure-by-design" solutions that may address current cyber security shortcomings, and that may be provably capable of protecting from new cyber security threats, quantum or otherwise yet to be conceived threats. Such solutions may provide needed assurance that digital systems, privacy, and data may remain QS for both completely centralized or geographically distributed work and operational environments.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods for securing a digital network environment.

In accordance with embodiments of the present disclosure there is provided a system configured to create a quantum-safe ecosystem (QSE). The QSE providing a quantum private network for communication between two or more devices. The system includes a quantum identity and access management service (QIAM) configured to manage user and device identity, access, and authorization services within the QSE. The system further includes a plurality of QPADs configured with a QSE key structure, each of the plurality of QPADs configured to encrypt a communication between the two or more devices, wherein each of the plurality of QPADs is minted and centrally managed by a quantum key management system (QKMS) within the QSE. In addition, the system includes a quantum gateway operatively connected to the QIAM, the quantum gateway configured for access by the two or more devices and to facilitate communication between the two or more devices through the QSE.

In some embodiments, the system further includes a quantum random number generator (QRNG), the QRNG configured to generate quantum-safe random numbers for use in the plurality of QPADs. In some embodiments, each QPAD includes one or more security keys, wherein each security key is a one-time use key.

In some embodiments, the system further includes one or more quantum universal endpoint managers (QUEM), wherein each QUEM is configured to manage devices deployed throughout the QSE.

In some embodiments, the system further includes one or more quantum policy orchestrators (QPO), wherein each QPO is configured to manage and deliver zero trust policy services within the QSE, and wherein each QPO is configured to orchestrate one or more of user, group, device or other policies for providing access and control to the QSE. Throughout the QSE multiple QPO policy engines exist that orchestrate policy access and control to one or more different devices, applications or services.

In some embodiments, the system further includes one or more quantum user and endpoint device authorization (QAuth) services, wherein each QAuth is configured to interface with the QIAM and optionally end-user devices to support multi-factor authentication (MFA) to devices and services within the QSE.

In some embodiments, the system further includes one or more firewalls, wherein each firewall is configured to provide capabilities including one or more zero trust access, ingress and/or egress, and network traffic inspection providing the capabilities between devices, platforms, applications and services within and between different systems outside of the QSE.

In some embodiments, the system further includes one or more endpoint management services (QAgent), wherein the QAgent is installed or operatively connected with a particular device and wherein the QAgent is operative to interact with the system for access of the QSE and QUEM specifically by the particular device.

In some embodiments, the system further includes one or more quantum risk managers (QRM), wherein the QRM is configured to assess and manage risk within the QSE and one or more devices operative within the QSE.

In some embodiments, the system further includes a QRouter deployed at a location remote from the system, wherein the QRouter is configured to secure a remote communication tunnel with the system.

In some embodiments, the system further includes a QAdapter configured to bind with a specific remote device, wherein upon binding of the QAdapter to the specific remote device, the QAdapter communicates with the system for establishing a quantum private network for communication within the QSE by the specific remote device. In some embodiments, the QAdapter is a memory device having software stored thereon and is connectable with the specific remote device by a wired or wireless connection.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

These and other features of the invention will become more apparent in the following detailed description in which reference is made to the appended drawings.

FIG. 21A, 21B, 21C is a table of QSE architecture features, according to embodiments.

FIG. 24 is a schematic representation of exemplary cyber risk sources and factors known in the art and that can be addressed by QPN Solutions.

FIG. 25 is a table listing attack vectors that a QPN Solution leveraging a QSE can be used to counter or mitigate, according to embodiments.

FIG. 26 is a table listing types of active cyber security threats, according to embodiments.

FIG. 27 is a table listing sources of cyber security threats, according to embodiments.

FIG. 28 is a table listing one embodiment of QSE components, according to embodiments.

It will be noted that throughout the appended drawings, like features are identified by like reference numerals.

DETAILED DESCRIPTION

Figure 1:
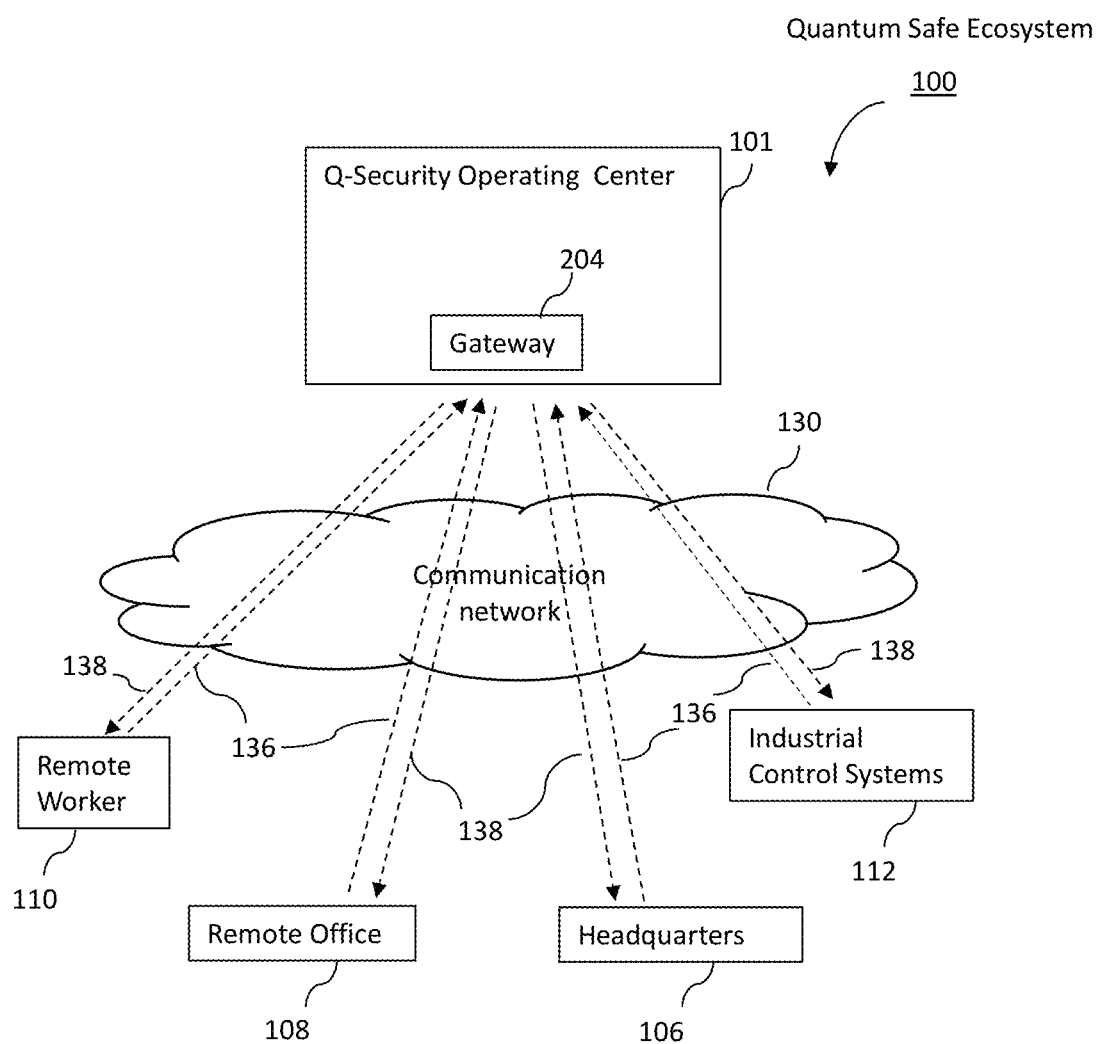
FIG. 1 is a generalized block diagram of a quantum-safe ecosystem (QSE) which is created by a quantum security operations center (QSOC), according to embodiments.

Various features of the invention will become apparent from the following detailed description taken together with the illustrations in the Figures. The design factors, construction and use of the systems and methods disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

With reference to a system or process of the present disclosure, the terms "comprising," "having," "including" and "containing," and grammatical variations thereof, as used herein, are inclusive or open-ended and do not exclude additional, unrecited elements and/or method/process steps. The term "consisting essentially of" or "essentially consisting of" denote that additional elements and/or method/process steps may be present, but that these additions do not materially affect the manner in which the recited elements and/or method/process steps function. The term "consisting of" when used herein in excludes the presence of additional elements and/or method steps. A system or process and any aspect thereof described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

It is contemplated that any embodiment of the systems, components thereof, and methods disclosed herein can be implemented by one skilled in the art, as is, or by making such variations or equivalents without departing from the scope and spirit of the invention.

The present invention relates to the field of cyber security and more particularly to solutions leveraging quantum-safe private network (QPN) enabled components, systems and methods for securing digital network environments to render them with a level of quantum-safe (QS) security against current and future cyber threats which may arise from the advent and more widespread usage of quantum computing technologies.

Secure Network Environments

According to the instant application, there is provided a system that provides and enables the creation of a quantum-safe ecosystem (QSE) where two or more users, for example a remote worker, remote office, operational headquarters, industrial control system, or other user configuration, are able to communicate and transfer information therebetween in a secure manner. The system includes one or more quantum-safe operations centers (QSOC), which are configured to use a multi-tier security mechanism or protocol enabling the creation of a QSE. Initially a secure communication tunnel is created between a first user and second user. The communication tunnel is created by a QSOC upon verification and authorization of the devices being used for communication. Upon creation of this communication tunnel a second identification and authorization step is performed in order to ensure that the specific individuals requesting the creation of a QSE for communication are in fact authorized. In addition, a QSOC provides a one-time pad key structure, herein defined as a QPAD, which can include random entropy data (for example, raw key material) and metadata information that provides information about the QPAD, to be used as a security key by each of the two communicating users. As is evident from the configuration of the QPAD, upon use of a first security key from the QPAD, it becomes obsolete, and a second security key from the QPAD is to be used for a subsequent communication transmission.

According to some embodiments, a quantum-safe operations centers (QSOC) includes an agnostic or conversion layer through which communications with a QSOC is performed. The agnostic layer or transformation layer is configured to transform operational signals associated with a first operating system into operational signals that are compatible with the operational characteristics of a QSOC. In this manner, a QSOC is provided with the ability to create a quantum-safe ecosystem (QSE) for a variety of operating systems associated with user devices. As such, a user having a first device having a first operating system is provided with the means for creation of a QSE with a second device having a second operating system associated therewith, while neither the first operating system nor the second operating system are required to be directly compatible with the operating system associated with a QSOC. According to some embodiments, the agnostic layer can be termed a QS interface (QIPL) which can include one or more quantum-safe interoperability protocol (QIP) modules which together can unify the services within a QSE, independent from their proprietary source.

FIG. 1 illustrates a generalized configuration of a quantum-safe ecosystem (QSE) which is created by a quantum security operations center (QSOC) according to embodiments. A QSE 100 can be created by a QSOC 101 which thereby enables two or more users, for example a remote worker 110, a remote office 108, headquarters 106, industrial control systems 112 or other users to communicate in a quantum-safe manner. For the creation or generation of a QSE 100, the respective user communicates with a QSOC 101 over a communication network 130, for example a public network, a private network, internet or other network configuration which can be wireless, wired or a combination thereof, that enables communication between a QSOC and the respective user. Communication between the user and a QSOC can be provided through a gateway 204 associated with a QSOC, which can enable bi-direction communication 136, 138 therebetween. It should be noted that while the bi-direction communication between the gateway 204 and different users are referenced using the same numbers, this is merely for simplicity of illustration, and as would be readily understood the bi-directional communication of one user will inherently be different from the bi-directional communication of a second user. The gateway 204 can further provide communication with a plurality of users and is not limited to solely the particular users requesting the creation of a first QSE. It should be understood that a particular QSOC can create multiple QSEs simultaneously, and thus is not limited in this manner.

According to embodiments, a QSE (quantum-safe ecosystem) is created by one or more QSOCs (quantum-safe operations centers) that deliver services to the users through their devices and accessories. A QSOC includes a collection of appliances, which can be one or more of hardware, software, firmware components, that serve numerous functions in order to manage the security of users, groups, roles and devices protected within a QSE.

According to embodiments, a QSE is configured to be scalable and provide the ability to interoperate with existing enterprise customers identity access management (IAM)/ directory service solutions leveraging federated identity management, such as authentication and authorization services which may include Microsoft AAD™, OKTA™, PING™, or other access management and identity providers.

According to embodiments, a quantum-safe ecosystem is modular in design, wherein there are multiple configurations of QSOC's which can be used to create and/or manage a QSE. In one embodiment, there is only one central QSOC within a QSE. In one embodiment, there can be separate QSEs, each configured with one or more QSOCs, such that each QSE is its own individual quantum-safe and quantum-resistant ecosystem. In one embodiment, there can be separate QSEs, in which one QSE can initiate a quantum-safe communication channel with another QSE. For example, if one government's QSE would like to communicate with another government's QSE, or if one multinational organization would like to communicate with another multinational organization on a restricted basis. In one embodiment, the organization of multiple QSOCs within a QSE can be configured in a hierarchical manner such that one QSOC is central or the master (primary) QSOC and the other QSOCs are subordinate or worker QSOCs, wherein the central (master) QSOC plays an interconnect role between the subordinate (worker) QSOCs.

In one embodiment, subordinate-QSOCs (sub-QSOCs) use the same appliances as QSOCs but are operated by third parties, and can connect through the central (master) QSOC to securely communicate with other subordinate (worker) QSOCs, and allow their users to communicate throughout this QSE. In one embodiment, a QSE with a hierarchy of QSOCs with a central (master) QSOC, the central QSOC will be the only QSOC that can mint and distribute QPADS, in order to maintain control over the security of the QSE.

In some embodiments, a QSE enables the quantum-safe, quantum-resistant delivery of third-party services which may be included within a Q-Apps category.

In some embodiments, the configuration of a QSE is agnostic to the interoperability of third-party services. For example, in contrast to a Microsoft™ or an Apple™ ecosystem, which primarily exclusively supports their own services, a QSE and in particular a QSOC can include an interoperability layer or transformation layer that renders the QSE to be agnostic to third-party providers such that the QSE can readily include or provide features or applications that may be applicable to Microsoft,™ Apple,™ and or other such third-party service provider in a manner that these features or applications can interact with one another application or feature that is distinct therefrom, while being compatible with other user interfaces through the QSE. In some embodiments, the QSE through a QSOC provides a quantum-safe interface (for example a quantum-safe interoperability protocol layer (QIPL) comprising one or more quantum-safe interoperability protocols (QIP)) that can unify service within a QSE, regardless of their proprietary source. For example, in addition to the common security layer, namely the communication between users having a desired level of security, one user who may use Facetime™ to communicate with another user who is using Zoom™ in order to conduct their videoconference in a manner that is quantum-safe or resistant.

According to embodiments, in order to generate a quantum-safe virtual private network, two or more identification and authorization steps are used. A first identification and authorization step is to authenticate a particular device and subsequently authorize the specific person using that particular device. Upon authentication of the particular device a secure communication tunnel can be created. Upon authorization (which may be a multifactor authorization) of the specific person using the particular device can result in the particular user being permitted to use the secure communication tunnel which results in the enablement of a communication pathway that can be envisioned as a virtual private network. For the setup of the secure communication tunnel, the device authentication, which may include the use of a device fingerprint can be used for this authorization process.

According to embodiments, there is provided a quantum identity and access management (QIAM) module or component associated with the QSE. The QIAM module can aid with reducing the attack surface associated with the communication link (since upon authorization the communication link is configured as a secure communication tunnel) and can be used to protect users, devices, data and the use of applications as enforced by managed security policies, which is further described below in associated with these particular contexts.

According to embodiments, for devices, each user device and network appliance is uniquely identified by QSE and is granted or refused access based on its privileges and state. For users, each user, including internal QSE personnel, is uniquely identified by QSE and is granted or refused access based on privileges and status. For data, users, including organizations, classify data and determine through selected security policies how this data is to be stored, shared and under what conditions this data can or must be retained or deleted. For applications, whether an application is implemented as self-hosted or software-as-a-service (SaaS), applications are used to create and manage data and represent the most exposed and exploited components of the attack surface.

According to embodiments, a QSE can provide tools necessary for software developers to tightly integrate their applications into QSE, and when in compliance with QSE standards these applications can be classified as Q-Apps, which can be envisioned as an application that has a specific level of security associated therewith. Further discussions relating to this feature is provided elsewhere herein.

Quantum Security Operations Center and Quantum-Safe Ecosystem

According to embodiments, the system includes one or more quantum-safe operations centers (QSOC), which are configured to use a multi-tier security mechanism or protocol enabling the creation of a QSE. Initially a secure communication tunnel is created between a first user and second user. The communication tunnel is created by a QSOC upon verification and authorization of the devices being used for communication. Upon creation of this communication tunnel a second identification and authorization step is performed in order to ensure that the specific individuals requesting the creation of a QSE for communication are in fact authorized. In addition, a QSOC provides a one-time pad key structure, herein defined as a QPAD, which can include random entropy data (for example, raw key material) and metadata information that provides information about the QPAD, to be used as a security key by each of the two communicating users.

A QPAD is a symmetric key structure within the QSE, comprised of multiple sets of true random number generator (TRNG) bytes (eg. entropy key data, cesium decay data, etc) of key data sequenced in a sequentially ordered fashion. As an example, a QPAD could be generated as 10 sets of 10 MB TRNG bytes of key data sequenced in a sequentially ordered fashion to compose a 100 MB QPAD. The raw key data is generated utilizing one or more well-known techniques available to generate TRNG, including hardware random number generators (HRNG) or other methods. Within the QSE, multiple HRNG systems called Quantum-safe Random Number Generator (QRNG) appliances are utilized to generate sets of random key data that will be used to compose a new QPAD.

Each QPAD is given a unique identifier, associated with metadata to describe the size, physical storage location, attributes, and usage properties of the key data, and shared between exactly two peer systems such as Q-Devices, Q-Appliances, Q-Accessories, applications, or services within the QSE.

The Q-KMS system is responsible for composing (minting) QPAD's from the generated key data into a single QPAD and protecting the QPAD within a hardware security module (HSM) subsystem within the Q-KMS. QPAD's are then securely distributed between different systems such as Q-Devices, QAppliances, applications, or services and used within different parts of the QSE. There are several principle properties of a QPAD that are important within the solution:
1. The key data is truly random.
2. Data encrypted (ciphertext) generated with the key data is at least as long as the plain text.
3. The key data is never reused.
4. The key is kept completely secret and physically securely stored on devices utilizing it.

Additionally, within this solution, QPAD's provide additional attributes that are leveraged in constructing the QSE services and solution, including:
1. QPAD's are consumable data objects such that as the random key data is utilized, it is physically destroyed from disk and/or overwritten and destroyed in memory of subsystems utilizing the QPAD key material.
2. QPAD's are bound to physical devices and all subsystems utilizing the QPAD key material are responsible for validating that the device is authorized to utilize the QPAD. When Q-Devices are initially provisioned, QPAD's will be physically deployed onto the Q-Devices. Once a Q-Device has been deployed into the field, QPAD's can be exported to QPAD export packages and physically shipped to the location where the Q-Device exists. The QPAD export package can be imported onto the Q-Device by an administrative user of the Q-Device. Refer to section below for additional information on QPAD expansion.
3. When QPAD's are distributed, the raw key material is encrypted utilizing envelope encryption (eg. data encryption key/key encryption key (DEK/KEK) strategy). i.e. When utilizing a QPAD, the subsystem using the QPAD is required to use the associated data encryption key to decrypt the raw key data prior to utilizing the QPAD key data for encrypting/decrypting data. (In other words, the QPAD key material is encrypted itself and must be decrypted prior to utilizing for encrypting/decrypting other data or messages). Note that only authorized devices will be granted access to the encryption key for the specified QPAD.

5. QPAD's are extensible and support the ability to add additional key data to an existing QPAD within the Q-KMS system. The updated QPAD containing the additional key data will be stored within the Q-KMS and is exportable to a QPAD export package, that provides the ability for it to be physically copied to an external media device such as external disk, tape, USB attached device, etc. The external media device can be attached to a Q-Device subsystem and imported onto the device; effectively extending the size of the QPAD on the device.

An embodiment of a method for using a QPAD is used within the QSE for communication within the QPN subsystem. A QPAD is securely shared between two peers and securely stored upon each peer, such as a Q-Book and a Q-Router. The QPN subsystem is configured to utilize the QPAD to set up a one-time pad (OTP) stream cipher to construct a secure QPN tunnel. Note that the raw QPAD key material must first be decrypted using the DEK prior to XOR'ing the data. Outbound communication messages from the Q-Book to the Q-Router are constructed which specify the QPAD identifier, QPAD key data index offset, and ciphertext generated using a simple XOR cipher of the QPAD key data and plaintext, and sent to the Q-Router. The Q-Router utilizes the QPAD identifier, QPAD key index offset, and generates the plaintext from the specified message by XOR'ing the ciphertext message with the DEK decrypted QPAD key data physically residing on the Q-Router.

An embodiment of a method for using QPADs within the QSE is in support of the Q-Auth multi-factor authentication (MFA) solution. In this embodiment, a specific QPAD is distributed to both a Q-Device such as a Q-Book and also to a Q-Wearable accessory. During the user authentication process, the Q-Book will create a QPN (OTP) encrypted tunnel between the Q-Book and the Q-Wearable over bluetooth (BLE), near field communication (NFC), or other communication channels. The user will only succeed in authenticating to the Q-Book if they physically have a Q-Wearable device within communication range that contains the necessary QPAD for Q-Auth MFA authentication.

Figure 2:
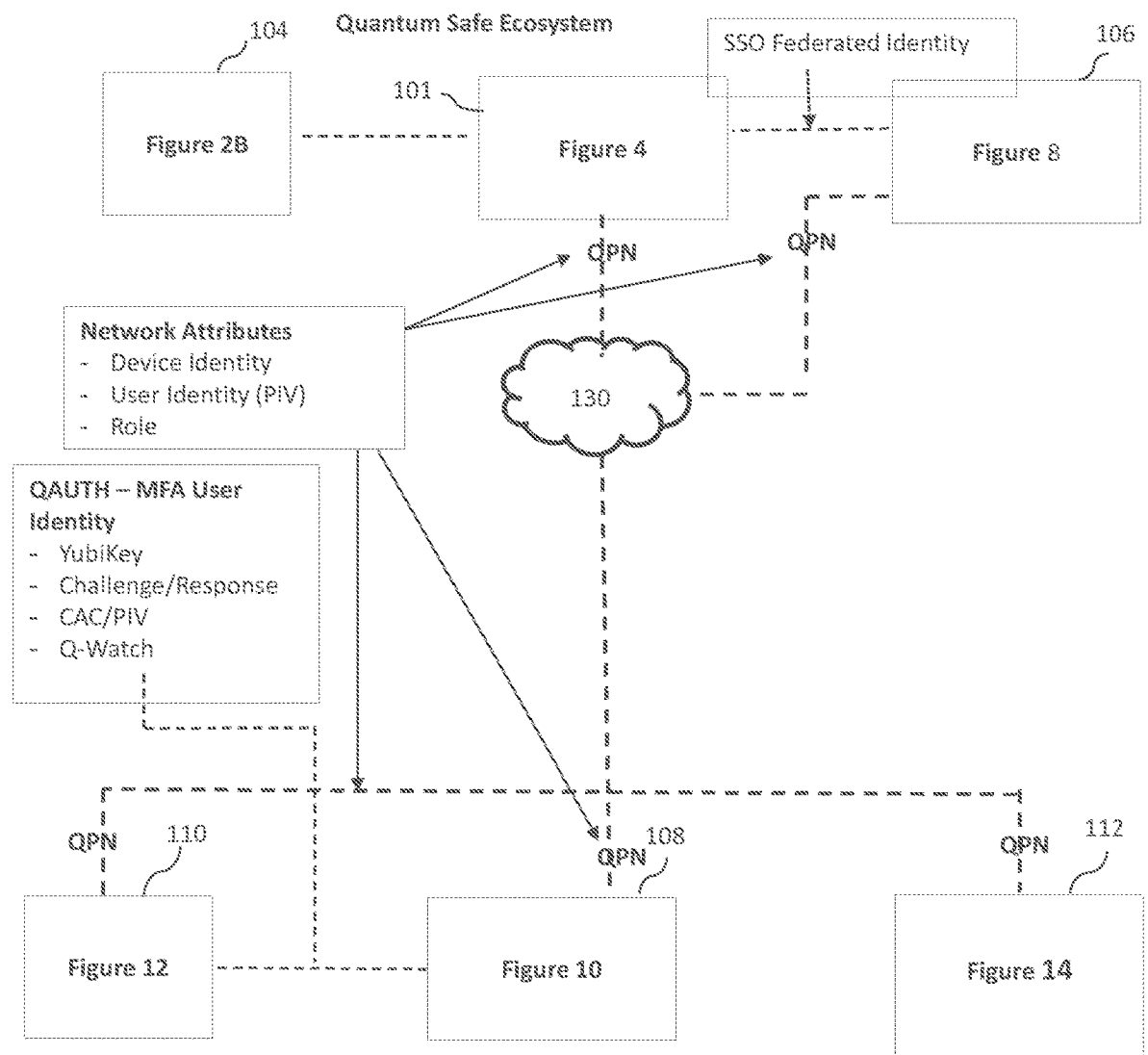
FIG. 2 is a block diagram of a quantum-safe ecosystem (QSE) which is created by a quantum security operations center (QSOC), according to embodiments.
Figure 2A:
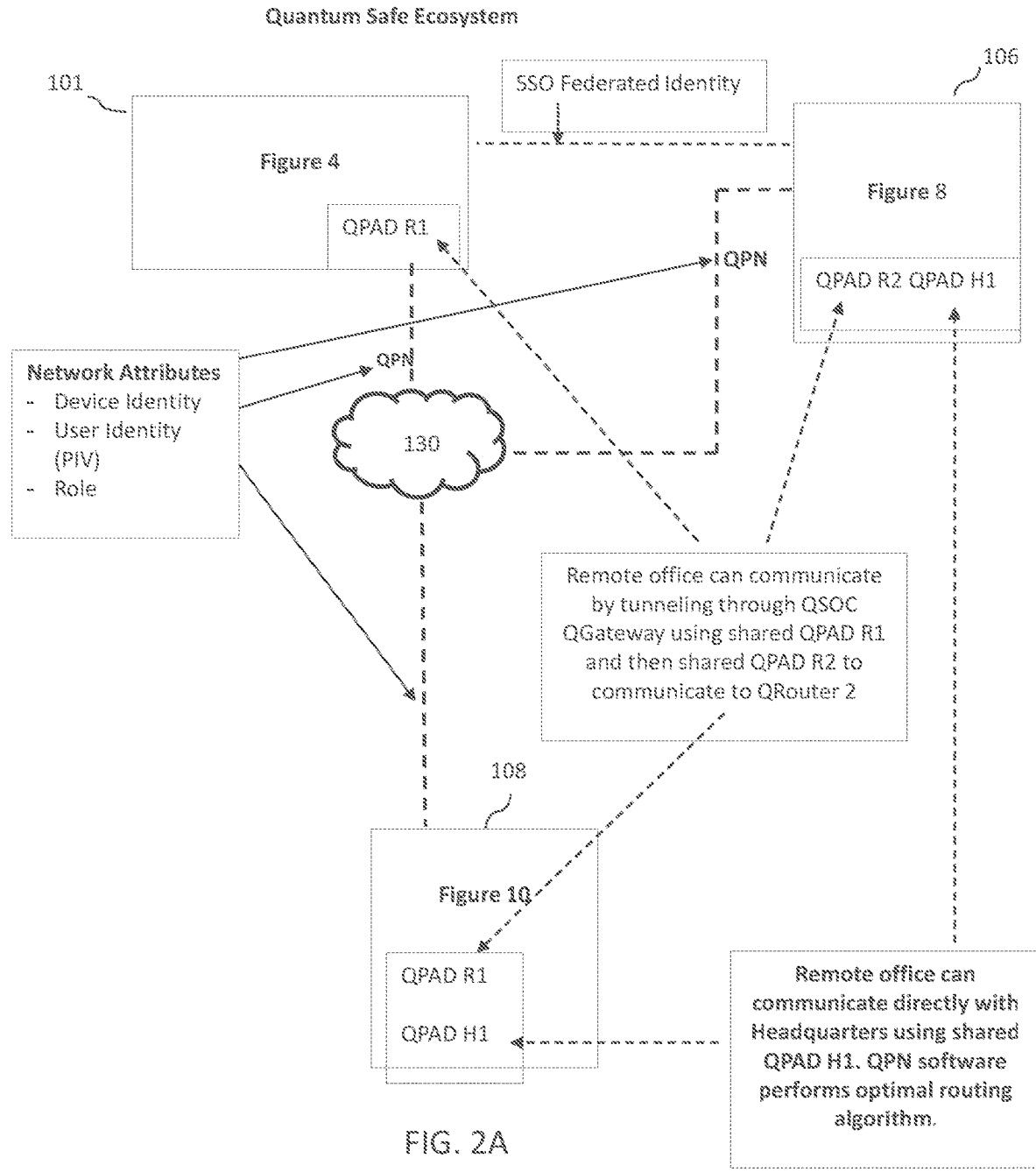
FIG. 2A is a block diagram of a quantum-safe ecosystem (QSE) which is created by a quantum security operations center (QSOC), according to embodiments, wherein the system includes the ability for the QPN to establish a direct secure communication between a Remote Office worker and the Headquarters of the enterprise.
Figure 2B:
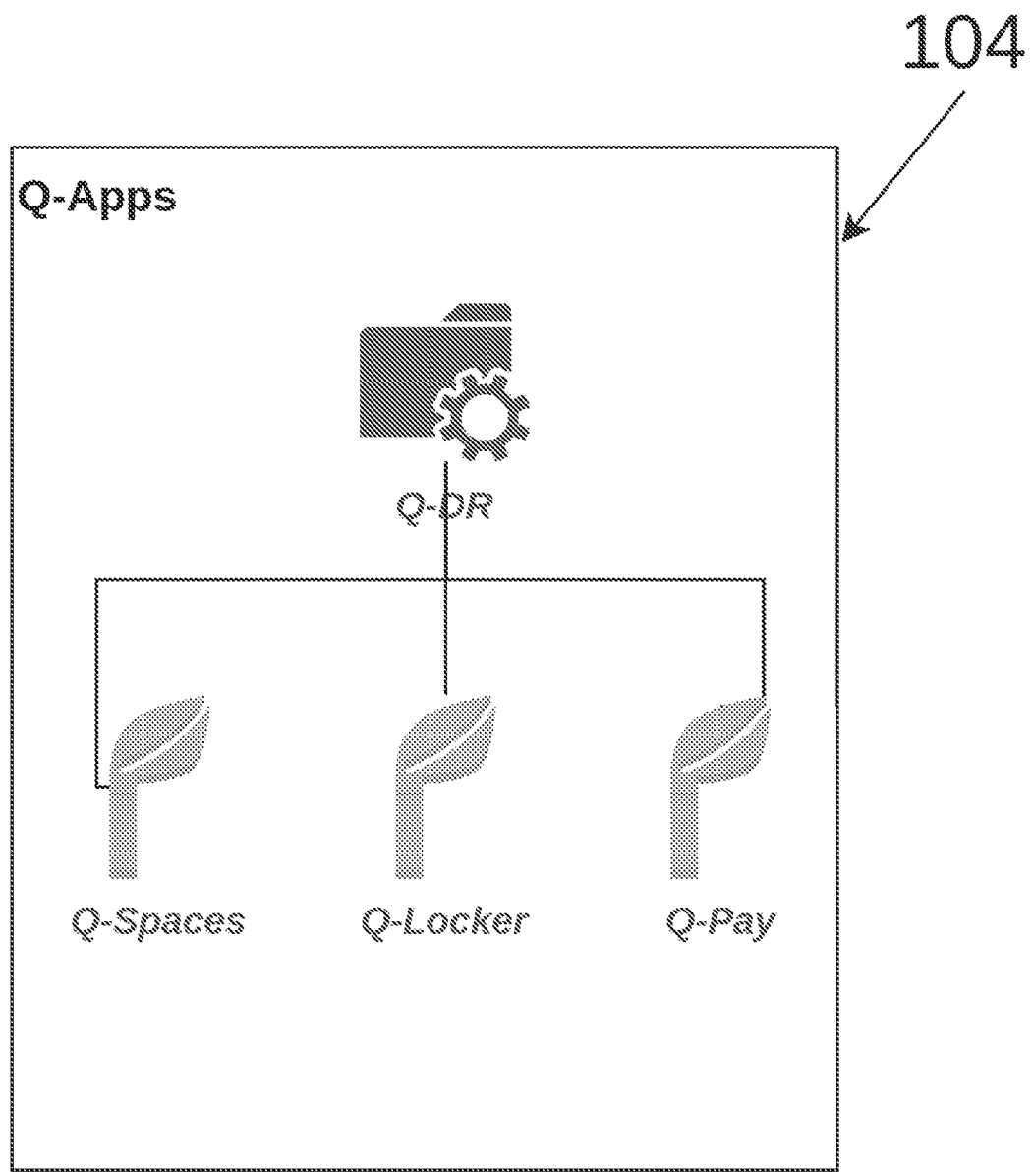
FIG. 2B is a block diagram of QApps, according to embodiments.

FIG. 2 is a configuration of a quantum-safe ecosystem (QSE) which is created by a quantum security operations center (QSOC), according to embodiments. With reference to FIG. 2, a QSE 100 includes a QSOC 101 and Q-Apps 104 which can provide applications in order to provide functionality to particular tasks within QSE 100. As illustrated, a variety of users for example a remote worker 110, a remote office 108, a headquarters 106 and a industrial control system 112 can be interconnected within the QSE 100 through a collection of quantum private networks QPNs. These QPNs are created by interaction of each of the remote worker 110, a remote office 108 a headquarters 106 and a industrial control system 112 with a QSOC 101 via a communication network. The QPNs are resultant of a two or more-step authorization and identification process which enables the creation of the QPN by for example the creation of a secure communication tunnel. Each of these components will be discussed in further detail elsewhere herein.

According to some embodiments, a QSE includes one or more QSOCs and one or more quantum-safe and quantum-resistant routers (QRouter), which is configured to provide policy-based network access to the QSE for QSE provisioned and managed devices in a multiplicity of security tiers. The QSE further includes one or more Quantum-safe user and endpoint devices. Each of these quantum-safe user endpoint devices as well as a QSOC have associated therewith a plurality of QPads which are configured with a QSE key structure. The QPads are minted and managed by a quantum key management system (QKMS) within the QSE.

In some embodiments, the QSE further includes one or more quantum-safe interoperability protocol (QIP) modules which are configured to provide an quantum-safe interoperability protocol layer (QIPL) on top of a QSE platform to enable the functional connectivity of one or more of third-party software and third-party services with the QSE.

Quantum Security Operations Center

According to embodiments, a quantum-safe operations centers (QSOC) is configured to use a multi-tier security mechanism or protocol enabling the creation of a QSE.

According to embodiments, a QSOC includes one or more quantum identity and access management services (QIAM) which is configured to manage user and device identity, access, and authorization services, which can include the authorization of a computing device for subsequent creation of a secure communication tunnel and identity confirmation of a particular user of the device. A QSOC further includes a plurality of QPADs which are configured with a QSE key structure, wherein the QPADs are minted and centrally managed by a quantum key management system (QKMS) within the QSE. A QSOC further includes a quantum gateway which is configured to provide connectivity to a QSOC, thereby enabling devices to interact with a QSOC for creation of a QSE as a quantum private network.

According to embodiments, a QSOC further includes a quantum random number generator (QRNG) which is configured to generate quantum-safe random numbers for use within the QPADs. The operation and configuration of the QRNG is under the control of the QKMS.

In some embodiments, a QSOC further includes one or more quantum universal endpoint managers (QUEM). A QUEM is configured to manage systems deployed throughout QSE, including for example appliances, user devices and accessories and the like.

In some embodiments, a QSOC further includes one or more quantum policy orchestrators (QPO). A QPO can be configured to manage and deliver zero trust policy services within QSE. A QPO can further be configured to orchestrate one or more of user, group, device, or other policies for providing access and control between systems, devices, services and applications.

In some embodiments, a QSOC further includes one or more quantum user and endpoint device authorization (QAuth) services. A QAuth can be configured to interface with the QIAM and optionally end-user devices to support multi-factor authentication (MFA) to devices, platforms, appliances, applications, and services within the QSE.

In some embodiments, a QSOC further includes one or more firewalls. A firewall can be configured to provide zero trust access, ingress/egress, and network traffic inspection capabilities between system devices, platforms, applications and services within and between different QSOCs.

According to embodiments, a QSOC further includes one or more endpoint management services (QAgent) which may be installed or operatively connected with devices and platforms. The devices having an associated QAgent can be configured to interface and be managed by a QUEM.

According to embodiments, a QSOC further includes one or more quantum risk managers (QRM). A QRM can be configured to assess and manage risk within the QSE and the associated devices and appliances connected thereto. In some embodiments, a QRM can include one or more automated information gathering engines that aggregate system and device risk data and store this data within a centralized risk data repository. In some embodiments, a QRM further includes one or more automated risk analysis modules that process system and device risk data to determine cyber and security risk ratings. In some embodiments, a QRM further includes an application programming interface (API) configured to provide remote system access to a central risk data repository from 3rd party risk assessment providers. As an example a central risk data repository may be associated with an insurance company. In some embodiments, a QRM further includes a web portal user interface configured to enable 3rd party risk assessment providers, for example insurance companies, the ability to retrieve risk data information necessary to perform risk assessment calculations.

According to embodiments, a QSOC further includes a quantum platform (QPlatform), which includes one or more appliances that are configured to host or support the functionality of one or more QSOC components, which can be configured as one or more of software components, hardware components and firmware components associated with a QSOC. In some embodiments, a QSOC component is configured as one or more QSOC software packages. The QPlatform can support one or more of a QSOC components which can include QKMS, QUEM, QIAM, QPO and QRM.

Figure 3:
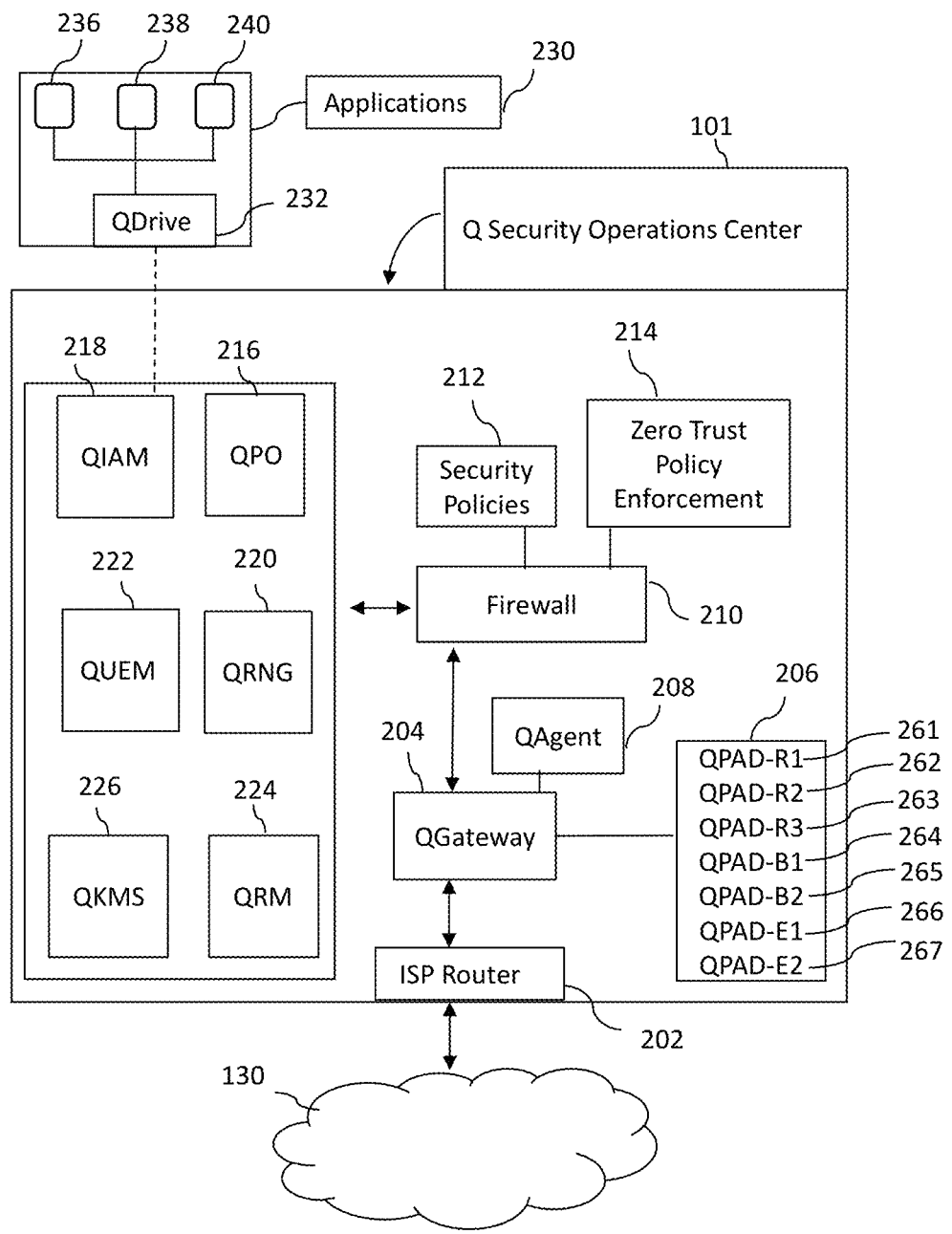
FIG. 3 is a block diagram of a QSOC, according to embodiments.

FIG. 3 is a block diagram of a QSOC 101, according to embodiments. A QSOC includes quantum key management systems (QKMS) 226 which are configured to mint and manage the plurality of QPADS 206. Also within a QSOC 101 are one or more quantum random number generators (QRNG) 220 that are configured for generating quantum-safe random numbers, configured to operate under the control of QKMS 226. A QSOC 101 includes a plurality of QPADS 206, configured with a proprietary QSE key structure 261-267 and are minted and managed by the QKMS 226. Additionally within a QSOC 101 is a quantum universal endpoint manager (QUEM) 222 that is configured to manage systems deployed throughout the QSE, including appliances, user devices and accessories. In addition, a quantum identity and access management services (QIAM) 218 is configured to interface with a QKMS 226 and a QUEM 222 in order to provide authorization of a device and identity confirmation of a user prior to creation of a quantum private network. A QSOC 101 further includes one or more quantum policy orchestrators (QPO) 216 that are configured to manage and deliver zero trust policy services within a QSE and orchestrates user, group, and other security policies. Within a QSOC 101 there is a firewall 210 that has direct access to a store of security policies 212 and a store of zero-trust policy enforcement information 214. In addition, a QSOC includes a QGateway 204, with a QAgent 208 and a plurality of QPADs 206. The QPADs 206 associated with the QGateway 204 can be paired with the QPADs 206 associated with other QAppliances and user devices, which have the necessary credentials, that may request the creation of a QSE or a QPN between a first device and a second device. Furthermore, a quantum risk manager (QRM) 224 is provided within a QSOC 101. The QRM 224 is an application hosted within a QSOC that is responsible for assessing and managing risk within the QSE. A QSOC 101 further includes a router, for example an ISP Router 202, which provides connectivity between the QGateway 204 and the communication network 130.

In some embodiments, a QRouter which is a Q-Appliance can be deployed within a remote environment that acts similar as an ISP router, except that it performs the function of securing the network communication channel (e.g. secure communication tunnel) via QPADs that have been provisioned upon the device to perform QPAD stream cipher encrypted communications with the QGateway 204 deployed within the corresponding QSOC.

According to embodiments, associated with the QSE and a QSOC is a quantum user and endpoint device authorization (QAuth) service which is configured to interface with a QIAM 218 and to remotely manage the operational characteristics of devices, users and the like. According to embodiments, the QAuth service is a library running on QDevices through which both the QDevice and users are authenticated and authorized to access the QSE leveraging several types of MFA (multi-factor authentication) capabilities.

Figure 4:
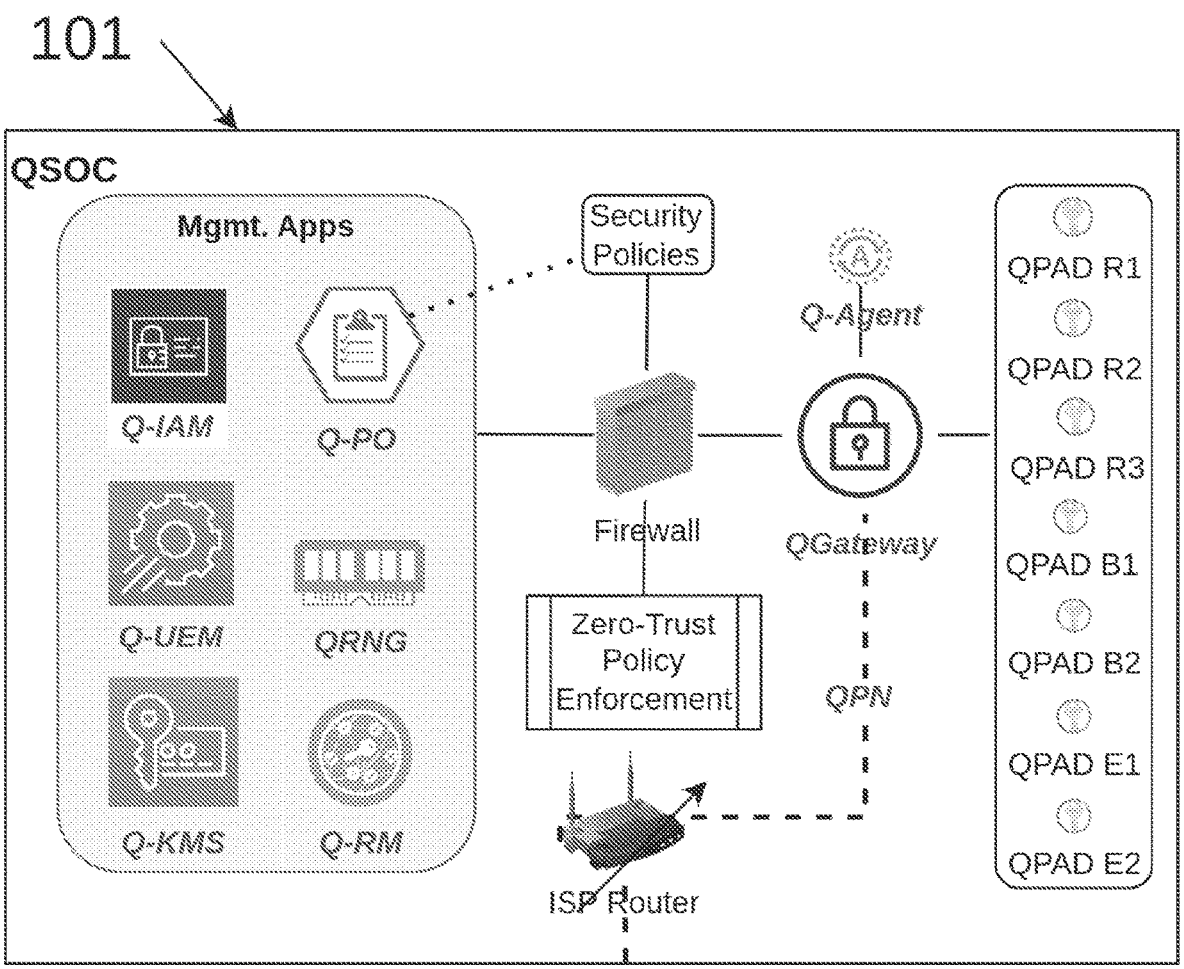
FIG. 4 is another block diagram of a QSOC, according to embodiments.

FIG. 4 is another block diagram of a QSOC, according to embodiments.

Quantum Key Management System

According to embodiments, the quantum key management system (QKMS) 226 is configured to mint and manage the plurality of QPADS. The QKMS 226 is the QSE product where QPAD keys are minted, persisted, managed, and audited. The QKMS 226 is also responsible for centrally managing other types of keys including symmetric keys (AES transport keys, data encryption standard (DES) keys and the like), certificates, and digital signatures utilized for zero-trust security and encryption of components and services within QSE.

Quantum Random Number Generator

According to embodiments, one or more quantum random number generators (QRNG) 220 are configured for generating quantum-safe random numbers, configured to operate under the control of QKMS.

The QRNG 220 is a Q-Appliance which relies on the intrinsic randomness of quantum mechanics to produce random numbers, for example true random numbers. These random numbers are referred to as entropy within the system and are utilized by the QKMS to mint new QPADs utilized within the QSE.

QPADs

According to embodiments, a QSOC 101 includes a plurality of QPADs 206, configured with a proprietary QSE key structure and are minted and managed by the QKMS 226.

According to embodiments, a QPAD is a propriety one-time pad key structure that is made up of random entropy data (raw key material) and metadata information that provides information about the QPAD, including an ID, Name, description, audit information, etc. The encryption methodologies enforced for the use of QPADs adhere to the rules necessary to guarantee information-theoretic security.

In some embodiments a QPAD can be configured to include a plurality of encryption keys, wherein each of these encryption keys are configured for single use during a communication transmission. For example, a QPAD can include encryption keys QPAD R1, QPAD R2 and the like, wherein each of the different notated QPADs represent a different encryption key.

According to embodiments, there are several products within the QSE that utilize QPAD's including Q-Appliances (e.g. QGATEWAY 204, QRouter), Q-Devices (Q-Books, Q-Tablets, Q-Phones), and bring your own devices (BYOD) that can be considered Tier 3 to 5 BYODs as will be further described in more detail elsewhere herein. Different QSE services and libraries will utilize the QPAD library to interact with the QPAD securely stored on a device. QPADs are also deployed on QAdapters to support the ability for a user to remotely connect a BYOD device to a QSOC with a QPN encrypted network tunnel.

According to embodiments, QPAD management is central to all QSE solutions and QPAD key material is to be properly protected by for example leveraging Zero Trust, Defense-In-Depth, and other policies.

According to embodiments, QPADs are centrally managed including key entropy generation, secure key storage, QPAD minting (creation) and key encrypted key/data encryption key secured.

According to embodiments, key entropy generation can define the ability to generate raw entropy key material leveraging True RNG (random number generation) QRNG devices. As entropy is created, it is recorded within the QKMS system and made available to mint new QPADs.

According to embodiments, secure key storage can define the feature wherein all QPADs are securely stored in a key management system (QKMS).

According to embodiments, QPAD minting can define wherein a QPAD is provisioned by minting new QPAD key from one or more entropy files. The "minted" QPADs are stored, along with associated metadata within the QKMS.

According to embodiments, key encrypted key/data encryption key (KEK/DEK) security can define how QPAD key material is encrypted when at rest, and decrypted JIT (just-in-time) when used by Q-Apps and services such as QPNs.

Quantum Universal Endpoint Manager

According to embodiments, a quantum universal endpoint manager (QUEM) 222 is configured to manage all systems deployed throughout QSE, including appliances, user devices and accessories.

According to embodiments, the QUEM 222 is a management application product/module within a QSOC enterprise manager. The QUEM is responsible for the management of all systems deployed within the QSE, including and not limited to QGateway 204, QRouters, Q-Books. Through the management interface, a QSOC administrator has the ability to remotely manage and monitor QSEs, applications, services, and the like. The QUEM 222 communicates to Q-Devices over QPNs and has the ability to communicate with the Q-Agent 208 running on the device. This communication connectivity can provide the ability to perform a variety of operations. The operations can include: 1) remotely read information from the device, including: system information (device fingerprint, memory/CPU utilization, serial no, mac address, etc.), QPAD information and utilization, device BOM (bill of materials) including all loaded applications, services and libraries including versions; 2) read and access device event logs and information; 3) remotely push policy updates from the Q-PO policy server in near real-time to the device; 4) remotely quarantine or wipe a device if determined it is compromised based upon AI intrusion detection algorithms, or if the device is reported lost or stolen, or if the user's access permissions to the device has been revoked; and 5) remotely enable/disable device features. e.g. remotely enable USB filesystem access in order to import a QPAD from a QPN provisioned encrypted USB drive.

Quantum Identity and Access Management Service

According to embodiments, quantum identity and access management service (QIAM) 218 is configured to interface with a QKMS 226 and a QUEM 222 in order to provide authorization of a device and identity confirmation of a user prior to creation of a quantum private network.

According to embodiments, in order to generate a quantum-safe virtual private network, two or more identification and authorization steps are used. A first identification and authorization step is to authenticate a particular device (which may be multi-factor authentication) and subsequently authorize (which may be multi-factor authorization) the specific person using that particular device. Upon authentication of the particular device a secure communication tunnel can be created. Upon authorization of the specific person using the particular device can result in the particular user being permitted to use the secure communication tunnel which results in the enablement of a communication pathway that can be envisioned as a virtual private network. For the setup of the secure communication tunnel, the device authentication, which may include the use of a device fingerprint can be used for this authorization process.

According to embodiments, there is provided a quantum identity and access management (QIAM) module or component associated with the QSE. The QIAM module can aid with reducing the attack surface associated with the communication link (since upon authorization the communication link is configured as a secure communication tunnel) and can be used to protect users, devices, data and the use of applications as enforced by managed security policies, which is further described below in associated with these particular contexts.

According to embodiments, for devices, each user device and network appliance is uniquely identified by QSE and is granted or refused access based on its privileges and state. For users, each user, including internal QSE personnel, is uniquely identified by QSE and is granted or refused access based on privileges and status. For data, users, including organizations, classify data and determine through selected security policies how this data is to be stored, shared and under what conditions this data can or must be retained or deleted. For applications, whether an application is implemented as self-hosted or software-as-a-service (SaaS), applications are used to create and manage data and represent the most exposed and exploited components of the attack surface.

According to embodiments, a QSE can provide tools necessary for software developers to tightly integrate their applications into QSE, and when in compliance with QSE standards these applications can be classified as Q-Apps, which can be envisioned as an application that has a specific level of security associated therewith. Further discussions relating to this feature is provided elsewhere herein.

According to embodiments, QIAM 218 includes the authentication and authorization of users and devices (leveraging device fingerprints) based upon RBAC (role-based access control), ABAC (attribute-based access control) and directory services. QIAM 218 can include both services/application program interfaces (APIs) and a web-based user interface that provides the ability to manage users, groups, roles, permissions, and the like defined within the QSE.

Quantum Policy Orchestrator

According to embodiments, quantum policy orchestrator (QPO) 216 is configured to manage and deliver zero trust policy services within a QSE and orchestrates user, group, device, application, and other security policies.

According to embodiments, QPO 216 is a QPN application responsible for managing zero-trust policy rules within the QSE. The QPO can include both an API (application programming interface) and user interface (UI) that allow a QSOC administrator to create policy sets including one or more conditional rules related to different resources within the QSE. The QPO can control the one or more conditional rules associated with Q-Devices, Q-Apps, QPN network services, and other QPN services.

According to embodiments, the QPO includes a policy definition point (PDP) and one or more policy enforcement points (PEP). The PDP is responsible for storing and managing a list of policies that are used by PEP's running dynamic policy enforcement engines throughout the QSE. Policies are managed within the QPO management application. Policies may be imported/exported through a standardized format with one or more enterprises to support the ability to perform federated zero-trust policy management.

According to embodiments, when a QDevice boots up and performs an associated device authentication, and optional end-user authentication for end-user access, immediately upon establishing network connectivity, the Q-Agent 208 running upon that device will read the latest device and optional user policy from the QPO. The Q-Agent 208 will then run the QPO policy enforcement engine to check and update device-specific policies. The policy on the device can be automatically updated upon a change in policy for the device, user, and all resources (applications, services, and configuration policies) applicable to the device and user.

According to embodiments, throughout the QSE there are a variety of policy enforcement points (PEP) which read their associated set of policy rules from the QPO, and run the QPO policy enforcement engine to determine whether a specific user/device or application service should have the ability (for example authority) to perform an operation.

According to embodiments, if authority is granted, then the user/device performs the associated operation, or alternatively if denied, then the operation will not be performed, and an event or notification will be generated and sent to the security information and event management (SIEM)/security orchestration, automation and response (SOAR) subsystem to take the appropriate corrective action as would be defined by operation within the QPO policies or parameters.

According to embodiments, on QDevices, the QAgent 208 is responsible for many policy enforcement operations, including dynamic network creation within the QPN, device system and application monitoring, and providing least-privilege principle access to device system, operating system, application, and service operations. When a QDevice/end-user initially authenticates to the QPN, the QAgent 208 reads the device/user policies from the QPO and runs the policy enforcement engine to grant or deny (and optionally quarantine or wipe the device) access to the specified resource and associated operation.

According to embodiments, both the QRouter and QGateway 204 read the QPO policy rules to dynamically implement NGFW (next-generation firewall ingress/egress rules) and network routing capabilities.

According to embodiments, when a QSOC administrator modifies the policy rule(s) for a specific device, application, service, or user, the QPO service pushes out policy update notifications to appropriate resources through the QAgent 208, which immediately applies the policy changes to ensure compliance.

Quantum User and Endpoint Device Authorization

According to embodiments, quantum user and endpoint device authorization (QAuth) 501 services, are configured to interface with a QIAM and to remotely manage the operational characteristics of devices, users and the like.

Figure 5:
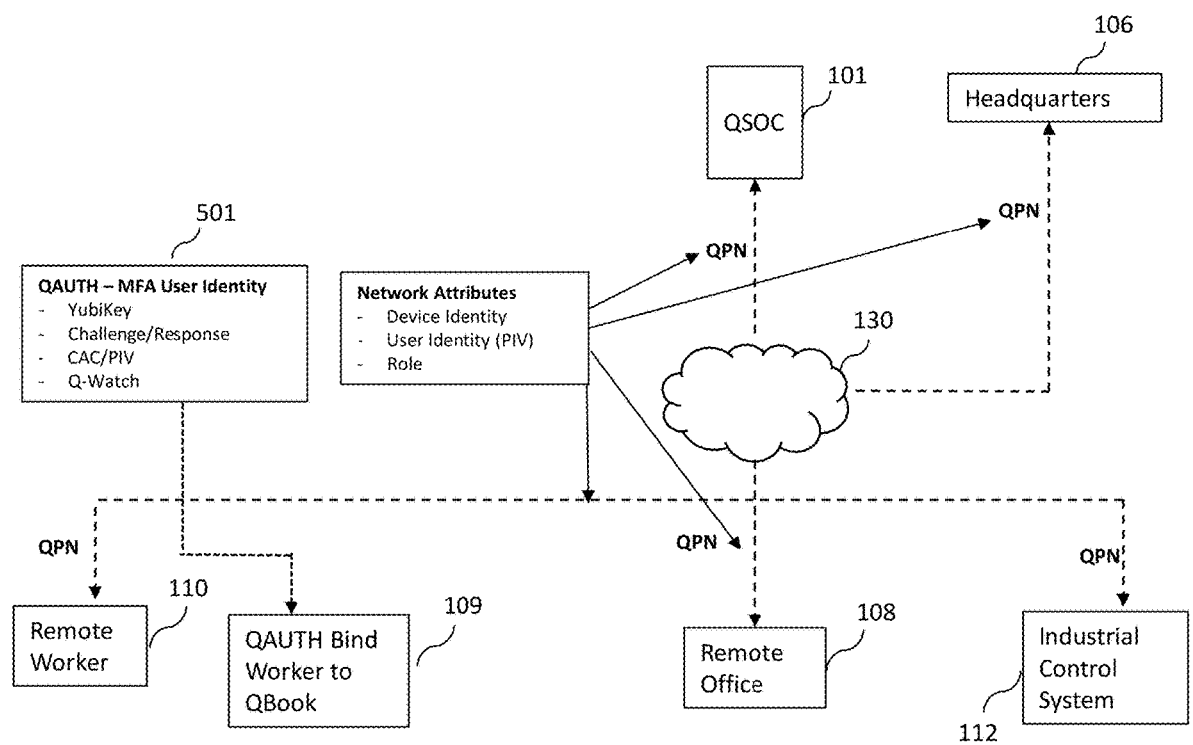
FIG. 5 is a block diagram of a quantum-safe ecosystem (QSE) which is created by a quantum security operations center (QSOC), according to embodiments.

FIG. 5 is a block diagram of a quantum-safe ecosystem (QSE) which is created by a quantum security operations center (QSOC), according to embodiments. As illustrated in FIG. 5 QAuth 501 services to remotely manage the operational characteristics of devices, users and the like. For example, remote management of devices associated with quantum private networks (QPN), wherein each of the QPNs have a collection of network attributes that can be based on device identity, user identity and role associated with that particular device. Each of the QPNs can be associated with a remote worker 110, a remote office 108, an industrial control system 112 and a headquarters 106 and these QPNs, which can form one or more QSEs, can be created and managed by an associated QSOC 101.

According to embodiments, the QAuth service is a library running on QDevices through which both the QDevice and user are authenticated and authorized to access the QSE leveraging several types of MFA (multi-factor authentication) capabilities.

According to embodiments, QAuth includes various levels of authorization where a given user is authenticated through their QDevices to the QSE, validating that users are who they claim to be by ensuring that users are provisioned with credentials that can be validated against the centralized QIAM directory service, or optionally leveraging federated identity to authenticate to an enterprise managed directory service. Upon successful authentication of the user, authorization to a QDevice is validated and enforced through security policies which are defined and managed within the QPO.

According to embodiments, QAuth also includes the authentication and authorization of a QDevice by verifying the device fingerprint with the centralized QUEM system. Once the QDevice can be authenticated, specific authorizations can be validated against security policies ensuring that the QDevice only has access to predefined data, applications, servers and services within the QSE, and specific applications, services, and policies provisioned and accessible to the user through the QDevice user interface.

According to embodiments, QDevices are connected to QAccessories (for example a Bluetooth earpiece, Bluetooth speaker, wireless printer or other accessory format) with QPAD encrypted connections. These connections can be wired or wireless connections, for example Bluetooth low energy (BLE), near-field communication (NFC), 5G, WiFi or other wireless protocol). The QPADs are shared exclusively between Q-Devices and Q-Accessories).

According to embodiments, QPAD MFA can be embedded into a Q-Accessory (for example wearable technology such as a watch or earpiece) required as a component of the QIAM process for Q-Devices to access the QSE or to access specific resources within the QSE such as QSpaces and Q-Applications. QPAD MFA can be shared exclusively between a QPAD MFA enabled QAccessory and the QPAD QKMS.

According to embodiments, a QWearable is a QSE connected device worn by a user primarily to offer MFA (multi-factor authentication) of a user to a device, but secondarily the user can also interact with a QWearable to receive information or to control the device or to communicate through the device, or it can be used offline to interact with Q-Points.

According to embodiments, QAuth can be configured to conduct multi-factor authentication (MFA). For example, an element can be operational on QWearable, operational on end-user device, and an element running within QSOC within the QIAM system, thereby enabling the support of biometric authentication on QWearable such as a fingerprint.

According to embodiments, QPAD MFA and QAccessories can be used outside the QSE for specific purposes. For example, they can be used in offline physical access solutions such as garage door openers, wherein in this type of instance the QPADs are shared exclusively between QPoints and QAccessories or QDevices).

According to embodiments, the QSE supports the ability to provide role-based-access-controlled (RBAC) and policy-controlled delegated management of enterprise resources and services, including enterprise owned Q-Appliances, QDevices, or specific applications, services or features.

In one embodiment, QAuth requires that the wearable QAccessory have user biometric authentication capabilities built-in with match-on-device capabilities.

Firewall

According to embodiments, a QSOC includes a firewall 210 that has direct access to a store of security policies 212 and a store of zero-trust policy enforcement information 214.

According to some embodiments, a firewall suitable for use with one or more QSOCs can be an off-the-shelf firewall that has been examined and confirmed to be "risk free" according to the standards that are set for the respective use of that firewall by the one or more QSOCs for creation of a QSE. For example, these standards can include examination of the firewall to ensure that there are no "back doors" or spyware thereon that could impact the security provided by the firewall.

Quantum Gateway

According to some embodiments, each of the one or more QSOCs includes a QGateway 204, with a QAgent 208 and a plurality of QPADs 206. The QPADs associated with the QGateway can be paired with the QPADs associated with user devices, which have the necessary credentials, that may request the creation of a QSE or a QPN between a first device and a second device.

According to some embodiments, the QGateway 204 is a QPN appliance that runs as a server-side component within a QSOC and supports the ability for multiple QDevices to communicate with it. The QGateway can set up network communication between QDevices and services within one or more QSOCs. Additionally, a QGateway is responsible for setting up communication tunnels between multiple QSOCs for inter-QSOC communications.

According to some embodiments, the QGateway 204 is a Q-Appliance that connects disparate networks by translating communications from one QDevice or Q-Appliance to another based upon policy enforcement rules. The QGateway 204 is configured as a single-board computer with a hardened operating system and operates in a "headless" fashion.

According to some embodiments, The QGateway 204 is configured within the QSE and communicates with other QDevices and Q-Appliances as a quantum-safe network appliance.

Quantum Endpoint Management Service (QAgent)

According to some embodiments, endpoint management services (QAgent) 208 can be installed on all QSE provisioned devices and configured to interface and be managed by a QUEM;

According to some embodiments, the QAgent 208 is a software application deployed on QS managed QDevices which run using a privileged user account, and provides the ability to remotely manage and monitor the devices. In an embodiment, a QAgent (e.g. a software application) can be deployed on BYODs which can enable these BYODs to be manageable, however likely less secure that QS managed devices. QS managed devices can include: 1) Q-Appliances, such as QGateway and QRouters; 2) QDevices such as QBooks, QTablets and QPhones; 3) QEmbedded devices that have been custom integrated into the QSE to enable devices to communicate securely over QPN connections.

According to some embodiments, the QAgent 208 enables QPN hardware to be remotely managed, monitored, and controlled. The QAgent 208 is a zero-trust application that manages QPN hardware for identification, inventory control, authentication, authorization, user interface (UI) configuration including policy enforcement, and QPAD management where key materials can be securely managed and revoked remotely from QUEM management control center.

Quantum Risk Manager

According to some embodiments, the QRisk manager 224 is an application hosted within one or more QSOCs that is responsible for assessing and managing risk within QSE. This product will provide insurance providers with a secure web portal and API(s) that enable them to get information about the devices, services, and applications within the QSE that can be used to perform cyber risk assessment.

According to some embodiments, the QRM 224 comprises a risk analyzer, one or more engines, databases, user interfaces, an actuarial calculation module, a risk profile module, an API interface and/or internet portal application that will allow an insurance company to access their information.

QPAD Distribution Processes

According to embodiments, several processes, applications, and services within the QSE can be utilized to support the ability to distribute newly minted QPAD's to Q-Devices (both during the initial Q-Device provisioning process), as well as adding QPAD key material to QDevices in the field, namely in situ.

According to embodiments, within the QSE the QPADs can be distributed to the related devices within the QSE, and optionally the QPADs may be further encrypted, for example by transfer QPADs in order to ensure that there is a further level of security for this transfer of security keys.

QRouter

According to some embodiments, the QRouter is a Q-Appliance that is usually deployed within a remote environment that acts similar as an ISP router, except that it performs the function of securing the network communication channel (e.g. secure communication tunnel) via QPADs that have been provisioned upon the device to perform QPAD stream cipher encrypted communications with the QGateway 204 deployed within the corresponding QSOC. Every QRouter runs the QAgent 208 application thereon to enable the ability to remotely manage and control the device. The QRouter is a Q-Appliance used to setup a local area network, and connect one or more QDevices or BYODs in a remote-worker environment. A QRouter is similar to a router that is provided by an Internet service provider (ISP) and provides both hard-wired and optionally WiFi network communications.

Quantum-Safe User and Endpoint Devices

According to some embodiments, quantum-safe user and endpoint devices (QSUEDs), include a plurality of QPADS, configured with a proprietary QSE key structure and are minted and managed by one or more QSOCs. Examples of user and end point devices can include personal computers, laptops, tablets, smart phones, or other computing device as would be readily understood. In order to be provided with the ability to operatively communicate within a QSE, a user device or end point device will have a QAgent operating thereon which can provide a means for interaction with a QSOC for access and authorization for communication within a QSE.

According to some embodiments, the end-user devices such as QBooks have the QAgent running and configured thereon, and use their preloaded QPADs to communicate with QGateway 204.

According to embodiments, an end-user device for use within a QSE includes one or more QPADs and a QAuth configured to conduct multi-factor authentication (MFA) with the QIAM within a QSOC.

QAdapter

According to some embodiments, the QAdapter is a hardware attached removable media product such as a USB drive or other removable entity having stored thereon code for provision of its functionality. The QAdapter enables the ability for a user to use a removable disk to securely connect to the QSE utilizing a QPAD stored on the device, and QPN networking software deployed on the device. QAdapters can be used to support BYOD solutions where users can plug in a QAdapter and then enable the user to remotely connect the device using a QPAD QPN encrypted network tunnel to the one or more QSOCs.

Figure 6:
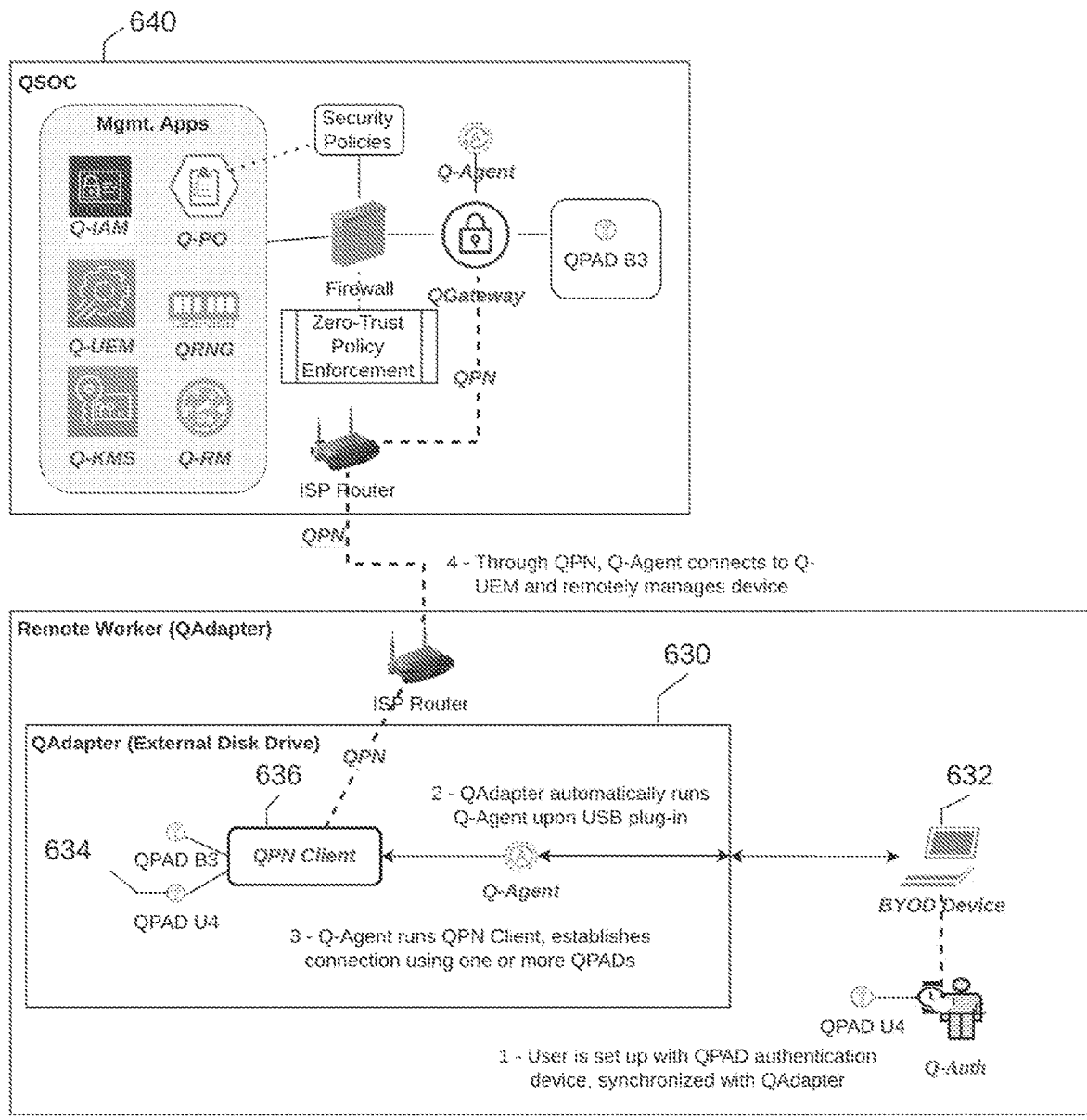
FIG. 6 is a block diagram of a QAdapter that can be operatively connected with a quantum-safe ecosystem (QSE), according to embodiments.

FIG. 6 is a block diagram of a QAdapter that can be operative connection with a quantum-safe ecosystem (QSE), according to embodiments. According to some embodiments, with reference to FIG. 6 a quantum-safe adapter QAdapter 630 attaches to existing bring your own device (BYOD) 632, such as a laptop with a USB port. The QAdapter is bound to the particular BYOD device, thereby providing a level of security that the QAdapter can only be used in association with that particular BYOD device. The QAdapter is an external disk drive including QPADs 634. The user of the BYOD is set up with QPAD authentication device, synchronized with QAdapter 630. The difference from the remote worker is that the system, for example a QSOC 640, is communicating with a BYOD device, not a QBook, namely a device that is preconfigured for operation with a QSOC. The user is authenticated by the BYOD device, when the QAdapter 630 is plugged in. The QSE Client subsystem 636 is running on the QAdapter 630, rather than being installed as an application into a QBook.

It will be readily understood that while a connection between the QAdapter and a computing device has been defined using an USB port as an example, other configurations of connection between a QAdapter and a computing device may include other wired or wireless connections between an "accessory" device and a computing device. Examples of other forms of connections may include a variety of different USB connector types including Type-A, Type-B and Type-C, or can be configured as an ethernet port or FireWire or other type of connection as would be readily understood by a worker skilled in the art.

According to some embodiments, there are plural components within a QAdapter. Primary components of a QAdapter include the QPN client component (e.g., the virtual private network component that is running on a QBook). The QPN Client authenticates to the QGateway in a QSOC. The QAgent is on the QAdapter. In order for the QAdapter to be "bound to the device," the first time the QAdapter is plugged into a BYOD, it will install some QAgent software on the BYOD. For example, the end-user will take the BYOD to an IT person within a QSE, and the IT person will plug in the QAdapter to bind it to the BYOD, and will configure it so that the QAdapter will only run on that BYOD. If someone looses an adapter, they won't be able to access the QSE. Furthermore if someone tries to plug a QAdapter into another computer, it will not work.

QBook

According to some embodiments, the QBook is an end-user computer that is used by a remote worker to connect to a QSOC for creation of a QSE. A QBook operates at tier-1 or 2 security levels where it is configured with all the necessary hardware and operating system hardening required to function as a zero-trust end-point device. All QBooks have a QAgent 208 running upon them to enable remote management, monitoring, control, and risk assessment.

According to some embodiments, the QBook is built upon a secure subsystem on both the local device and through the network connection, making it quantum-safe, or optionally quantum-resistant utilizing QPAD shared symmetric keys. To provide a level of optimal security, data access is provisioned remotely, data is not stored locally and all internal memory is wiped upon shutdown leaving no residue on the QDevice, namely the QBook.

Q-Input Accessories

According to some embodiments, the QSE incudes one or more QInput accessories that can be configured to be a QPAD secured Bluetooth low energy (BLE) or near-field communication (NFC) wireless accessory, such as, but not limited to QPods, keypads; mouse; trackball, controller and the like.

According to some embodiments, QPods represent one of a number of accessories, in this case QPAD secured BLE or NFC enabled earpieces, whereby the accessory is preloaded with a QPAD that is paired to a device to authenticate the two endpoints to each other and to encrypt all communications between them with quantum-safe or quantum-resistant encryption.

QEmbedded System

According to some embodiments, QEmbedded systems are custom integrated solutions with other vendor's systems. As an example, QPN can integrate with an ICS SCADA or IIoT (Ring camera) manufacturer to embed QPAD and QPN network management to enable quantum-safe security and management.

According to some embodiments, a QEmbedded system connects to in situ devices (such as existing SCADA devices) to effect a Tier 3 security upgraded connection to the QSE. Q-Embedded systems represent third-party embedded systems, generally headless (e.g without a user interface), such as SCADA, ICS and Internet of things (IoT) devices, that are tightly integrated into the QSE to take advantage of common security foundations that offer a desired level of encryption and access controls as a benefit of standardizing on QPADs for these functions.

Quantum Communication Codes and Protocols

According to some embodiments, the design of the QSE is such that it is scalable and is agnostic to the interoperability of third-party services. The QSE provides a QS interface, a quantum-safe interoperability protocol layer (QIPL) comprising one or more quantum-safe interoperability protocol (QIP) modules, that can unify the optimal services within a QSE, regardless of their proprietary source. In one embodiment of the common security layer, for example, a user may use an Apple product operating Facetime™ to communicate with another user operating Zoom™ in order to conduct a videoconference in a manner that is quantum-safe.

According to some embodiments, the QIP is configured to provide an interoperability layer (QIPL) on top of the QSE platform to enable the functional connectivity of third-party software (services).

According to some embodiments, the QSE provides a common security layer to make all devices and Q-Apps interoperable through QSOC systems and services. Above this security layer the QSE can provide a further interoperability function, namely that of helping competitive Q-Apps to share, to agree to certain standard protocols, or to connect to a bridge, for protocols including those for communications, audio, video and messaging, so that users can interface through their preferred Q-Apps and yet communicate with other users using competitive Q-Apps.

According to some embodiments, QSE can be extended to a variety of Q-Apps and may provide competitive ecosystems such as Google, Apple and Microsoft to interoperate for the benefit of its users without giving up the preference that their customers will have for one user experience over another. An objective of the QSE is to ensure that a truly QS, or at minimum a QR platform underpins the security of all communications, transactions, privacy and data protection of users independent of their preferred Q-Apps.

According to embodiments, a communication network that may be operative within a QSE can be configured as a wired network or a wireless network or a combination thereof. As would be readily understood by a worker skilled in the art a wired network can include cable networks or optical networks and wireless networks can include a variety of wireless networks operation different wireless protocols, including 3G, LTE, 5G, NewRadio, Bluetooth, WiFi or other wireless protocol or wireless network configuration as would be readily understood.

According to embodiments, endpoints that may be operative within a QSE can be configured in a variety of manners, for example personal computers, servers, laptops, tablets, smartphones or other devices that would have suitable communication and processing capabilities in order to function as described elsewhere herein in order to communication with a QSOC enabling the creation of a QSE.

According to embodiments, remote locations as used herein can include a wide variety of particular geographical locations, including earth bound locations or terrestrial locations. Furthermore, remote locations can be configured as single entity locations or remote networked facilities.

Headquarters

One embodiment of an exemplary headquarters (enterprise) facility may be or may include any networked computer-based infrastructure. For example, the headquarters (enterprise) facility may be corporate, commercial, organizational, educational, governmental, manufacturing, utility providers, or the like. As home networks get more complicated and include more compute instances at home and in the cloud, a headquarters (enterprise) facility may also or instead include a personal network such as a home or a group of homes. The enterprise facility's computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary headquarters facility includes a firewall, a wireless access point, an endpoint, one or more servers. Again, the compute instances depicted are exemplary, and there may be any number or types of compute instances in a given headquarters (enterprise) facility. For example, in addition to the elements depicted in the enterprise facility, there may be one or more gateways, bridges, wired networks, wireless networks, virtual private networks, other compute instances, and so on.

Figure 7:
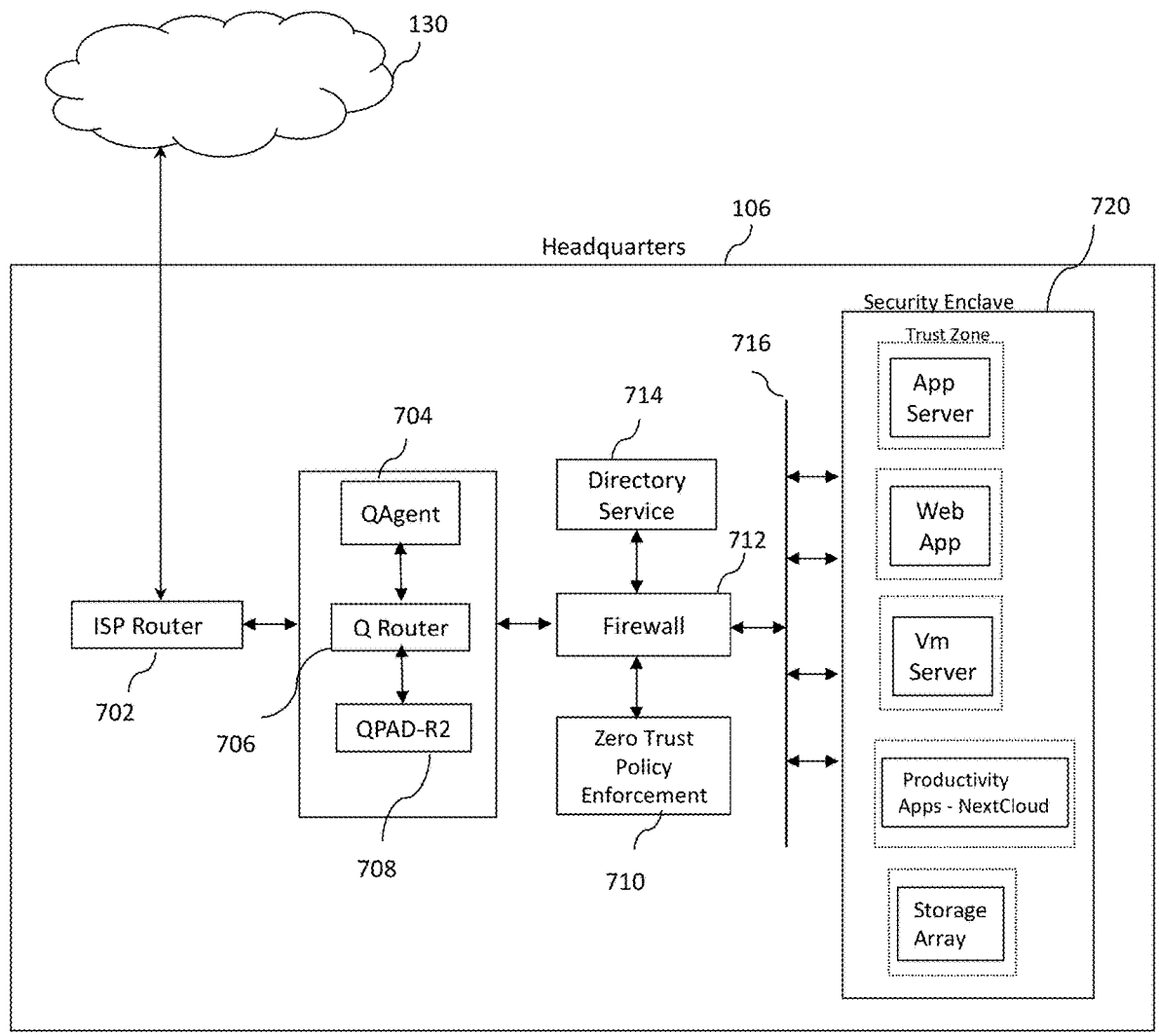
FIG. 7 is a block diagram of a headquarters that can be operative within a quantum-safe ecosystem (QSE), according to embodiments.

FIG. 7 is a block diagram of a headquarters that can be operative within a quantum-safe ecosystem (QSE), according to embodiments. With reference to FIG. 7, the headquarters 106 can communicate with a communication network 130 via a ISP router 702 and thus is capable of communication with a QSOC for creation of a QSE with the headquarters. Within the headquarters is an QAgent 704, QRouter 706 and a QPAD 708 which enable the headquarters to communicate with a QSOC for the authorization and identification of the headquarters as well as creation of a QSE for the headquarters. Also within the headquarters is a firewall 712 which restricts access to the security enclave 720 associated with the headquarters. The firewall 712 can access a directory service 714 and a zero trust policy enforcement 710 for suitable operation thereof. Further operational characteristics of these components are further discussed elsewhere herein.

Figure 8:
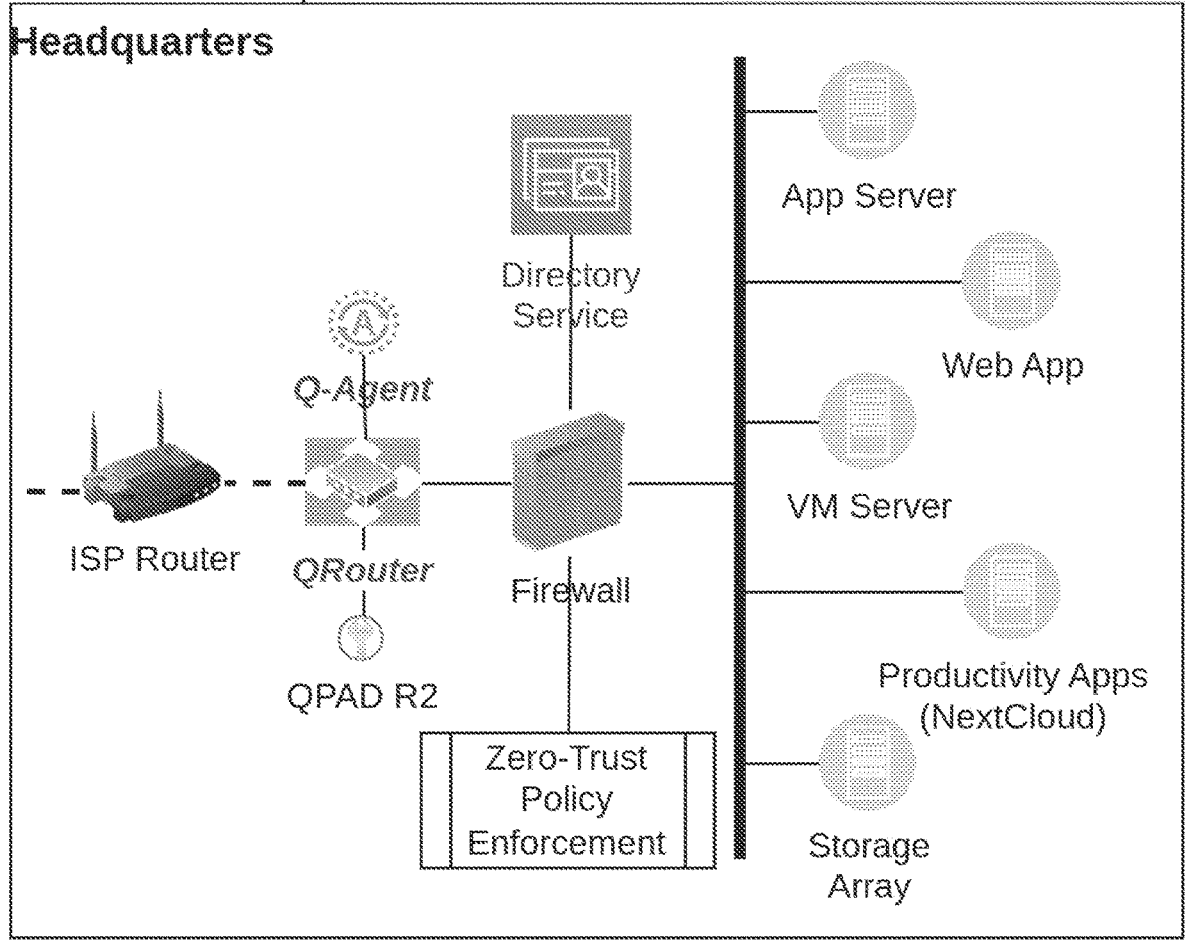
FIG. 8 is another block diagram of a headquarters that can be operative within a quantum-safe ecosystem (QSE), according to embodiments.

FIG. 8 is another block diagram of a headquarters that can be operative within a quantum-safe ecosystem (QSE), according to embodiments.

Remote Office

According to some embodiments, a remote office is generally connected and subordinate to the headquarters. Often referred to as small office home office (SOHO), these offices allow individuals or groups to work closer to home or to smaller markets.

Figure 9:
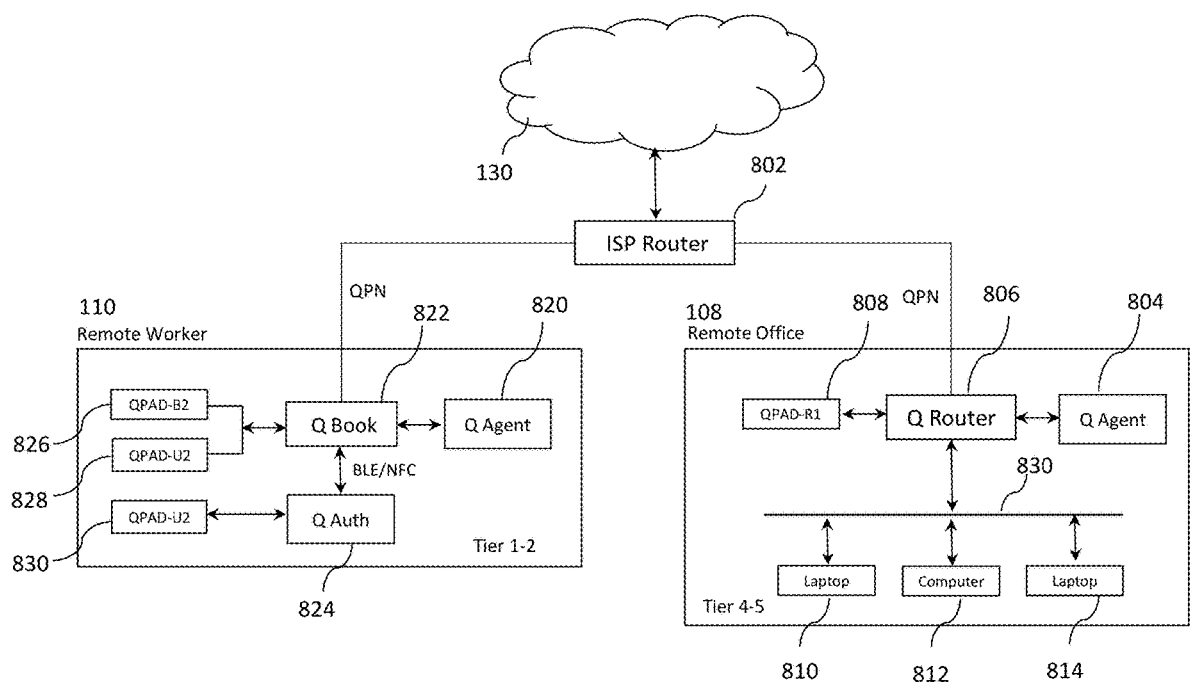
FIG. 9 is a block diagram of a remote worker and a remote office that can be operative within a quantum-safe ecosystem (QSE), according to embodiments.

FIG. 9 is a block diagram of a remote worker and a remote office that can be operative within a quantum-safe ecosystem (QSE), according to embodiments. With reference to FIG. 9, the remote office 108 can communicate with a communication network 130 via an ISP router 802 and thus is capable of communication with a QSOC for creation of a QSE with the remote office. Within the remote office is an QAgent 804, QRouter 806 and a QPAD 808 which enable the remote office to communicate with a QSOC for the authorization and identification of the remote office as well as creation of a QSE for the remote office. Also, within the remote office are a collection of users 810, 812, 814 which are able to communicate with the QRouter 806 via a communication network 830, which can be a private network associated with the remote office. Further operational characteristics of these components are further discussed elsewhere herein.

Figure 10:
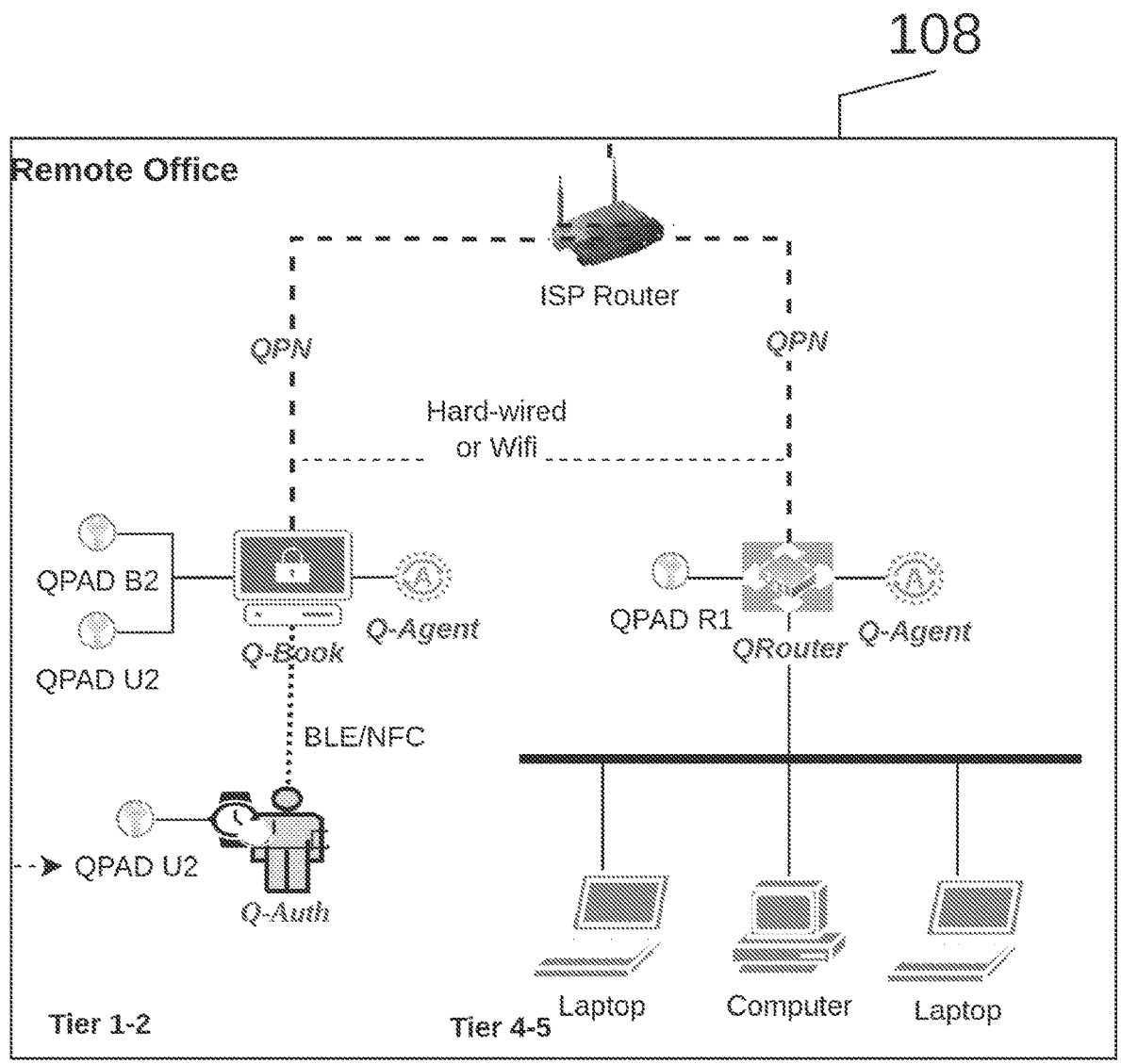
FIG. 10 is block diagram of a remote office that can be operative within a quantum-safe ecosystem (QSE), according to embodiments.

FIG. 10 is block diagram of a remote office that can be operative within a quantum-safe ecosystem (QSE), according to embodiments.

Remote Worker

According to some embodiments, a remote work (also known as work from home [WFH] or telecommuting) is a type of flexible working arrangement that allows an employee to work from a remote location outside of a corporate office. Remote work requires policies governing equipment use, access and network security. A remote worker can typically connect to the corporate office (headquarters) using a QBook.

FIG. 9 is a block diagram of a remote worker and a remote office that can be operative within a quantum-safe ecosystem (QSE), according to embodiments. With reference to FIG. 9, the remote worker 110 can communicate with a communication network 130 via an ISP router 802 and thus is capable of communication with a QSOC for creation of a QSE with the remote worker. Within the remote worker is an QAgent 820, QBook 822 and a QPAD security keys 826, 828, 830 which enable the remote worker to communicate with a QSOC for the authorization and identification of the remote worker as well as creation of a QSE for the remote worker. The QAuth 824 associated with the remote worker provides for remote management of the remote worker for authorization and identification of the remote worker for access to the QSE. Further operational characteristics of these components are further discussed elsewhere herein.

Figure 11:
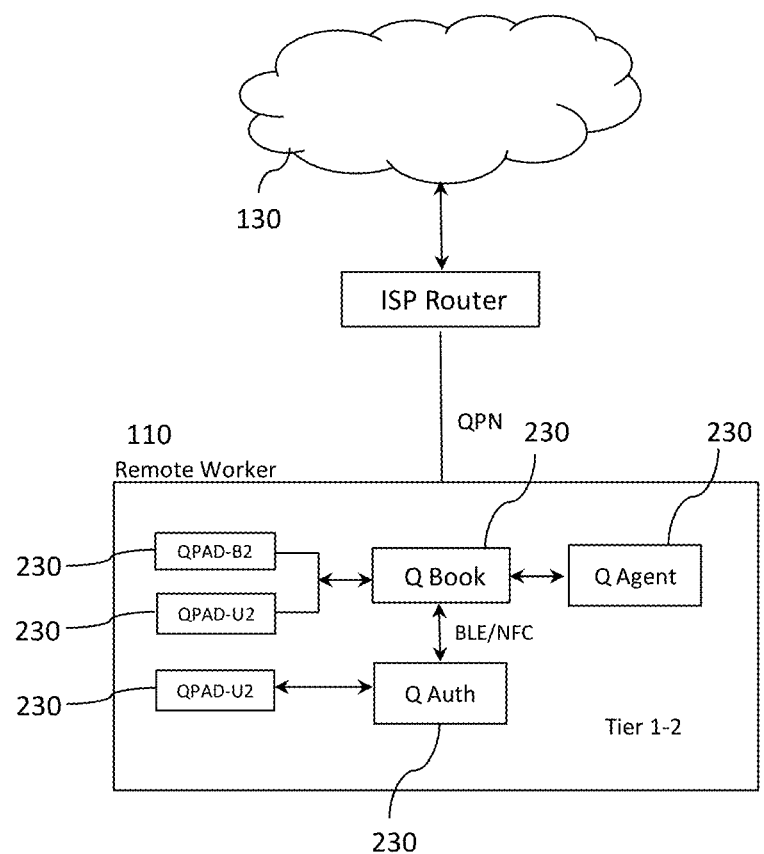
FIG. 11 is block diagram of a remote worker that can be operative within a quantum-safe ecosystem (QSE), according to embodiments.
Figure 12:
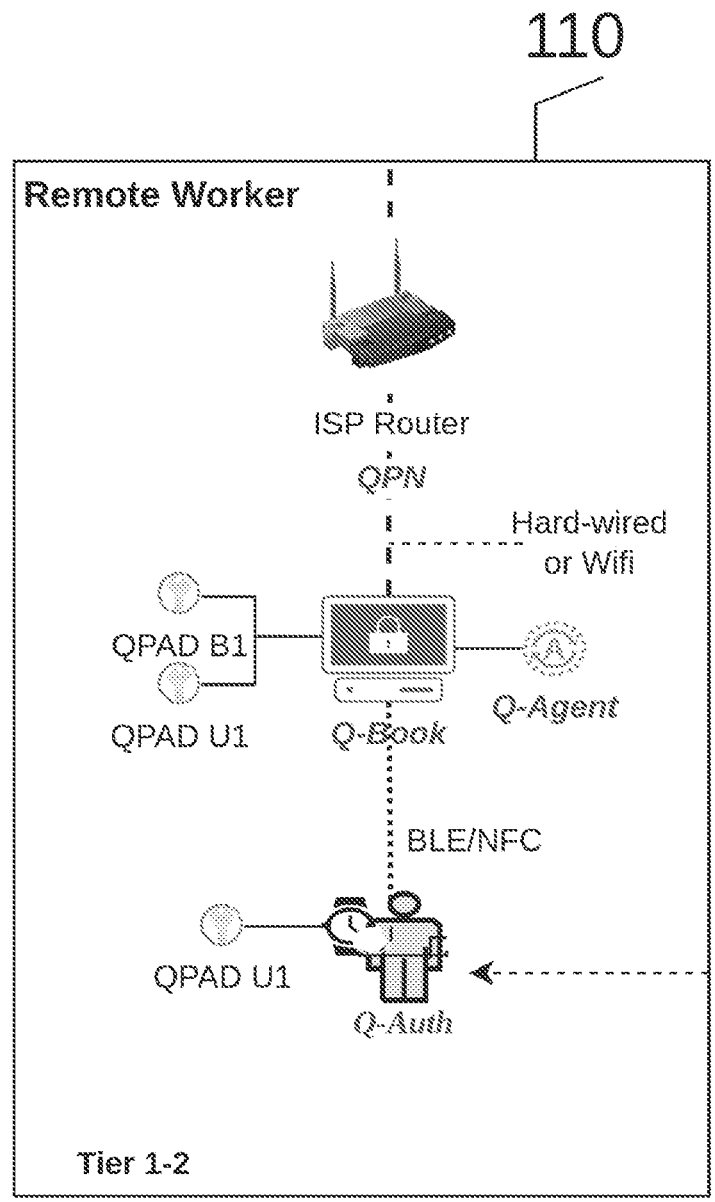
FIG. 12 is another block diagram of a remote worker that can be operative within a quantum-safe ecosystem (QSE), according to embodiments.

FIG. 11 is block diagram of a remote worker that can be operative within a quantum-safe ecosystem (QSE), according to embodiments. FIG. 12 is another block diagram of a remote worker that can be operative within a quantum-safe ecosystem (QSE), according to embodiments.

Industrial Control Systems

According to some embodiments, industrial control systems can include a variety of remote locations where particular control systems are operating for example transformer stations, dams or industrial control systems that may require remote access and secure communication.

Figure 13:
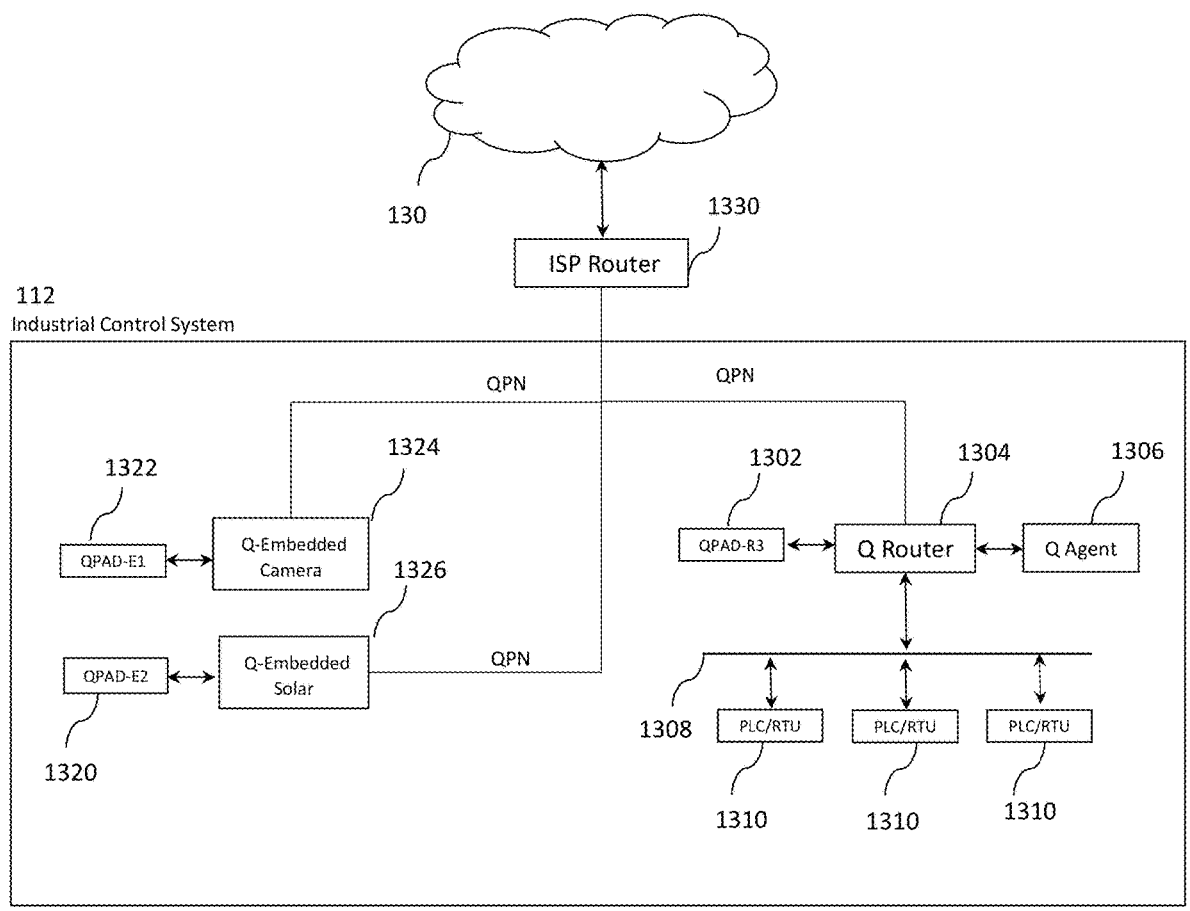
FIG. 13 is block diagram of an industrial control system that can be operative within a quantum-safe ecosystem (QSE), according to embodiments.

FIG. 13 is block diagram of an industrial control system that can be operative within a quantum-safe ecosystem (QSE), according to embodiments. With reference to FIG. 13, the industrial control system 112 can communicate with a communication network 130 via a ISP router 1330 and thus is capable of communication with a QSOC for creation of a QSE with the industrial control system. Within the industrial control system is an QAgent 1306, QRouter 1304 and a QPAD 1302 which enable the industrial control system to communicate with a QSOC for the authorization and identification of the industrial control system as well as creation of a QSE for the industrial control system. Also within the industrial control system is a QEmbedded camera 1324 and QEmbedded solar 1326 wherein each have an associated QPAD 1322, 1320 enabling the creation of a QSE therefor. The QRouter 1304 provides secure access by one or more programmable logic controllers (PLC) or remote terminal units (RTU) 1310 to a QSOC. Further operational characteristics of these components are further discussed elsewhere herein.

Figure 14:
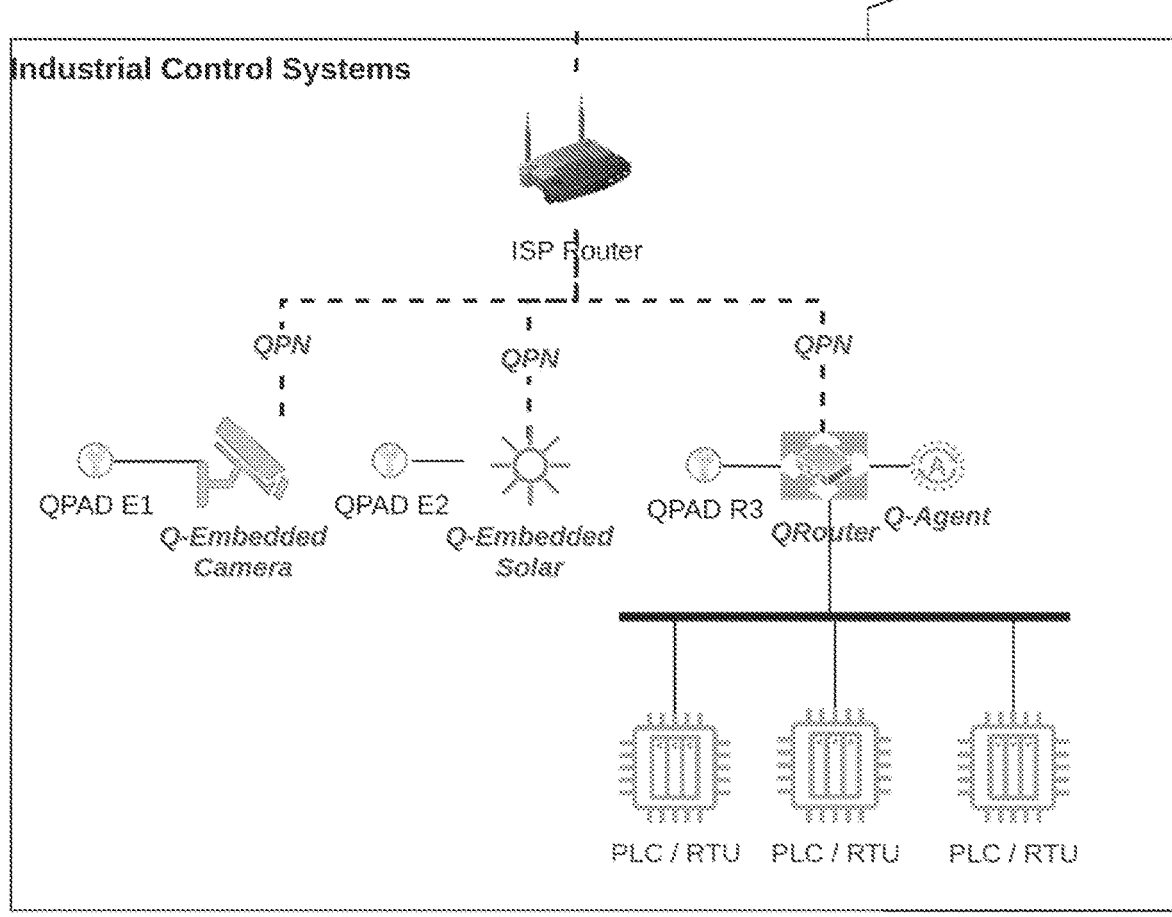
FIG. 14 is another block diagram of another industrial control system that can be operative within a quantum-safe ecosystem (QSE), according to embodiments.

FIG. 14 is another block diagram of another industrial control system that can be operative within a quantum-safe ecosystem (QSE), according to embodiments.

Quantum-Applications

According to some embodiments, whether implemented as self-hosted or software-as-a-service (SaaS), applications are used to create and manage data and represent the most exposed and exploited components of the attack surface. QSE offers the tools necessary for software developers to tightly integrate their applications into QSE, and when in compliance with QSE standards these applications are classified as quantum applications (Q-Apps) 230.

According to some embodiments, Q-Apps refers to a category of customized end-user applications, including: 1) simple applications similar to applications that are used on a phone or tablet computer; 2) integrated enterprise applications such as ERP, CRM, banking, or other solutions; 3) custom or embedded end-user productivity/collaboration tools, including: QSpaces, QLocker, and QPay. All Q-Apps share a user-specific data storage location refer to as QDR—Data Repository.

Figure 15:
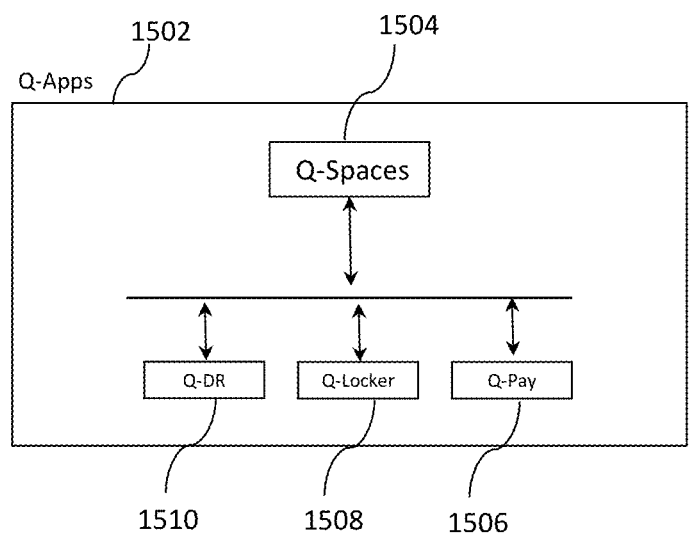
FIG. 15 is a block diagram of Q-Apps that can be operative within a quantum-safe ecosystem (QSE), according to embodiments.

FIG. 15 is a block diagram of Q-Apps that can be operative within a quantum-safe ecosystem (QSE), according to embodiments. As illustrated a collection of applications can be present within Q-Apps 1502 which can include QSpaces 1504 associated with a particular user wherein within the QSpaces 1504 can be a number of different user specific applications for example QDR 1510, QLocker 1508 and QPay 1506.

According to some embodiments, when integrating or building a Q-App, there are several key aspects and capabilities that may be integrated into the Q-App through the system, including identity, authorization, quantum-safe/quantum-resistant communication.

According to some embodiments, with respect to identity, each Q-App is be provided with the identity of the user and the device that the user is running the app upon, as well as any network, policy, or optional geolocation attributes. Additionally, QIAM provides the ability to implement and leverage SSO (single-sign-on) capabilities leveraging federated identity solutions integrating into the end-users enterprise(s).

According to some embodiments, with respect to authorization, each Q-App is registered within the QIAM and QUEM systems, and as such custom policies are enabled and managed within QPO to enable the ability to define zero-trust policy enforcement rules.

According to embodiments, since the Q-App is running within the QS Ecosystem, leverages the secure QPN communications, and has access to the QS QPAD library, the application can take advantage of these services to enable quantum secure communications within other applications, services, or enterprises.

According to embodiments, with respect to Q-Space/Q-DR integration, each end-user registered within the QSE will inherently have access to their personalized QSpace and associated persistent data/configuration storage location (QDR) for storing application settings, application data, or accessing common "personalized" data such as credit cards, password lockers, personal address books and the like.

According to embodiments, the concept behind the QSpace acknowledges that there is provision for various types of digital asset (e.g. data is an asset) activities that need to be separately managed and protected:

According to embodiments, personal data related to your finances, healthcare and education should always be under your control, and you must be able to decide if any of this data should be shared, and if so for how long. Access to third-party data and applications must also be under the control of the user, to the extent that their granted privileges allow, and within the personal QSpace the keys used to access these must be manageable by the user, for example in a conventional sense would be a password locker, or QLocker as applied in a QSpace. Each user determines and manages its own security policies. Every user must have a personal QSpace within the QSE before they can access a QSpace established for them by a group, such as an employer.

According to embodiments, work data is generally owned by an enterprise (a headquarters), whether you are an employee, contractor, volunteer, board member, or fall under some other classification. In some instances, work data may be jointly owned by you and an enterprise, such as employment information. Students share ownership of their transcripts with schools, and patients share ownership over health records with their health care providers. The same applies for professional services including financial and legal. Shared ownership and the rights of each party must be specified and enforceable. In each instance and for each data asset ownership and control privileges are governed by security policies. An enterprise controls its own security policies and can remove privileges from any user. Users must have the same controls over their personal data. With these capabilities users can share verifiable records with any parties that they choose; and the professional party, such as an auditor, is aware of and can validate the data when it is shared. This is an invaluable capability to validate user claims. These QSE features can be used by Q-Apps to maintain privacy respecting security policies, and to provide confidence for reviewers of third-party validated data.

According to embodiments, a provision is also made to transfer control over a QSpace to assigns and successors. In the case of a personal QSpace, at the time of incapacity or death, the user's ownership of the personal QSpace and all data and keys within this QSpace is transferred to the user's estate. As in all instances the security policies for this are set by the user and can be triggered as a dead-mans-switch (eg. no activity for 30 days and access is transferred to the user's attorney).

According to embodiments, a group can share control over a QSpace. for example, a board of directors governs a company on behalf of its shareholders. The votes cast by the directors, a QVote (another Q-App that can be provided by competitive SaaS providers or developers of self-hosted solutions) can be acted upon through keys protected within the entity's QSpace. Another example of group control over a QSpace is a special needs trust whereby the trustees collectively make decisions on behalf of a disabled adult.

According to embodiments, these capabilities can be provided through a QSOC managed API (application programming interface).

Quantum Services

According to embodiments, QComSec can be defined as a unified communication service that enables devices to securely communicate across public and private networks using voice, video, text and data exchanges. QComSec includes QAuth protocols and QPN services.

According to embodiments, QBlocks can be defined as similar to a blockchain technology wherein this blockchain is made quantum-safe within the QSE.

Figure 19A:
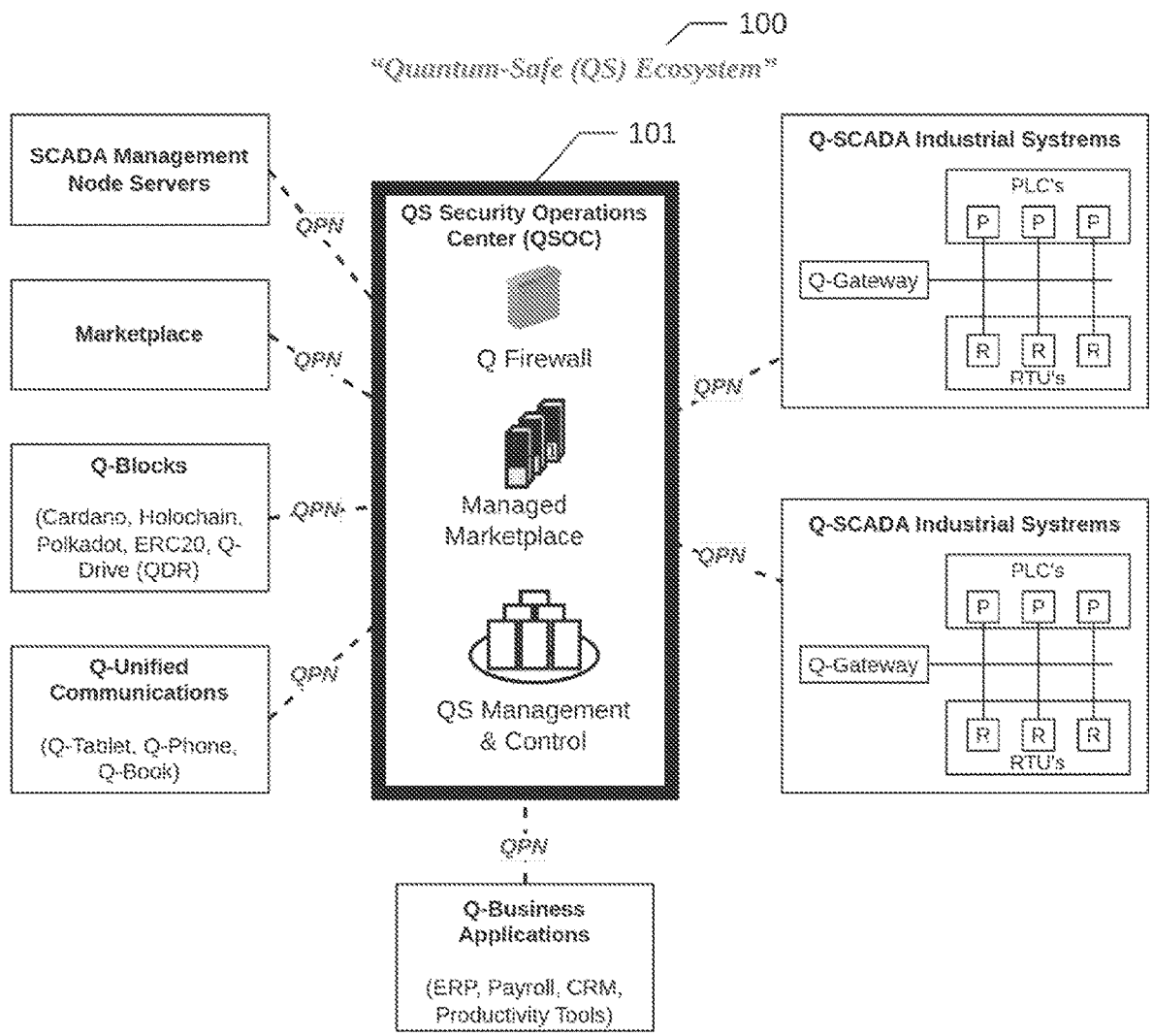
FIG. 19A is a schematic representation of a Quantum-Safe Ecosystem illustrating networked QPN enabled architecture features as listed in Table 1, FIGS. 21A, 21B & 21C according to embodiments.
Figure 19B:
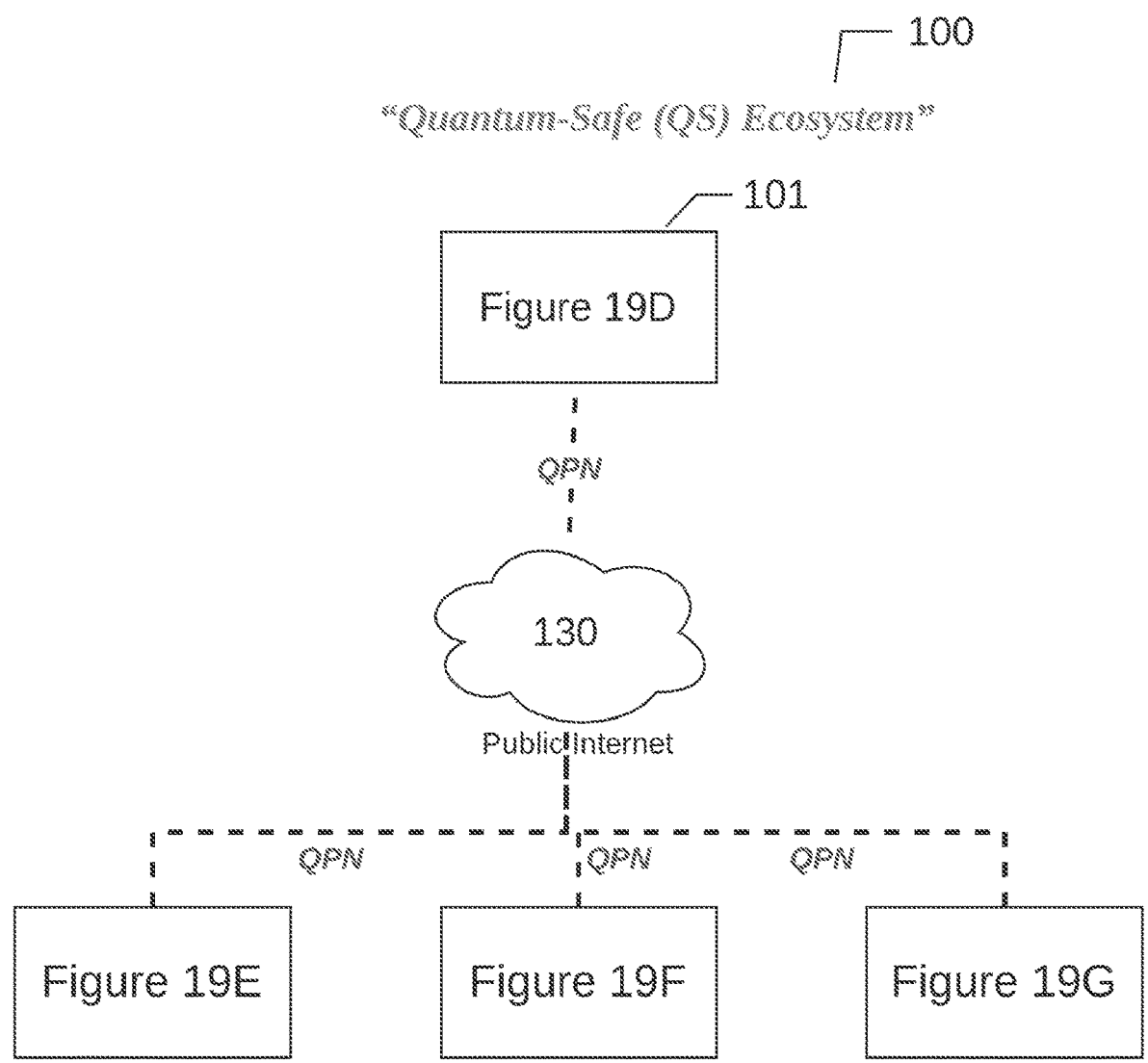
FIG. 19B is a schematic representation of a Quantum-Safe Ecosystem illustrating networked QPN enabled architecture features as listed in Table 1, FIGS. 21A, 21B & 21C according to embodiments.

FIG. 19B is a schematic representation of a Quantum-Safe Ecosystem illustrating networked QPN enabled architecture features as listed in Table 1, FIGS. 21A, 21B & 21C according to embodiments.

FIG. 19B illustrates a Quantum-Safe Ecosystem, wherein a QSOC is configured to comprise one or more QBlocks, (e.g., QBlock RE1, QBlock RE2 and QBlock RE3). Each QBlock is a blockchain node (i.e., a Q-node), hosted within a QSOC, and provides the QPN communication with one or more Remote (Asset/Crypto) Exchanges. Each Q-Block is configured to communicate with different Exchanges via different QPADs (RE1, RE2 and RE3). For example, QBlock RE1 uses QPAD RE1, QBlock RE2 uses QPAD RE2, QBlock RE3 uses QPAD RE3, etc.

FIG. 19B includes block diagrams of Remote (Asset/Crypto) Exchanges (e.g., RE1, RE2 and RE3) that can be operative within a quantum-safe ecosystem (QSE), according to embodiments. With reference to FIG. 19B, the Remote (Asset/Crypto) Exchanges can communicate with a communication network via an ISP router and thus are capable of communication with a QSOC for creation of a QSE with the Remote (Asset/Crypto) Exchanges. Within the Remote (Asset/Crypto) Exchanges is a QAgent, QRouter and a QPAD which enable the Remote (Asset/Crypto) Exchanges to communicate with a QSOC for the authorization and identification of the Remote (Asset/Crypto) Exchanges as well as creation of a QSE for the Remote (Asset/Crypto) Exchanges. Also within the Remote (Asset/Crypto) Exchanges is a firewall 712 which restricts access to the security enclave associated with the Remote (Asset/Crypto) Exchanges. The firewall can access a directory service and a zero trust policy enforcement for suitable operation thereof. Further operational characteristics of these components are further discussed elsewhere herein.

Figure 19C:
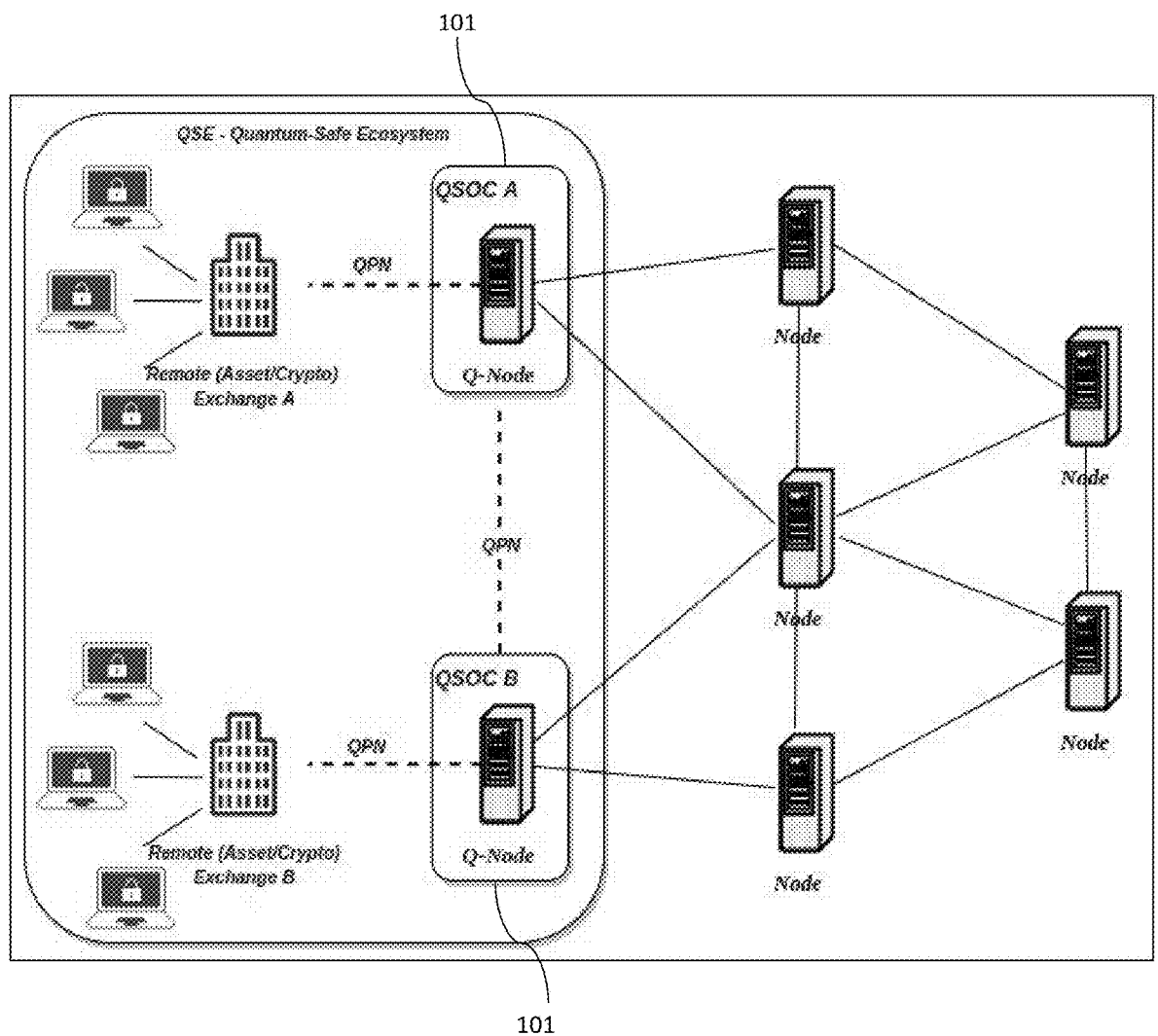
FIG. 19C is a schematic representation of a Quantum-Safe Ecosystem illustrating networked QPN enabled architecture features as listed in Table 1 FIGS. 21A, 21B & 21C according to embodiments supporting blockchain.
Figure 19D:
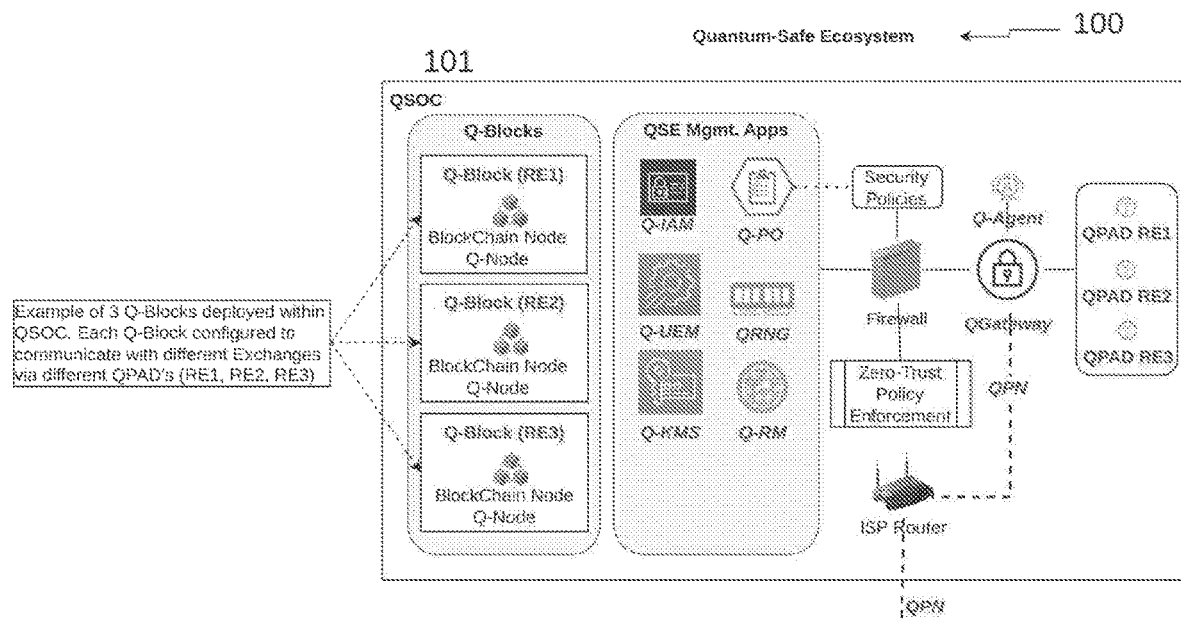
FIG. 19D is a QSOC according to embodiments.
Figure 19E:
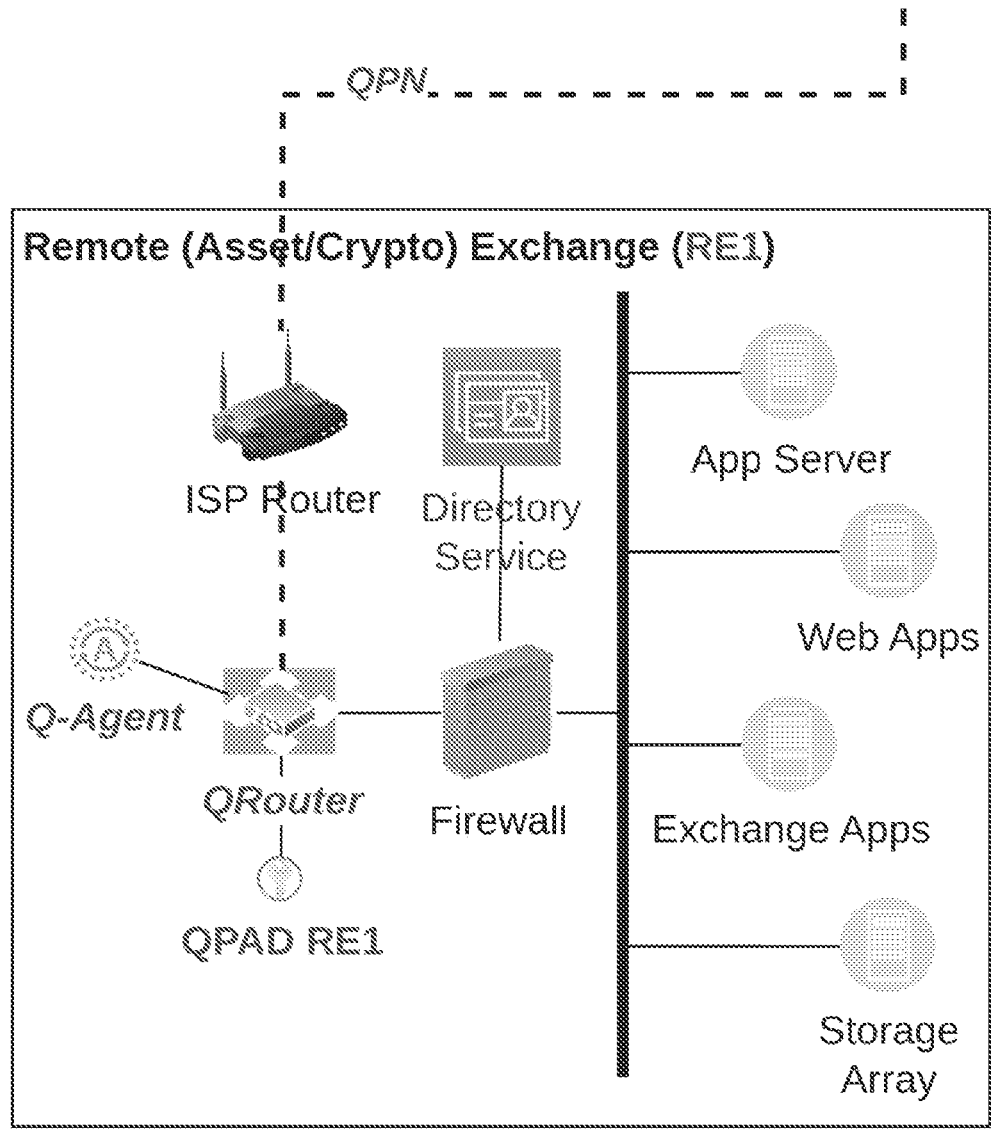
FIG. 19E is a Remote Exchange according to embodiments.
Figure 19F:
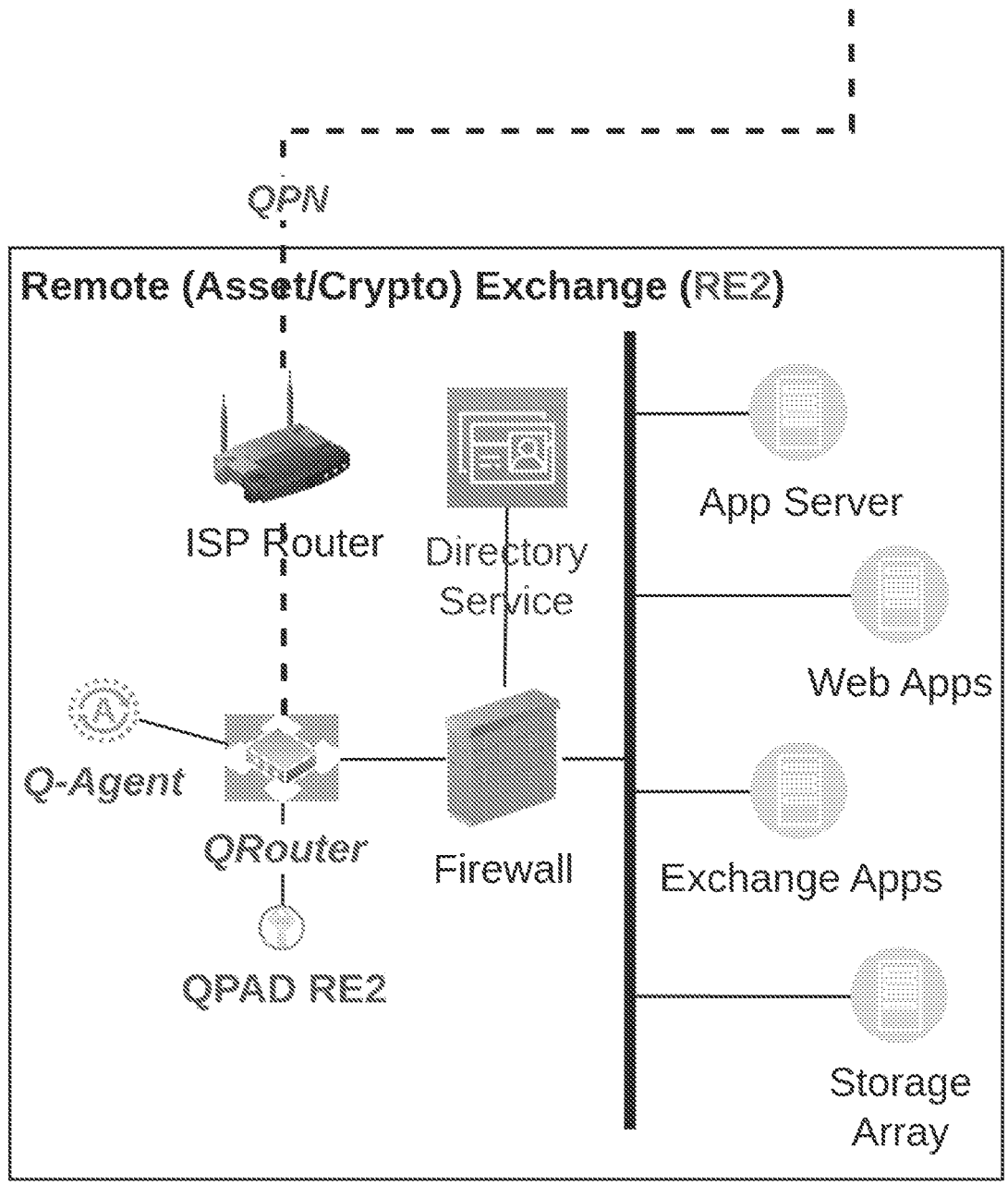
FIG. 19F is a Remote Exchange according to embodiments.
Figure 19G:
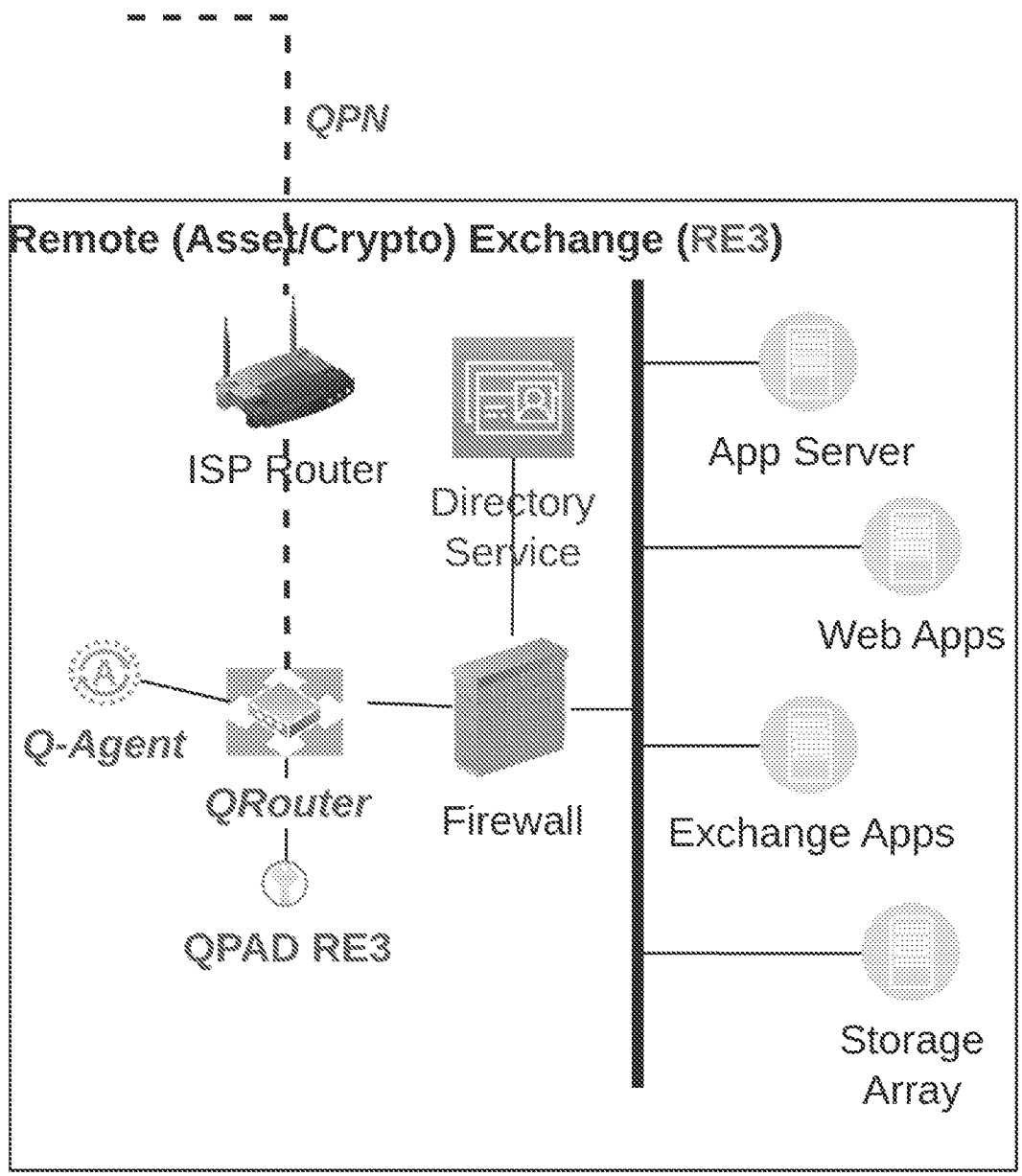
FIG. 19G is a Remote Exchange according to embodiments.

FIG. 19C is a schematic representation of a Quantum-Safe Ecosystem illustrating networked QPN enabled architecture features as listed in Table 1 FIGS. 21A, 21B & 21C according to embodiments supporting blockchain. FIG. 19C describes an embodiment of the QSE, wherein this embodiment represents the ability to support multiple nodes distributed amongst multiple QSOCs that are configured in operative communication with one another. In this embodiment, Remote (Asset/Crypto) Exchange A communicates with QSOC A and Remote (Asset/Crypto) ExchangeB communicates with QSOC B.

The existing Q-nodes within this diagram, although they exist within the QSE, they are configured to support existing communication channels with other nodes over an internet located outside of the QSE According to embodiments, Q-Apps can be defined such that software applications hosted within the QPN System are inherently quantum-safe.

According to embodiments, QLocker is an example of an end-user application that provides a secure location to store "personalized" user passwords for a variety of purposes, including browser passwords, system passwords, etc. into the user's personal QDR within their QSpace.

According to embodiments, QPay is a Q-App end-user application that provides the ability to perform secure payment processing.

Quantum-Data Repository

According to embodiments, a quantum data repository (QDR) can be envisioned as a data repository is an online "personal" data storage location and drive accessible within the QSE. In some embodiments, a QDR may be referred to as a QDrive. One or more QDRs can be configured for a user within the user's QSpaces configuration to enable access to remote configuration data and storage. The QDR may be optionally exposed through the device's filesystem as a virtual file system to support the ability of seamless access to the drive. Since QDevices are QSE networked, all data transfer to and from the QDR is encrypted in transit throughout the QSE.

According to embodiments, QDR supports the ability to store data at rest where it is encrypted with QPN managed keys stored within the QS Q-KMS. This capability limits access to data files to authenticated QS users. Additionally, the QDR provides users with secure key storage, encrypted file storage, and virtual workspaces for shared data.

Identity Provider

According to embodiments, an identity provider may be any remote identity management system or the like configured to communicate with an identity management facility, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider. In an embodiment the QIAM is responsible for device identity.

In embodiments, the identity provider may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility may communicate hygiene, or security risk information, to the identity provider. The identity management facility may determine a risk score for a user based on the events, observations, and inferences about that user and the compute instances associated with the user. If a user is perceived as risky, the identity management facility can inform the identity provider, and the identity provider may take steps to address the potential risk, such as to confirm the identity of the user, confirm that the user has approved the SaaS application access, remediate the user's system, or such other steps as may be useful.

In embodiments, information may be sent from the enterprise to a third party, such as a security vendor, or the like, which may lead to improved performance of the risk management. In general, feedback may be useful for any aspect of threat detection. For example, the types, times, and number of virus interactions that an enterprise experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

According to some embodiments, organizations increasingly request "federated services" for user management. With federated services, a single sign-on (SSO) to an identity provider, or "IDP," provides user access to multiple software products at once, without requiring separate logins for each product. Federated services are usually easier for administrators to manage than are separate accounts for each product. For example, an administrator can create or disable a user's access to many software products at once, just by changing that user's settings in the IDP.

Multiple Tiers of Service

According to some embodiments, the QSE assesses risk in multiple ways. In one embodiment, the QSE identifies the types of access that devices are granted based on the security policies that govern the types of encryption that they're permitted to use. The system is able to provide a plurality of tiers of security-level service. In one embodiment, the system provides 5 tiers of service representing 5 separate security levels.

According to some embodiments, according to a tier 1 security level service, supplied devices with no ability to communicate outside the Quantum Private Network (QPN). Tier 1 represents the highest security tier and is restricted to pure QPAD encryption, making the communications between Tier 1 devices QS (quantum-safe). Tier 1 devices are hardened, meaning that the hardware and operating system of a Tier 1 device have been modified to reduce its surface of vulnerability. Tier 1 devices are imaged and deployed through the QSE.

According to some embodiments, according to a tier 2 security level service, QPN supplied devices with the ability to communicate outside the QPN System. Tier 2 devices can communicate with pure QPAD encryption for the most sensitive communications, but they can also communicate in QR (quantum-resilient) mode, whereby a symmetric key exchange between QPADs replaces the key exchange mechanisms provided for with PKI, PQC and QKD methodologies. Furthermore, Tier 2 devices could, if permitted by the security policies that govern their use, communicate with Tier 3, 4 and 5 devices. Tier 2 devices are hardened, meaning that the hardware and operating system of a Tier 2 device have been modified to reduce its surface of vulnerability. Tier 2 devices are imaged and deployed through the QSE.

According to some embodiments, according to a tier 3 security level service, QAdapter w/QPAD and interactions with tiers 2-5. Tier 3 devices have been upgraded with QAdapters. A QAdapter may also be referred to as a BITW (bump-in-the-wire). Furthermore, Tier 3 devices could, if permitted by the security policies that govern their use, communicate with Tier 3, 4 and 5 devices. The device that a QAdapter is connected to, such as a SCADA device, has not been hardened and may still be vulnerable if an attacker can physically access it. QAdapters, but not the devices they're connected to, are imaged and deployed through the QSE.

According to some embodiments, according to a tier 4 security level service, Client supplied devices with a physically uploaded Q-App including a QPAD through a removable media product supplied by QPN. Tier 4 represents an end user device that is upgraded with a QAGENT and enabled with PQC capabilities making the device QR (Quantum-Resilient). Tier 4 devices are not imaged or deployed through the QSE, but they may communicate with other QSE connected devices subject to the security policies that govern these other devices.

According to some embodiments, according to a tier 5 security level service, Client supplied devices that download the Q-App—only conventional PKI capable—no QPAD included. Tier 5 represents an end user device that is upgraded with a QAGENT so that it can connect to the QSE and communicate with other QSE connected devices subject to the security policies that govern these other devices, but such a device is not QR as it can only communicate with conventional key exchange mechanisms, including PKI and TLS. Tier 5 devices are not imaged or deployed through the QSE.

According to some embodiments, Table 1 describes the 5 different security Tiers w/ modification via security policies for Q-Devices deployed within the QSE ecosystem. Note that Tiers 4 and 5 are provided as QSE delivered services to expedite on-boarding of new users to the QSE service. e.g. Clients within a Remote Office/SOHO environment can provision Q-Router(s) with specific office locations and then utilize existing computers (such as Windows or Apple Mac desktop or laptop computers) within the office, and simply connect to the Q-Router via hard-wired or WiFi LAN, and get access through the QSE Enterprise QPN to their enterprise applications and services with a quantum-safe, (QPAD stream-cipher) or quantum-resistant (QPAD handshake+dynamic symmetric session keys) communication network.

TABLE 1

| Tier | Tier Name | Description |
| --- | --- | --- |
| 1 | Q-Device w/QPAD only (SCI) | This type of Q-Device includes: Q-Books, Q-Tablets, and Q-Phones which are provisioned by QSE and are fully managed devices. They are pre-provisioned with QPAD's and are configured to perform full QPAD encryption for both the handshake and the data transmission (QPN stream cipher). Tier 1 represents the highest security tier and is restricted to pure QPAD encryption, making the communications between Tier 1 devices QS (quantum-safe). Tier 1 devices are hardened, |

TABLE 1-continued

| Tier | Tier Name | Description |
|---|---|---|
| | | meaning that the hardware and operating system of a Tier 1 device have been modified to reduce its surface of vulnerability. Tier 1 devices are imaged and deployed through the QSE. |
| 2 | Q-Device w/QPAD and interaction with lower tiers | This type of Q-Device includes: Q-Books, Q-Tablets, and Q-Phones which are provisioned by QSE and are fully managed devices. They are pre-provisioned with QPAD's and are configured to communicate with pure QPAD encryption for the most sensitive communications, but they can also communicate in QR (quantum-resilient) mode, whereby a symmetric key exchange between QPADs replaces the key exchange mechanisms provided for with PKI, PQC and QKD methodologies. Furthermore, Tier 2 devices could, if permitted by the security policies that govern their use, communicate with Tier 3, 4 and 5 devices. Tier 2 devices are hardened, meaning that the hardware and operating system of a Tier 2 device have been modified to reduce its surface of vulnerability. Tier 2 devices are imaged and deployed through the QSE. |
| 3 | QAdapter w/QPAD and interactions with tiers 2-5 | Tier 3 devices have been upgraded with QAdapters. A QAdapter may also be referred to as a BITW (bump-in-the-wire). Furthermore, Tier 3 devices could, if permitted by the security policies that govern their use, communicate with Tier 3, 4 and 5 devices. The device that a QAdapter is connected to, such as a SCADA device, has not been hardened and may still be vulnerable if an attacker can physically access it. QAdapters, but not the devices they're connected to, are imaged and deployed through the QSE. |
| 4 | BYOD w/PQC | Tier 4 represents an end user device that is upgraded with a QAGENT and enabled with PQC capabilities making the device QR (Quantum-Resilient). Tier 4 devices are not imaged or deployed through the QSE, but they may communicate with other QSE connected devices subject to the security policies that govern these other devices. |
| 5 | BYOD w/PKI | Tier 5 represents an end user device that is upgraded with a QAGENT so that it can connect to the QSE and communicate with other QSE connected devices subject to the security policies that govern these other devices, but such a device is not QR as it can only communicate with conventional key exchange mechanisms, including PKI and TLS. Tier 5 devices are not imaged or deployed through the QSE. |

Cyber Security and Privacy Risks

According to embodiments, cyber security risk is based on the probability of exposure or compromise of critical assets or information, occurring because of a cyber-attack or breach within an organization's infrastructure. The probability of reputational harm is also part of a cyber security risk profile. In a post quantum era, the probability of data loss or exposure due to advances in technology is also considered. Quantum risk can be characterized as the exposure of protected data because of increasing quantum computing capabilities. Quantum risk is only one of the many threat sources that an organization can face. It falls into the category of technology risk when conducting a risk assessment for an organization.

According to embodiments, QSE is a secure-by-design alternative to the open Internet within which users interact through QSE connected devices to create, edit, and manage data with the help of Q-Apps, governed by self-managed security policies. QSE allows users and groups to assess and manage their cyber risk exposure through security policies, and to offer their insurers real-time access to their risk profiles. These risk profiles are used by integrated insurance products to dynamically calculate coverage, premiums and deductibles as changes are made by the user specifically and by the group, or enterprise, collectively.

In one embodiment, the QSE can provide the following information to an insurer about a customer's risk profile: 1) security policies and changes made to these policies; 2) the security tiers set for all devices used and the types of data and applications each has access to; 3) the QIAM restrictions placed on user access to devices, data and applications; 4) the cost of exposure or value of data to be insured, the usage policies related to data classifications, and data loss prevention policies and safeguards to prevent damage, destruction or compromise of data; 5) the status of applications, ideally Q-Apps, employed by users to create, edit and manage data.

According to embodiments, insurers can use QSE information generated about the insured's cyber risk profile, shared with them by their customers, as inputs to their proprietary risk assessment algorithms; insurers use these results to offer insurance products tailored to their customers' needs. QSE enabled insurance products allow for real-time changes to be calculated within the terms of the insurance contracts; as risk profiles change due to the addition of new devices, removal of devices, a change in the cost of exposure or value of data, applications employed, and any changes to the insured's security policies, the premiums, deductibles, and coverage can be revised.

According to embodiments, the QSE provides the following information to Insurers: QSE information generated about the insured's cyber risk profile, shared with them by their customers, as inputs to their proprietary risk assessment algorithms; insurers use these results to offer insurance products tailored to their customers' needs. QSE enabled insurance products allow for real-time changes to be calculated within the terms of the insurance contracts; as risk profiles change due to the addition of new devices, removal of devices, a change in the cost of exposure or value of data, Applications employed, and any changes to the insured's security policies, the premiums, deductibles, and coverage can be revised.

According to embodiments, the QSE model makes cyber insurance practical. At the present time many small customers are being denied cyber insurance or are finding that their current policies are not being renewed. Cyber insurance policies that are renewed are invariably stating new exclusions, offering lowered coverage, and present increases in both premiums and deductibles. For many of these customers cyber insurance is mandatory. Insurers are making these decisions because it is increasingly difficult for them to predict risk as they respond to a steady trend of increasing payouts, resulting in many of their customers becoming uninsurable. QSE offers the highest level of protection available in the market and dynamic mechanisms for customers and their insurers to make the business decisions that are right for them. The QSE Insurance Model is only applicable to protections offered within its ecosystem.

Figure 23:
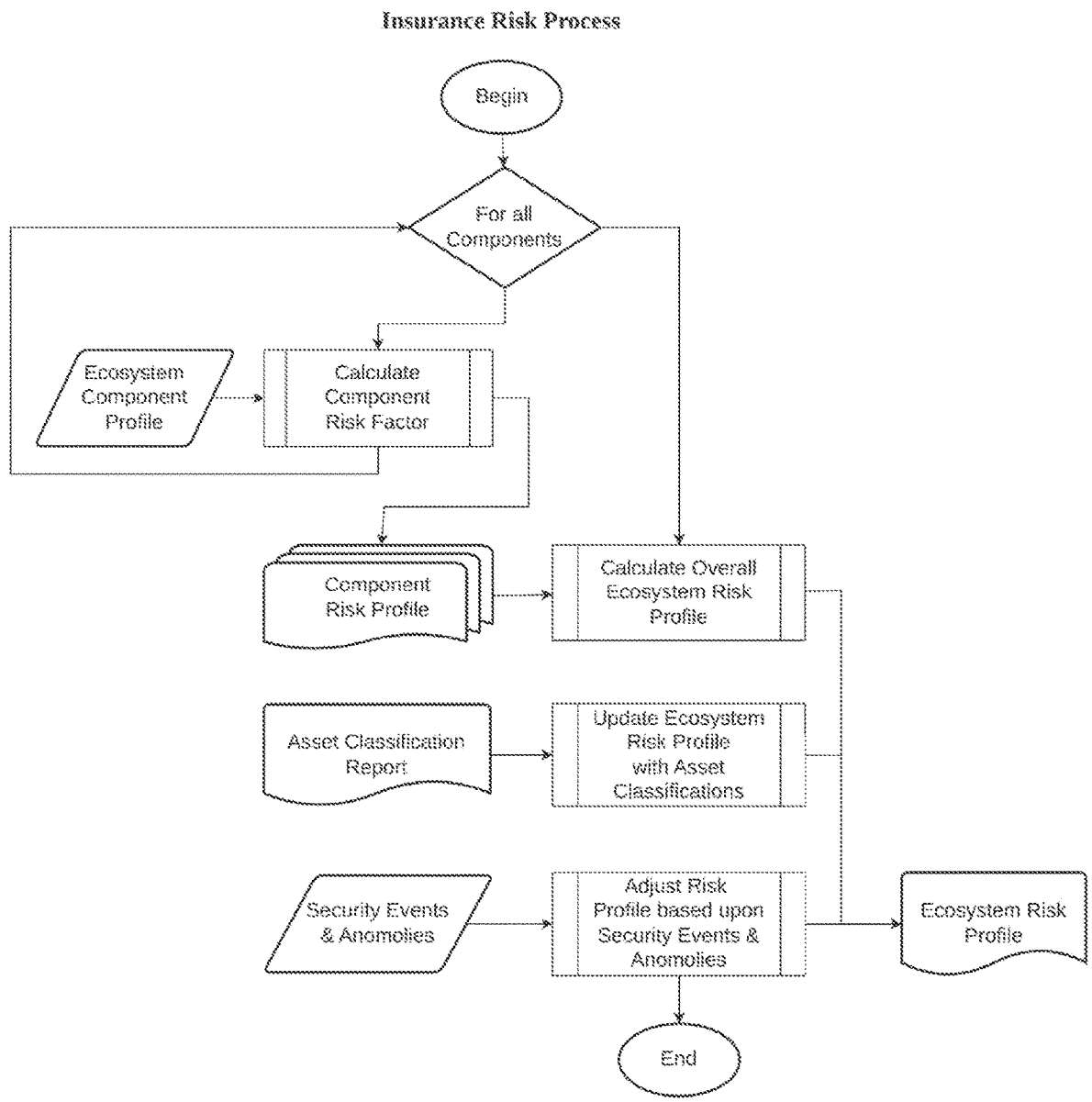
FIG. 23 is an exemplary QPN insurance risk process for generating QSE insurable risk assessment reports (risk profiles), according to embodiments.

In one embodiment the QSE includes the capability to detect botnet activity and attack by identifying abnormal activity and patterns in traffic (see FIG. 23). Anomaly detection and remediation software offers the full automation of decision-making systems based on pre-defined business logic. If anomalous commands are issued they will not be executed leading to a number of options available to the system: do not execute and delete the command; do not execute and quarantine; defer execution until an administrator can review and either approve or disapprove the transaction—if approved then the business logic will need to be updated.

According to embodiments, a generalized cyber security risk assessment and mitigation (treatment) approach may include the steps of: 1) identifying assets and establishing risk acceptance (likelihood of exploit and impact probability); 2) identifying threat sources; 3) identifying vulnerabilities; 4) assessing likelihood of exploitation of a threat event; 5) determining impact (probability or weight-based scoring); 6) calculating risk as a combination of likelihood and impact; 7) evaluating against risk acceptance; 8) developing appropriate risk response; and 9) implementing controls & treatment plan.

According to embodiments, an insurance company can be provided access via a web portal and/or web API that required zero trust access credentials (permissions to RA threat analysis data. They must have a QPAD system (either a QBook or QRouter). They would be provided with specific information to one-or more clients within the QSE as specified by fine grained permissions within the QIAM system. The information provided would be summarized and "cleansed" of any personal independence payment (PIP) or client critical data. This can result in the provision of "redacted" system and network information reports.

Figure 16:
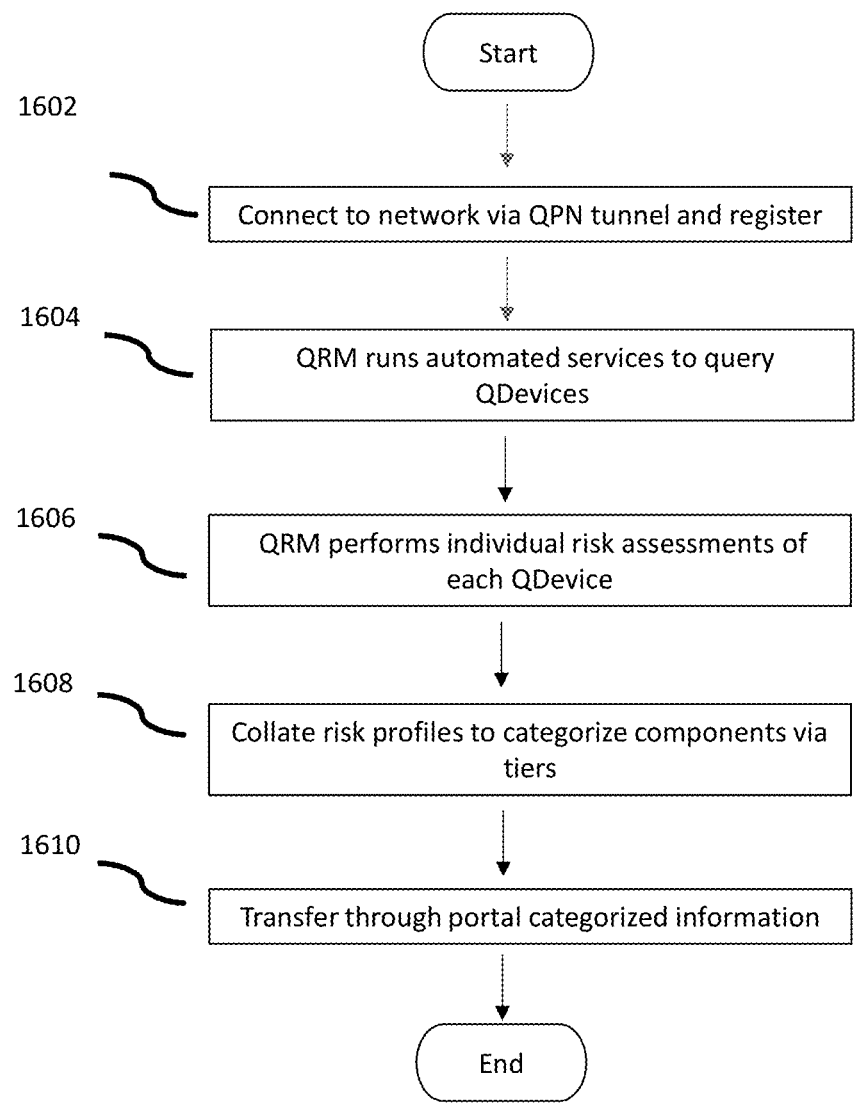
FIG. 16 is a work flow diagram for the provision of cyber security risk assessments and information, according to embodiments.

FIG. 16 is a work flow diagram for the provision of cyber security risk assessments and information, according to embodiments. With reference to FIG. 16 the work flow starts with device startup and when these devices start up and connect to the network 1602 over a QPN tunnel, they register themselves with the QS ecosystem through their QPN network attached QSOC service endpoint (i.e. QGateway). The QRM system runs regular automated services which reach out to the QDevices 1604 and perform a set of introspection processes to gather system (device, operating system, configuration) information and usage information and record this information into a centralized database that QRM utilizes. The QRM then runs a set of algorithms to perform individual risk assessment 1606 on each of the devices, services, and applications that includes end-user device configuration and usage. This information is collated into risk profiles 1608 and reports are generated to categorize the components of the QSE into the different tiers defined above. Based upon the tier categorization, the summarized information 1610 is provided through a web API and/or web portal application to $3^{rd}$ party insurance providers for usage in calculation of insurance policy rates.

Figure 17:
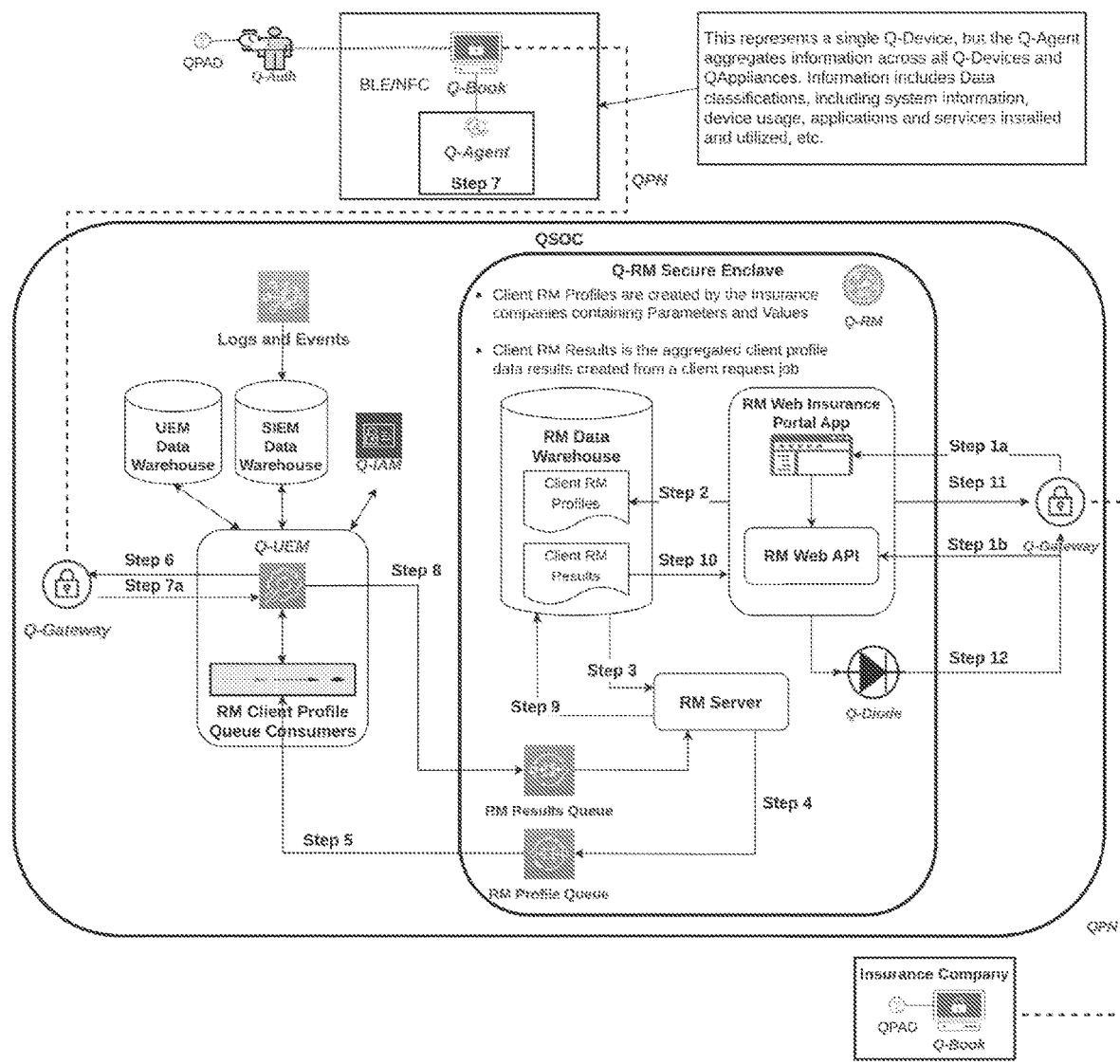
FIG. 17 is a block diagram of a QRM, according to embodiments.

One embodiment of the Quantum Risk Manager (QRM) is described with reference to FIG. 17 (the "QUEM Push Configuration"). Close ups of different portions of the QRM illustrated in FIG. 17 are provided in FIGS. 17A and 17B. The portion of the illustration containing the QUEM Push Configuration is presented in FIG. 17B. In this embodiment, there are several steps illustrated. In Step 1a the Insurance company logs into the RM Web Portal to manage Client Profiles or pull Client RM Results (on request). In Step 1b Insurance company uses Automated API to manage Client Profiles or pull Client RM Results (on request). Step 2 is to update client profile. Step 3 is on schedule, RM server pulls Client Profiles and updates profiles within QSE through RM Profile Queue. Step 4 is RM Server publishes updated Client Profiles to QUEM for processing. In Step 5 Q-UEM consumes and processes different Client RM Profiles. In Step 6 Administrator can push out policy updates on demand. In Step 7, on schedule, based upon device policy, Q-Agent gets device information from Q-Device and sends the data back to QUEM for storage into Data Warehouses. In Step 7a, Q-Agent updates data in warehouses from devices based upon device policy. In Step 8 aggregated Client RM Results are published to the RM Results Queue and stored into RM Data Warehouse. In Step 9 updated Client RM Results are saved. In Step 10 API pulls latest Client RM Results. In Step 11 Insurance company pulls Client RM Results (on request). Step 12 is an alternative to Steps 1a, 1b and 11 where Client RM Results may be pushed to Insurance company through 1-way diode communication channel.

Figure 17A:
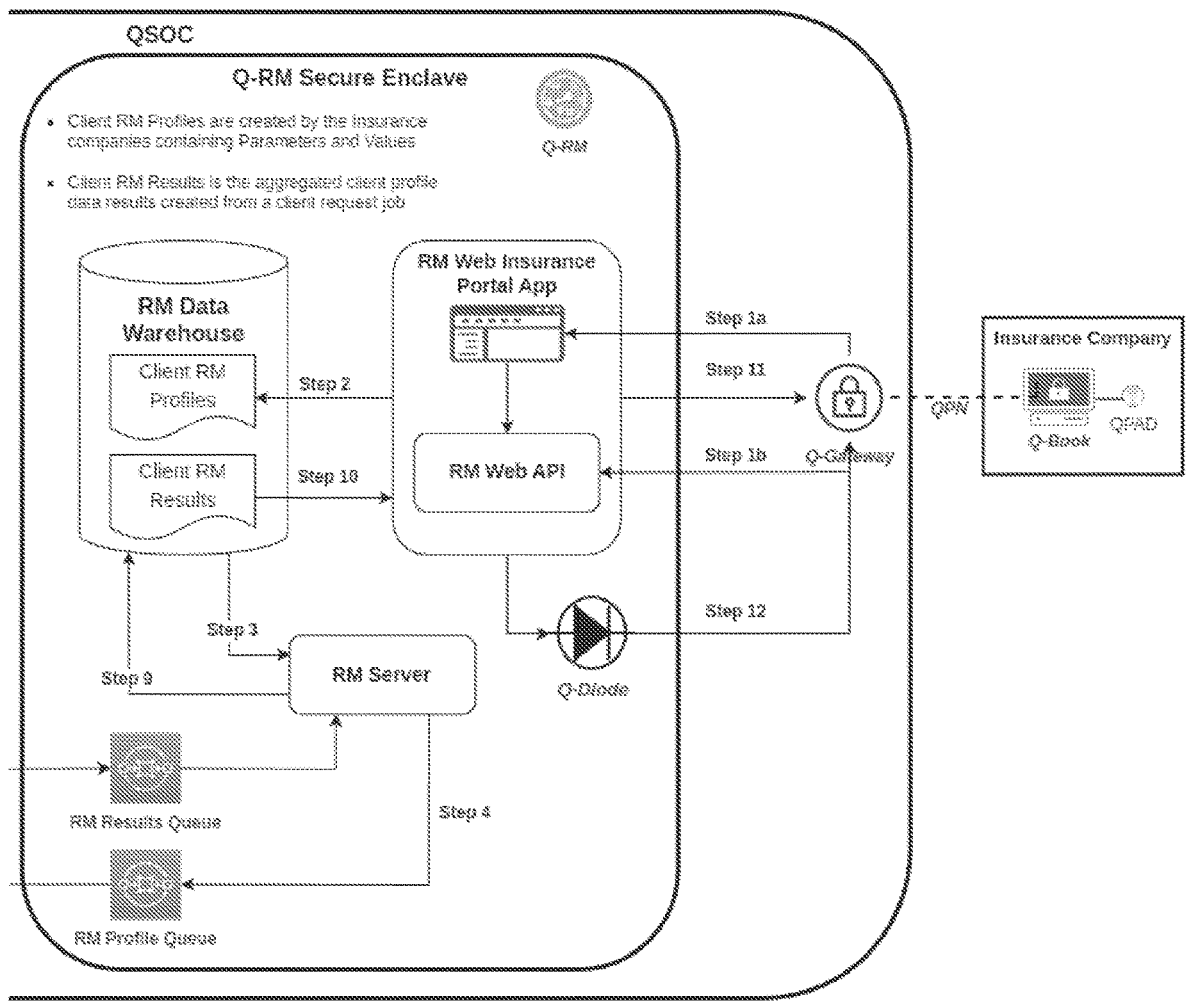
FIG. 17A is a close up of a first portion of the block diagram of a QRM, illustrated in FIG. 17.
Figure 17B:
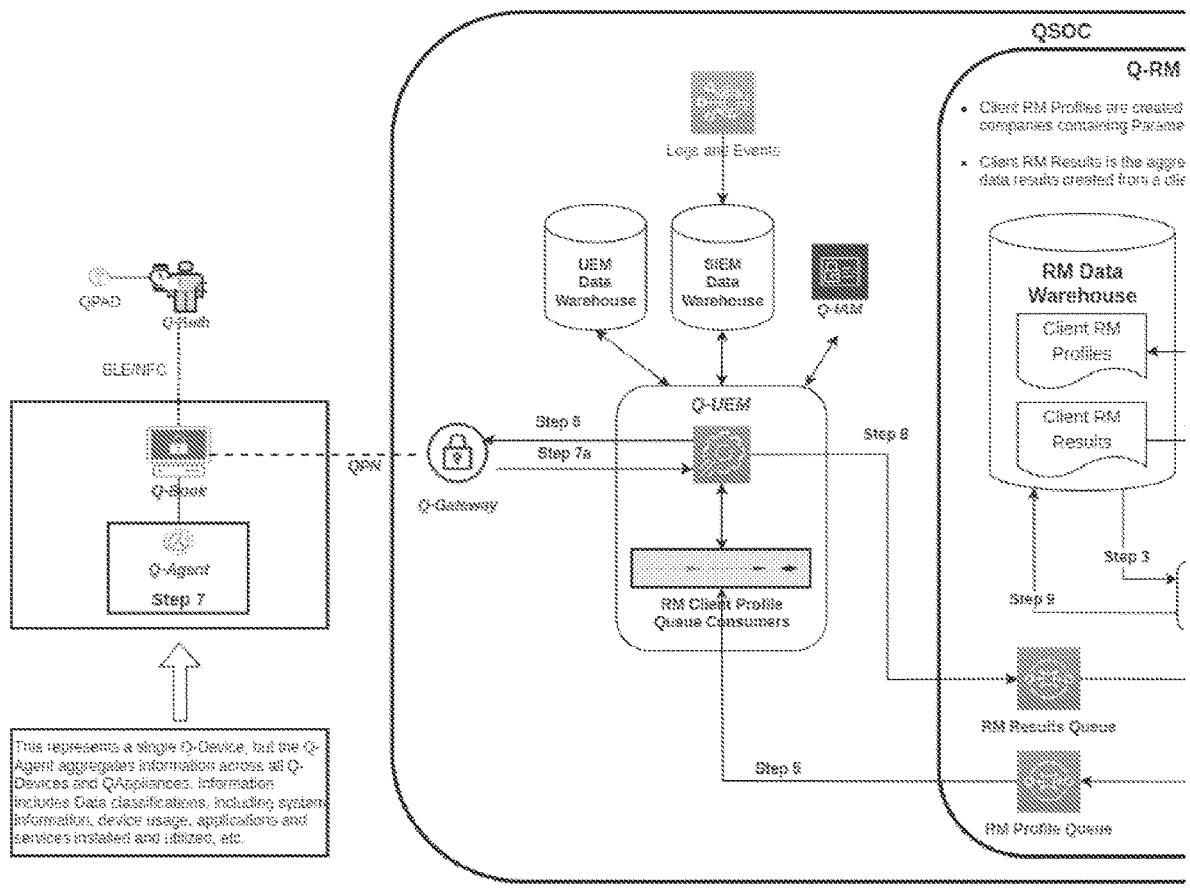
FIG. 17B is a close up of a second portion of the block diagram of a QRM, illustrated in FIG. 17.
Figure 17C:
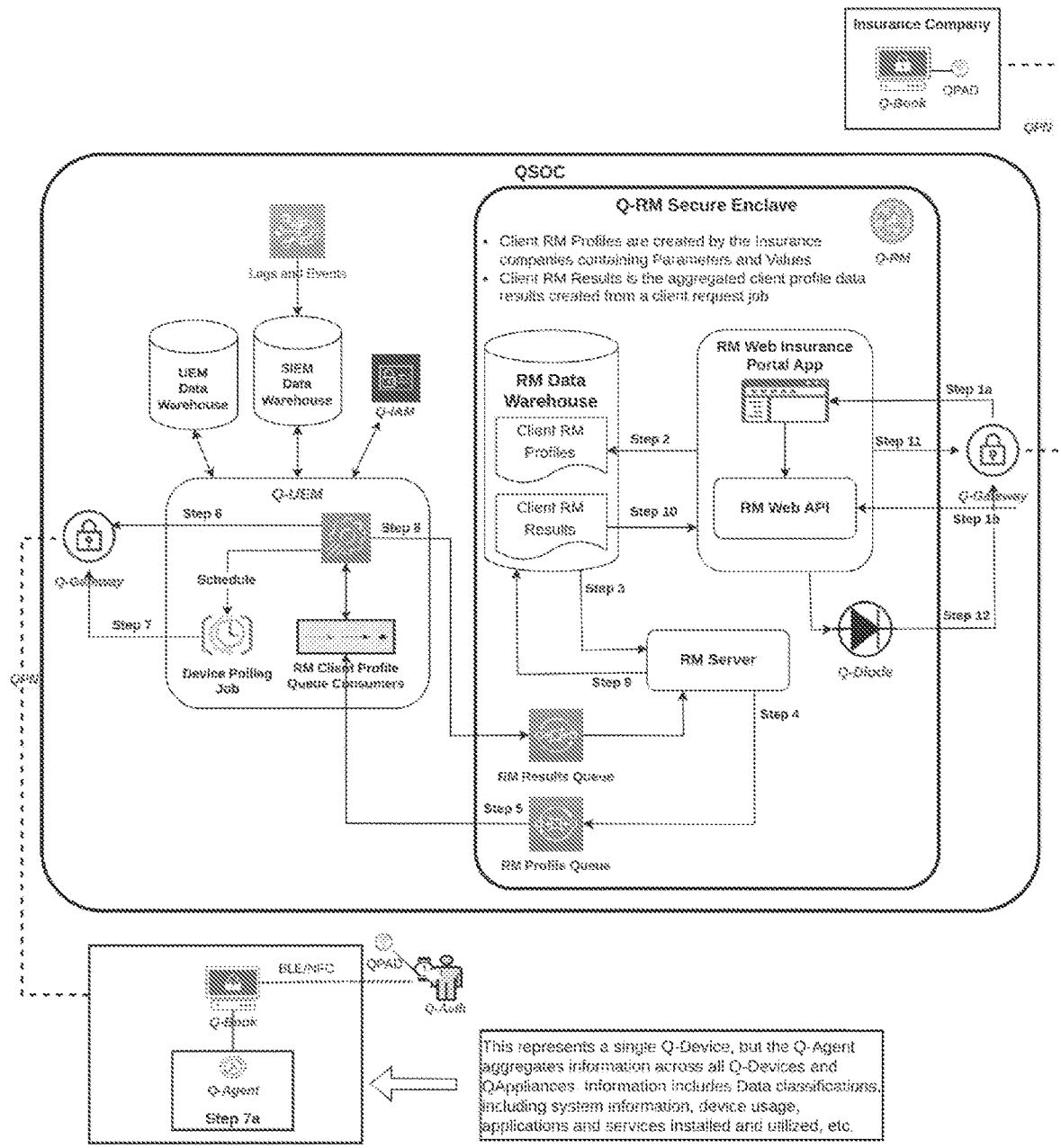
FIG. 17C a block diagram of a QRM, according to embodiments.
Figure 17D:
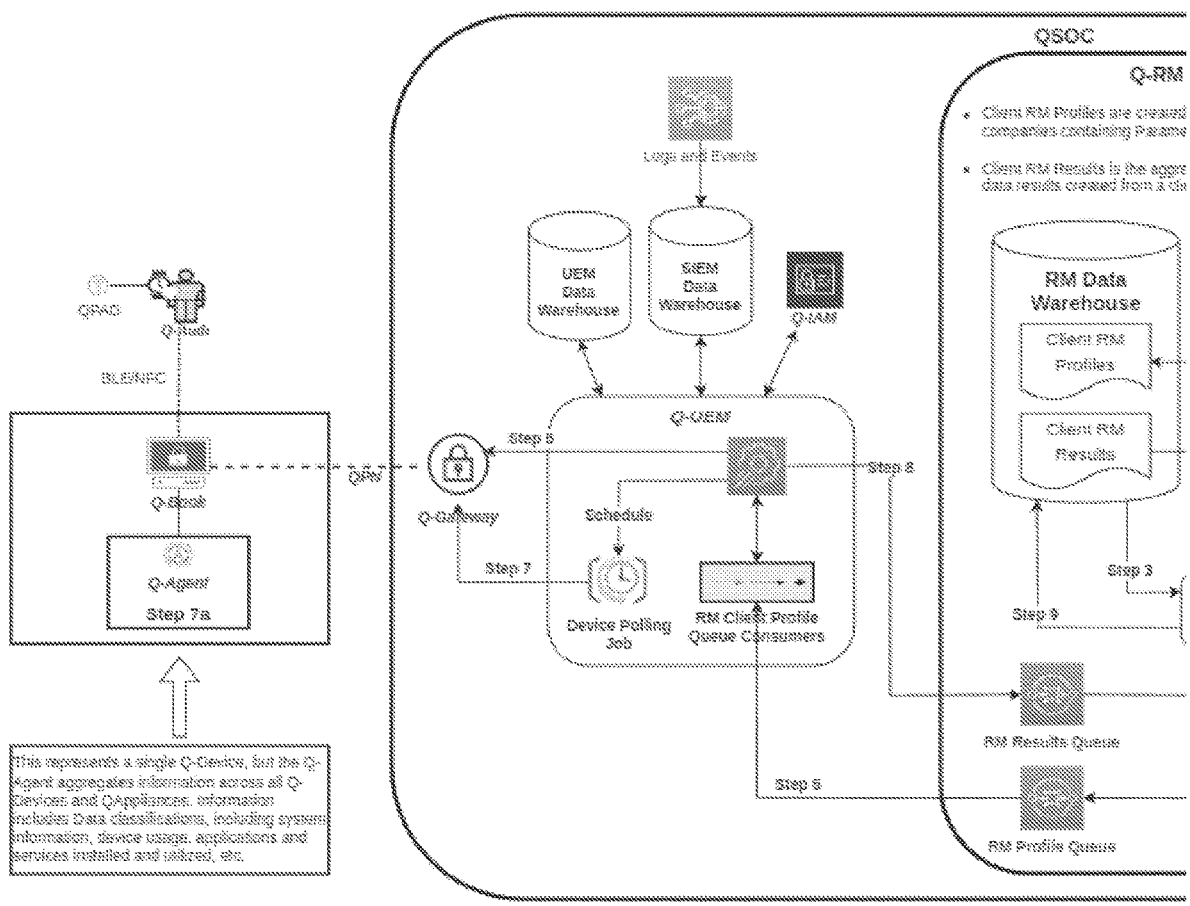
FIG. 17D is a close up of a half portion of the block diagram of a QRM, illustrated in FIG. 17C.

An alternate configuration (the "QUEM Polling Configuration") for the QRM, according to an embodiment is described with reference to FIG. 17C, with a close-up of the portion containing the QUEM Polling Configuration is presented in FIG. 17D. The close-up provided in FIG. 17A is the same for both the QUEM Push Configuration and the QUEM Polling Configuration. In FIG. 17D Steps 7 and 7a differ from those in FIG. 17B as follows. In Step 7, on schedule, poll devices through Q-Agents for information and update of data warehouses. In Step 7a Q-Agent gets device information from Q-Device and sends the data back to QUEM and SIEM Data Warehouse.

According to embodiments, the QAgent is either installed on a QSE managed or unmanaged end user device, or on a QAdapter. The QAgent is the end-user device component responsible for gathering information about the device as requested by a QEUM device policy that includes information requested within a risk management profile.

According to embodiments, the RM Data Warehouse comprises Client RM Profiles, which are created by the Insurance companies and they contain Parameters and Values, etc. The RM Data Warehouse comprises Client RM Results, which include the aggregated client profile data. The RM Web Insurance Portal App obtains the Client RM results.

There are two different pathways for how an Insurance company can engage with the QSE: one pathway (the "Partner Configuration") is described with reference to steps 1a, 1b, and 11 (wherein the Insurance company communicates within the QSE to initiate obtaining a report). Another pathway (the "Diode Configuration") is described for an alternative configuration with reference to step 12, whereby an Insurance company only receives a report, in response to an arrangement and/or request sent to the QSE (e.g., an email request. text request, phone call, etc, without communicating with the QSOC from within the QSE.

Within the Partner Configuration, there are two ways that an Insurance company can engage with the Q-RM Secure Enclave within a QSOC. The insurance company can log into the RM Web App from a securely QPN attached Q-Device, such as a Q-Book or Q-Router, within the Q-RM Secure Enclave to manage client profiles (see step 1a). Alternatively, the Insurance company communicates automatically through the RM Web application programming interface (API) (see step 1b). In some embodiments, this may occur or be available and 24 hours a day, 7 days a week. The Client RM Results are pulled out from the RM Web Insurance Portal App by the Insurance company.

The sequence of events described with reference to steps 1a, 1b, and 11 (the Partner Relationship) are as follows.
  1a. The Insurance company logs into the RM Web Portal to manage Client Profiles or pull Client RM Results (on Request).
  1b. Insurance company uses Automated API to manage Client Profiles or pull Client RM Results (on request).
  2. The Web Insurance Portal updates the Client Profile.

3. On schedule, the RM Server pulls Client Profiles and updates the profiles within the QSE through the RM Profile Queue.
4. The RM Server publishes the updated Client Profiles to the Q-UEM for processing.
5. The Q-UEM consumes and processes the different Client RM Profiles.
6. The QSOC Administrator can push out policy updates on demand to Q-Devices including but not limited to settings requested within Client RM profiles.
7. On schedule, based upon the device policy, the Q-Agent gets device information from each Q-Device that is associated with a device profile, inclusive of settings specified by the Client RM Profile, and sends the data back to the QUEM for storage in the Data Warehouses.
7a. The Q-Agent updates data in warehouses from devices, based upon the relevant device policy.
8. The aggregated Client RM Results are published to the RM Results Queue and stored in the RM Data Warehouse.
9. The RM Server saves the updated Client RM Results in the RM Data Warehouse.
10. The API pulls the latest Client RM Results.
11. The Insurance company pulls Client RM Results (on Request).

The Diode Configuration follows the same overall steps, except that as an alternative to 1a, 1b, and 11, Client RM Results may be pushed to Insurance Company through a 1-way diode communications channel.

The Q-Book and user image in this figure, represents a single Q-Device, but the Q-Agent aggregates information across all Qdevices, Qappliances, applications, services, and IAM user information as may be pertinent to the Client RM Profile. Information includes Data Classifications, including system information, device usage, applications and services installed and utilized, etc.

An alternate configuration (the "QUEM Polling Configuration") for the QRM, according to an embodiment is described with reference to FIG. 17C, with a close-up of the portion containing the QUEM Polling Configuration is presented in FIG. 17D. The close-up provided in FIG. 17A is the same for both the QUEM Push Configuration and the QUEM Polling Configuration.

The sequence of events described with reference to steps 1a, 1b, and 11 (the Partner Relationship) are as follows.
1a. The Insurance company logs into the RM Web Portal to manage Client Profiles or pull Client RM Results (on Request).
1b. Insurance company uses Automated API to manage Client Profiles or pull Client RM Results (on request).
2. The Web Insurance Portal updates the Client Profile.
3. On schedule, the RM Server pulls Client Profiles and updates the profiles within the QSE through the RM Profile Queue.
4. The RM Server publishes the updated Client Profiles to the Q-UEM for processing.
5. The Q-UEM consumes and processes the different Client RM Profiles.
6. The QSOC Administrator can push out device policy updates on demand to one or more selected Q-Devices.
7a. The Q-Agent updates data in warehouses from devices based upon device policy.
8. The aggregated Client RM Results are published to the RM Results Queue and stored in the RM Data Warehouse.
9. The RM Server saves the updated Client RM Results in the RM Data Warehouse.
10. The API pulls the latest Client RM Results.
11. The Insurance company pulls Client RM Results (on Request).

The Diode Configuration follows the same overall steps, except that as an alternative to 1a, 1b, and 11, Client RM Results may be pushed to Insurance Company through a 1-way diode communications channel.

The Q-Book and user image in this figure, represents a single Q-Device, but the Q-Agent aggregates information across all QDevices and QAppliances. Information includes Data Classifications, including system information, device usage, applications and services installed and utilized, etc.

According to embodiments, one or more of the above actions or systems may be enhanced through the use of artificial intelligence. For example, this can be configured as an artificial neural network which models complex relationships between inputs and outputs and find patterns in data. As another example, deep learning may be used wherein deep learning uses several layers of neurons between the network's inputs and outputs. The multiple layers can progressively extract higher-level features from the raw input. A worker skilled in the art would readily understand where and how to implement artificial intelligence in to the instant technology.

Figure 18:
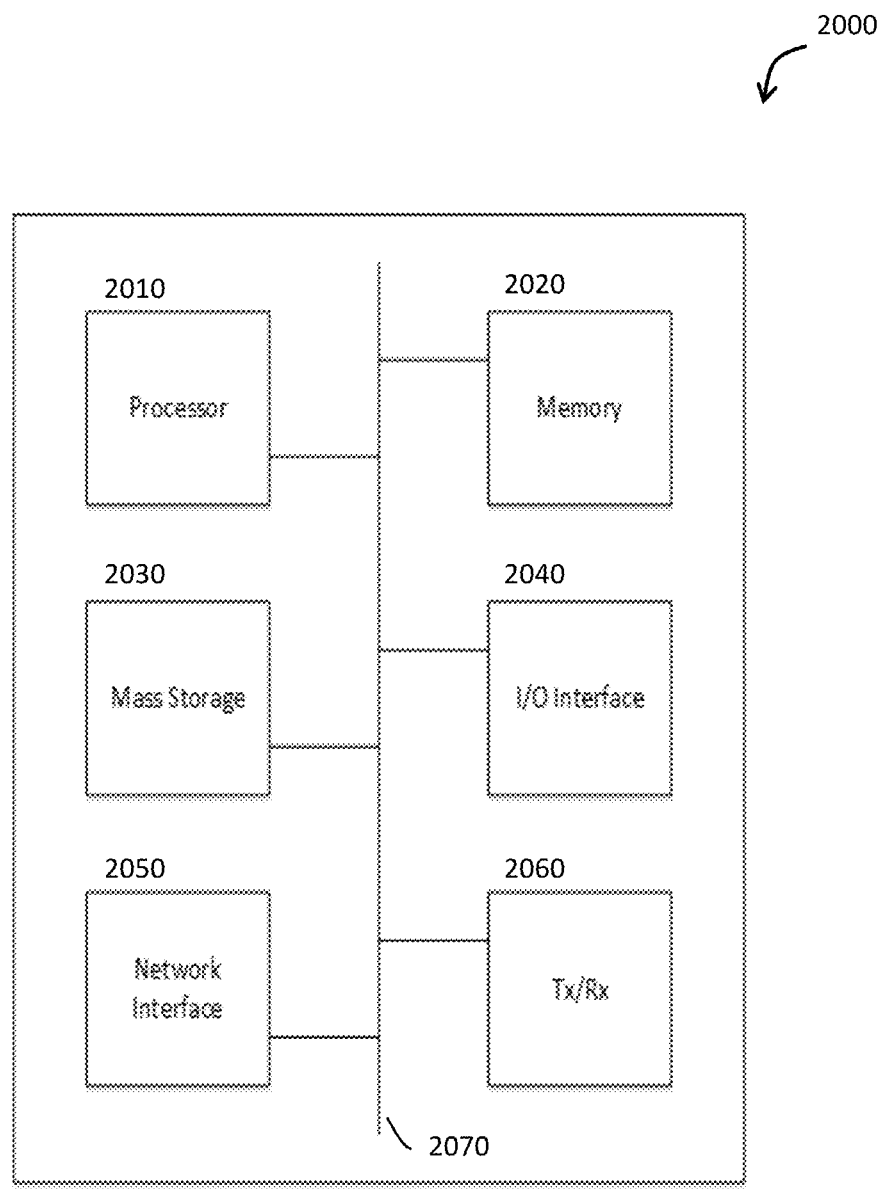
FIG. 18 is a schematic diagram of an electronic device 2000 that may perform any or all of operations of the above methods and features explicitly or implicitly described herein, according to different embodiments of the present disclosure.

FIG. 18 is a schematic diagram of an electronic device 2000 that may perform any or all of operations of the above methods and features explicitly or implicitly described herein, according to different embodiments of the present disclosure. For example, a computer or server may be configured as electronic device 2000. In some embodiments, the electronic device 2000 may be a user equipment (UE), a server, an access point, a station, a gateway, communication network entity, an appliance or the like as would be readily appreciated by a person skilled in the art.

As shown, the electronic device 2000 may include a processor 2010, such as a central processing unit (CPU) or specialized processors such as a graphics processing unit (GPU) or other such processor unit, memory 2020, non-transitory mass storage 2030, input-output interface 2040, network interface 2050, and a transceiver 2060, all of which are communicatively coupled via bi-directional bus 2070. According to certain embodiments, any or all of the depicted elements may be utilized, or only a subset of the elements. Further, electronic device 2000 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 2020 may include any type of non-transitory memory such as static random-access memory (SRAM), dynamic random-access memory (DRAM), synchronous DRAM (SDRAM), read-only memory (ROM), any combination of such, or the like. The mass storage element 2030 may include any type of non-transitory storage device, such as a solid-state drive, hard disk drive, a magnetic disk drive, an optical disk drive, USB drive, or any computer program product configured to store data and machine executable program code. According to certain embodiments, the memory 2020 or mass storage 2030 may have recorded thereon statements and instructions executable by the processor 2010 for performing any of the method operations described above.

Embodiments of the present disclosure can be implemented using electronics hardware, software, or a combination thereof. In some embodiments, the disclosure is implemented by one or multiple computer processors executing program instructions stored in memory. In some embodiments, the disclosure is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, personal digital assistant (PDA), or the like and pursuant to one or more, or a part of one or more, program elements, modules or objects generated from any programming language, such as C/C++, Rust, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disc read-only memory (CD-ROM), USB flash disk, or a removable hard disk. The software product includes instructions that enable a computer device (personal computer, server, or network device) to execute the methods provided in the embodiments of the present disclosure. For example, such an execution may correspond to a simulation of the logical operations as described herein. The software product may additionally or alternatively include instructions that enable a computer device to execute operations for configuring or programming a digital logic apparatus in accordance with embodiments of the present disclosure.

Uses

According to embodiments, uses for the systems and processes (including components thereof) are generally for the purposes of securing digital network environments against cyber security and related privacy risks and for providing solutions to organizations to mitigate risks with access to insurance products based on predictable risk assessments.

According to embodiments, there are unlimited business use cases that can leverage the QSE Ecosystem to secure their computing infrastructures and devices. Two possible use cases are: Supervisory Control and Data Acquisition (SCADA) and Banking Offices but this system is not limited to these two cases. They are just exemplary.

According to embodiments, a primary use case for this solution is securing Supervisory Control and Data Acquisition (SCADA) sites (substations), systems, and devices utilized to monitor industrial facilities such as factory, plant operations, traffic lights, and other Programmable Logic Controller (PLC), Programmable Automation Controllers (PAC), and Remote Terminal Unit (RTU) devices. These devices are used in industrial processes and are part of a nation's industrial and manufacturing infrastructure. SCADA devices are monitored from server control and monitor systems and remote sites. Research from the Ponemon Institute states that "70 percent of companies responsible for the world's water, power and other critical functions reported at least one security breach that led to the loss of confidential information or disruption of operations in the last 12 months." The diagram presented in FIG. 24 presents the many attack vectors upon SCADA infrastructures that QPN can protect against.

According to embodiments, one of the primary issues with SCADA systems is caused by open systems and access to external networks that open the site to attacks from malicious actors. QPN solutions create cryptographically closed systems that secure SCADA devices within the QSE Ecosystem.

According to embodiments, another use case for this solution is securing bank teller systems, automatic teller systems (ATMs), SWIFT terminals and Bloomberg terminals. These systems are commonly built on desktop computer technologies that utilize PKI-based VPN services to communicate over public networks. By using these solutions banks are increasingly at risk from many attack vectors. Rather than adding complex security solutions QPN transforms these desktop computers into dumb terminals that run their applications on virtualized servers within the QSE Ecosystem (i.e. instead of trying to defend against all the attack vectors that these terminals are exposed to, eliminate the threats entirely by converting these terminals into Q-Devices).

To gain a better understanding of the invention described herein, the following examples are set forth. It will be understood that these examples are intended to describe illustrative embodiments of the invention and are not intended to limit the scope of the invention in any way.

EXAMPLES

Example I: Exemplary Ecosystem and Solutions

Secure Architecture

One embodiment of a representative architecture of a secure digital network environment (e.g. Quantum-Safe Ecosystem) is illustrated with reference to FIG. 19 and FIGS. 21A, 21B and 21C. In these examples an embodiment the QSE is referred to as a QPN Ecosystem The architecture consists of different features that are securely deployed within the Ecosystem. Quantum Security Operations Centers (QSOC's) are provided for the exemplary centralized, or delegated, management of a Ecosystem, alternatively referred to in the present disclosure as a QPN Core Ecosystem. A QSOC is a highly available, fault tolerant, scalable, and geographically distributed to meet enterprise level reliability and security requirements and facilitate the building of networks within a QPN Ecosystem Perimeter and in some instances securely connecting this type of a secure digital network environment with networks or environments that go beyond the QPN Ecosystem Perimeter.

Within a QPN Ecosystem, there are several (sub)systems. These include the QPAD Exchange, QPAD Directory and QPAD Distribution Systems.

A QPAD Exchange (QPAD management system) comprises one-time-pad (OTP) key material and libraries attached to Q-Devices and Q-Accessories within a secure digital ecosystem (the QPN Ecosystem) to manage and exchange additional keys in a quantum-safe (QS) manner.

A QPAD Directory provides a QPN Solutions (devices, applications, libraries, services, and processes) that support the ability to manage (provision, revoke, monitor, and control) all devices, users, groups, authentication mechanisms, and permissions within the QPN Ecosystem.

A QPAD Distribution system provides quantum key distribution (QKD) solutions to support distribution of key material used for encrypting data at rest as well as data in flight. In an embodiment, QPN capabilities for prepositioning OTP technology throughout a secure digital network environment avoids the need for QKD enabled delivery of networked OTP technology.

Secure Threat Defense

Figure 20:
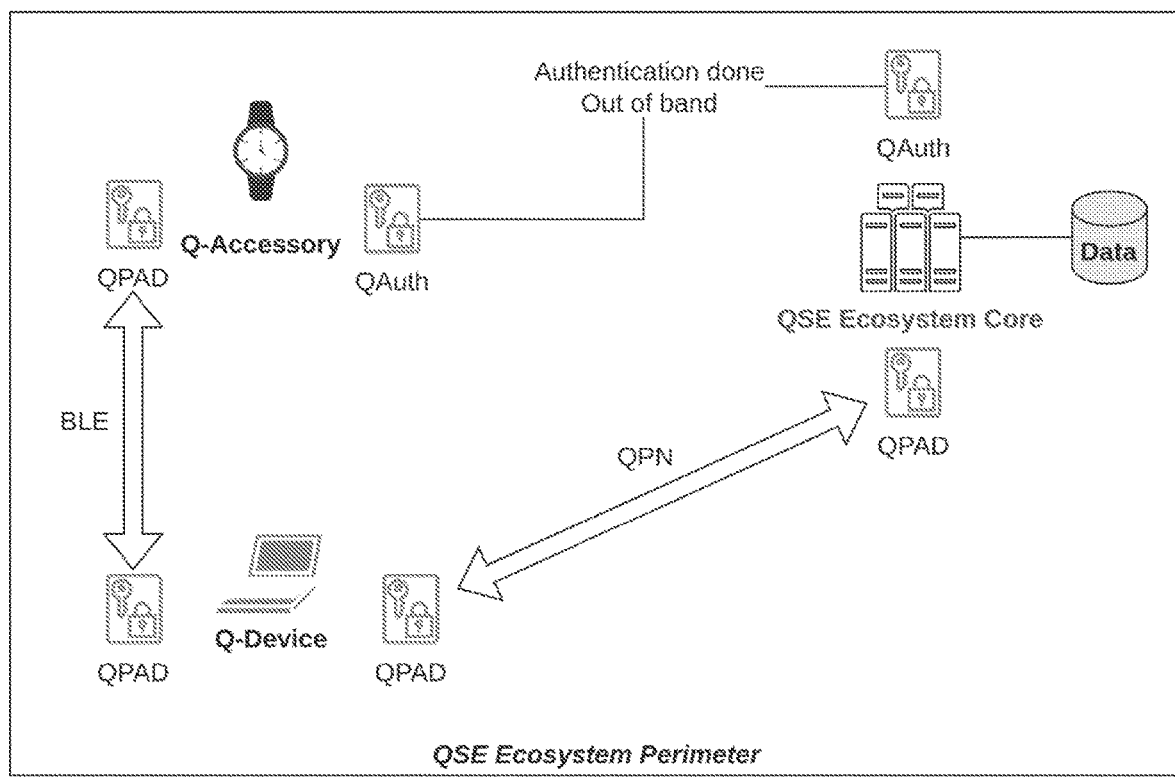
FIG. 20 is a schematic representation of an exemplary QPN multi-factor authentication system for a QSE including core and perimeter components, according to embodiments.

A QPN Ecosystem is configured to apply various lines of defense against cyber security threats including related privacy threats. In one embodiment, a QPN Ecosystem is configured to carry out "Identity and Access Management" (IAM) processes so that only authorized devices (Q-Devices) can access the QPN Ecosystem through their respective, unique QPADs (OTP keys) and they are then further limited to only those services and data that each is authorized to access. Individual users are bound to their QPN enabled devices through multifactor authentication as shown in FIG. 20. Any breach of the user authentication process can, based on individual or organizational security polices (e.g. digital protocols for determining access), prevent the device from retaining access privileges. Organizational (e.g. private and public enterprises) controlled devices (e.g, SCADA controlled devices) are controlled exclusively through QPADs by the QSOC and are restricted from any other types of access. The QPN IAM system combined with rigid whitelist policies prevents phishing, denial of service attacks, email and phone SPAM, as well as insider threats.

In another embodiment, a QPN Ecosystem deploys unbreakable (quantum-safe and future-proof) encryption (QPAD). After participating in the IAM process the QPAD is then used to encrypt all data transmitted between the device and the QPN Ecosystem. All data encrypted with the QPAD is ITS (Information Theoretically Secure) against all cryptographic attacks. Regardless of the extent of the attackers' resources these QPAD encrypted communications will remain quantum-safe. The unbreakable characteristics of QPAD and QPN services prevents man in the middle attacks data harvesting, endpoint device compromise and data loss because the data cannot be found on the devices that are hacked.

In another embodiment a QPN Ecosystem is configured to provide for centralized data storage and prevent data residue on devices. Every device, unless otherwise specified by individual or enterprise (organizational) security polices, acts simply as an access point to the QPN Ecosystem. All data and security keys are protected in the user's secure storage areas within the QPN Ecosystem. Failover and redundancy provisions are defined by security policies. Q Drive ensures that all data is encrypted, centrally protected, remains confidential and available only to the data owner. QPN endpoints (e.g. Q-Devices) feature "no data residue". Lost or stolen devices provide no actionable data and devices and cannot compromise a Q Drive.

Secure Authentication

A QPN Ecosystem deploys one or more authentication mechanisms and processes.

Q-Devices are connected to Q-Accessories (ie. a Bluetooth earpiece) with QPAD encrypted connections (wired or wireless—ie. BLE, 5G) (these QPADs are shared exclusively between Q-Devices and Q-Accessories).

QPAD MFA is embedded into a Q-Accessory (e.g. a wearable such as a watch or earpiece) required as a component of the Identity Access Management (IAM) process for Q-Devices to access the QPN Ecosystem, or to access specific resources within the QPN Ecosystem such as Q-DR's and Q-Applications (QPAD MFA is shared exclusively between a QPAD MFA enabled Q-Accessory and the QPAD Exchange).

QPAD MFA and Q-Accessories can be used outside the QPN Ecosystem for specific purposes (ie. offline physical access solutions such as garage door openers; in this instance the QPADs are shared exclusively between Q-Points and Q-Accessories or Q-Devices). Examples of Q-Points include garage door openers and key fobs to open and start cars. Q-Points must be minted and bound to users with systems inside the QSE but can afterwards be used independent of a current QSE data connection.

Q-Auth may require that the wearable Q-Accessory have user biometric authentication capabilities built-in with match-on-device capabilities.

Secure Communications

A QPN Ecosystem is contemplated to and may provide one or more Q-Services (QPN Solutions). Q-ComSec refers to a unified communication services that enable devices to securely communicate across public and private networks using voice, video, text and data exchanges. Q-ComSec includes Q-Auth protocols and QPN services. Q-Blocks render every block chain technology quantum-safe within the QPN Ecosystem. A Q-Drive provides for quantum-safe (QS) data storage within a QPN Ecosystem. Q-Apps are all software applications hosted within the QPN Ecosystem and rendered quantum-safe using QPN enabling technologies described herein.

Application of a QPN Ecosystem and QPN Solutions: Business and Industrial Scenarios There are unlimited business and industrial use cases that can leverage the QPN Ecosystem to secure their computing infrastructures and devices. Below are follow two exemplary use cases.

A first use case for the application of a QPN Ecosystem and related QPN Solutions provided by it, is for securing Supervisory Control and Data Acquisition (SCADA) sites (substations), systems, and devices utilized to monitor industrial facilities such as factory, plant operations, traffic lights, and other Programmable Logic Controller (PLC), Programmable Automation Controllers (PAC), and Remote Terminal Unit (RTU) devices from server control and monitor systems and remote sites. With reference to FIG. 24, one of the primary issues with SCADA systems is caused by open systems and access to external networks that open the site to attacks from malicious actors. QPN Solutions create cryptographically closed systems that secure SCADA devices within the QPN Ecosystem.

Another use case for the application of a QPN Ecosystem and related QPN Solutions provided by it, is for securing bank teller systems at a branch or corporate offices, or SWIFT and Bloomberg Terminals. These systems are commonly built on desktop computer technologies that utilize PKI-based VPN services to communicate over public networks. By using these solutions banks are increasingly at risk from many attack vectors. Rather than adding complex security solutions QPN transforms these desktop computers into dumb terminals that run their applications on virtualized servers within the QPN Ecosystem (i.e. instead of trying to defend against all the attack vectors that these terminals are exposed to, eliminate the threats entirely by converting these terminals into Q-Devices).

Example II: Cyber and Digital Insurable Risk Management

To address cybersecurity risks organizations must apply best practices to manage their digital systems and processes, as well and seek to mitigate the impact of potential cyber intrusions and attacks by seeking to insure losses, corruption and the theft of data and digital assets. As the insurance industry evolves to meet these types of business needs, the assessment of insurable risk can be achieved in real time using the QPN systems and processes of the present disclosure while at the same time allow organizations to monitor and be responsive to assessed risks.

A data breach, together with associated costs have immediate and long-term consequences including loss of an organizations custodial credibility and diminished reputation. Forensic investigation, operational downtime and future insurance and security costs are added to the accumulated damages. QPN enabled continuous stress testing and attack simulations combined with System Assurance & Audit consistently ensures high values of confidence, reliability, availability and maintainability to provide quantum-safe services to the organization. Quantum-safe services delivered through a QPN Ecosystem translates into business and consumer confidence and insurability for the organization.

In one embodiment, a QPN Ecosystem provides "fully managed" QPN Solutions, whereby all devices that are part of the QPN Ecosystem are centrally managed and controlled, and all network traffic between devices is fully secured leveraging QPAD encryption techniques, methodologies and supporting QPN technologies. It is this approach that makes it possible for provide for unique warranty/insurance bundles and upgrades to provide customer protections from cyber risks. Additionally, the QPN System supports the ability to provide role-based-access-controlled (RBAC) and policy-controlled delegated management of enterprise resources and services, including enterprise owned Q-Appliances, Q-Devices, or specific applications, services or features.

In one embodiment, a QPN Ecosystem provides 5 Tiers of service representing 5 separate security levels. Tier 1 includes devices with no ability to communicate outside the QPN Ecosystem. Tier 2 includes devices with the ability to communicate outside the QPN Ecosystem. Tier 3 includes devices with a physically uploaded Q-App including a QPAD through a removable media product supplied from within the QPN Ecosystem. Tier 4 includes that download a Q-App and are only conventional PKI capable, without any QPAD being included. Tier 5—Devices at each tier will have corresponding warranty/insurance protections and limitations. The supply of devices in all Tiers may be provided by the supplier of QPN Solutions within a QPN Ecosystem. Devices in Tiers 3 and 4 may also be provided or integrated by users wishing to connect their devices into a QPN Ecosystem.

Figure 22:
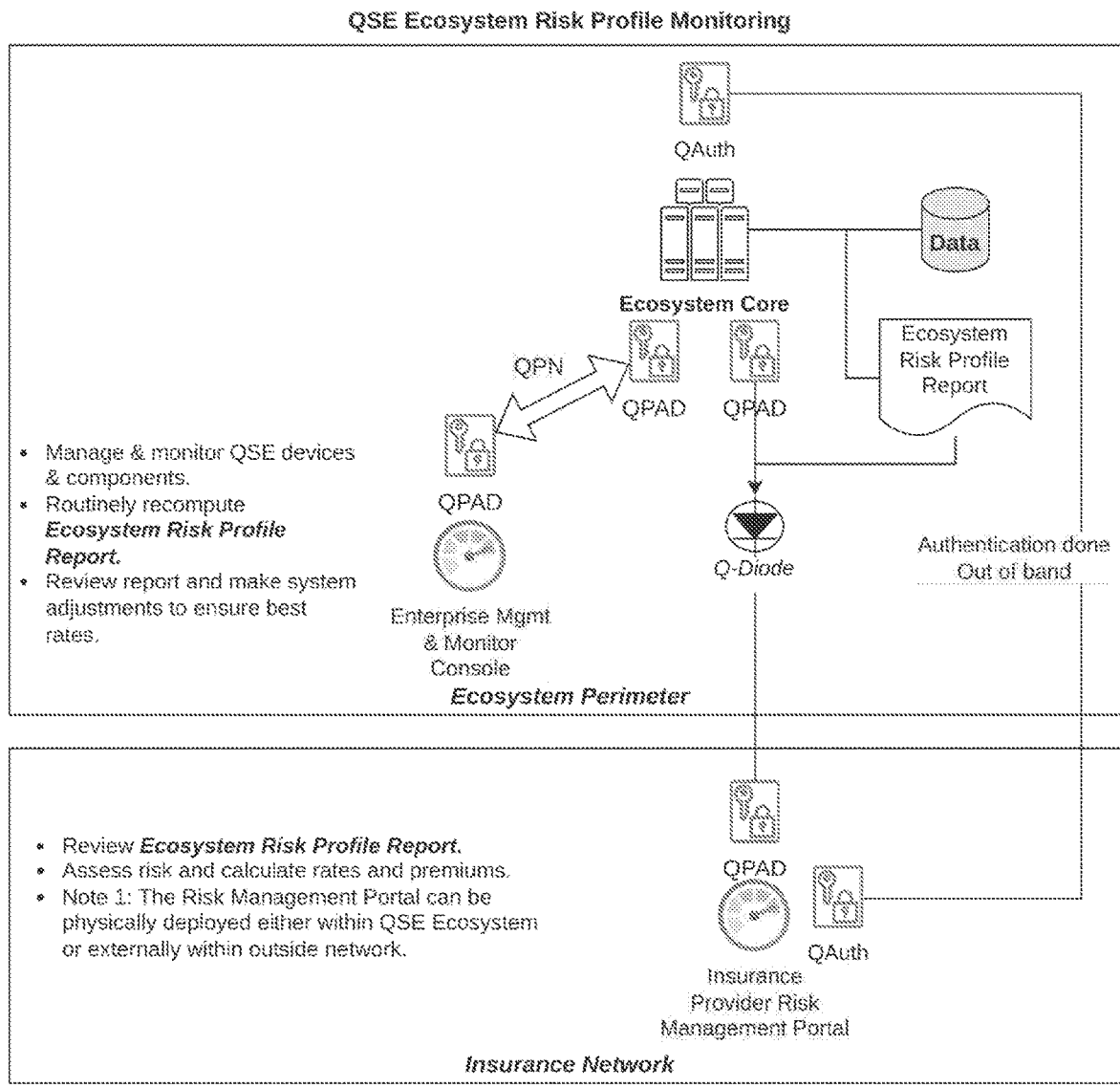
FIG. 22 is a schematic representation of an exemplary QSE risk profile monitoring system and processes for an organization managing a QSE and for insurance providers, according to embodiments.

With reference to FIGS. 22 and 23, QPN Solutions implemented leveraging a QPN Ecosystem provide the assurance that the systems, data, and transmission of information is secure and risk averse and accordingly also support the establishment of insurable risks. Process steps for establishing insurable risks and mitigating them are provided in FIG. 23, which illustrates a risk profile monitoring system configuration including a QPN Ecosystem and Insurance Network, as well as related steps carried out with direct and indirect QPN Ecosystem access, respectively.

Features of the QPN Ecosystem that are used to establish insurable risks and comply with insurance policy parameters include a QPAD Exchange and QPAD Directory. The QPAD Exchange and Directory (sub)systems of a QPN Ecosystem are designed to manage and control keys, appliances and devices, how each of these are bound to users, and their associated privileges and access rights to services. These (sub)systems include a number of security capabilities to detect and address anomalies, as well as conventional technologies to report on security events.

An enterprise (organizational) risk profile can be scored and a report generated within a QPN Ecosystem with regard to a number of factors including but not limited to:

a. The number of devices it manages at each and all security levels, for example using a scoring, ranking, or other type of assessment matrix (e.g. using a number between 1 and 5, with 1 representing the lowest risk and 5 representing the highest risk);

b. The classifications and value of the digital assets managed within the QPN Ecosystem that will determine the required coverage; and c. The number and nature of security events and anomalies.

A number of predictable risk profiles can be generated within a QPN Ecosystem, based uniquely upon the application of QPAD (OTP) processes and be evaluated in real-time to provide an overall risk profile for the QPN Ecosystem that can be used by the organization managing the QPN Ecosystem and a cyber insurance provider. For example, the risk profile of a laptop connected and within a QPN Ecosystem will change the instant that a USB key is inserted into a computer port. This will affect the risk profile for the laptop and as a result, the overall risk profile in a way which is dynamic depending on how devices and the like are being used and how well security policies are being followed and enforced.

The organization managing the risk has direct access to components and systems of the QPN Ecosystem to be able to address risks and make system adjustments to maintain a certain risk profile ranking. The cyber insurance provider has indirect access through a data diode that provides only the ability to receive information relevant to the risk assessment of the QPN Ecosystem, such that variances in the risk profile for a given QPN Ecosystem can support policy design and trigger policy adjustments related to premiums and deductibles in accordance with the terms of a given policy.

Example III

One embodiment of a secure digital network environment is provided by integrating OTP keys as part of quantum-safe data systems solutions (QPN Solutions), including the use of one-time-pad (OTP) keys to encrypt data, support multi-factor authentication and secure all communications between devices in the secure digital network environment. The OTP keys are "pre-loaded" to end-point (EP) devices to render them quantum-safe (QS) when connected into the secure digital network environment, or are otherwise provided through removable media to be loaded into user supplied appliances, devices and accessories to render them QS when connected into the secure digital network environment. The application of QPN Solutions refers to the application of QPN enabled technologies to provide a secure digital network environment includes risk assessment and management solutions for establishing and managing cyber security insurable risks and policies.

One embodiment of a secure digital network environment is a QPN Ecosystem including components, (sub)systems, and processes, that leverage one-time-pad (OTP) keys and libraries, as well as other technologies to secure the digital network environment (QPN Solutions). Communications can be secured between devices (QPN secured devices such as phones, tablets, computers, SCADA devices, and other embedded systems). QPN Solutions help ensure that all communications within a QPN Ecosystem are quantum-safe (QS) against attack vectors from malicious actors using conventional hacking tools, and from future threats anticipated when quantum computing reaches the power necessary to break public key encryption. The perimeter of protection within a QPN Ecosystem extends to Q-Devices, wherever they may be, including when they are connected through public networks.

In one embodiment, a secure digital network environment according to the present disclosure (e.g. a QPN Ecosystem) comprises a security operation center including a number of systems and devices, such as media for providing OTP encryption (e.g. QPADs), an encryption key exchange and management system (e.g. QPAD Exchange), and a system to support network management and control (e.g. QPAD Directory). Additional systems that can be integrated into the architecture of a secure digital network environment (e.g. a QPN Ecosystem) include an encryption generation and distribution system (e.g. QPAD Distribution) for generating and distributing contemplated future quantum key distribution (QKD) solutions used for encrypting data at rest as well as data in flight. In the meantime, however, QPN capabilities for prepositioning OTP technology throughout a secure digital network environment avoids the need for QKD enabled delivery of networked OTP technology.

A secure digital network environment according to the present disclosure represents a reliable foundation upon which competitive digital network environments (ecosystems) as well as independent services can coexist. A list of quantum-safe architecture features that can form part of an exemplary secure digital network environment (i.e. a QPN Ecosystem) is provided in FIGS. 21A, 21B and 21C, including foundational quantum-safe services and capabilities (e.g. QPN Solutions) that can be provided from within the secure digital network environment.

In an embodiment, a secure digital network environment comprises one or more OTP key enabled authentication methods. As illustrated in FIG. 20 for a QPN Ecosystem, QPADs are used to facilitate authentication and permissible communications and transmission between different parts of the QPN Ecosystem, for example, between a QPN Core Ecosystem, Q-Device and Q-Accessory. There is a unique QPAD pair between each instance of two connections.

In another embodiment, a secure digital network environment according to the present disclosure is configured to carry out "Identity and Access Management" (IAM) processes so that only authorized devices can access the network environment through their respective, unique OTP keys.

In another embodiment, a secure digital network environment according to the present disclosure deploys one or more OTP keys to encrypt all communication and other data transmission lines between devices in the secure digital network environment. OTP encryption keys (e.g. QPADs that essentially consist of random key material formatted for use within a QPN Ecosystem) are pre-loaded onto appliances (e.g. Q-Appliances), devices (e.g. Q-Devices) and accessories (e.g. Q-Accessories) connected into a secure digital network environment, or otherwise provided through removable media to be loaded into customer supplied appliances, devices and accessories. In a related embodiment, OTP encryption and more particularly QPAD encryption is contemplated for use to encrypt and decrypt data in an Information Theoretically Secure (ITS) manner and is understood by one skilled in the art to be provably unbreakable.

In a further embodiment a secure digital network environment according to the present disclosure is configured to provide centralized data storage and prevent data residue on devices (see FIGS. 20 and 22). Every device, unless otherwise specified by security policies, acts simply as an access point to the secure digital network environment.

According to an embodiment, the architecture and application of a QPN Ecosystem and related QPN Solutions with reference to FIG. 19 and FIGS. 21A, 21B and 21C.

A secure digital network environment according to the present disclosure has the capability to secure QS communications across public and private networks.

In one embodiment, communications between one or more sites (substations) of a secure digital network environment are secured by establishing one or more data centers each using a QPN enabled Router (a point-to-multipoint solution) or QPN enabled Stream Cipher (strictly a point-to-point solution) whereby all traffic from the site's local area network is encrypted leveraging OTP key technologies and integrated into the organization's wide area network.

Securing individual end-point devices, such as computers, laptops, tablets, phones, Internet of Things (IoT) connected devices, SCADA devices (PLC's, PAC's, RTU's) throughout an organization with one or more data centers within a secure digital network environment according to the present disclosure (e.g within a QPN Ecosystem) comprises providing QPN enabled embedded devices and adapters.

In one embodiment OTP key technology is embedded on one or more devices, such as phones, tablets, computers and SCADA devices. In the exemplary QPN Ecosystem illustrated in FIGS. 19 and 20, devices are provisioned within the organization using Q-Initialization Stations to load Q-Apps with QPADs and are managed and controlled within the QPN Ecosystem. Examples of embedded device use cases include replacing existing computers with Q-Books or Q-Tablets that use VDI (Virtual Desktop Infrastructure) images to connect them to the QPN Ecosystem (such as bank teller terminals). Additional uses would include developing new PLC, PAC, or RTU SCADA devices, or customized IoT devices such as security cameras and traffic signals.

Bump-In-The-Wire (BITW) communication devices (adapters) are QPN enabled network devices (using OTP keys) that are physically attached to existing (legacy) systems, and pre-loaded with QPN enabled applications and OTP keys to support encrypted QS communications. QPN enabled adapters encrypt/decrypt data across the logical network link without altering the communication endpoints. They can be attached to physical device's network ports such as RJ45, USB attached or other communication ports.

For the device to communicate to the network it will send and receive data through the QPN enabled adapter that will encrypt/decrypt the data utilizing the OTP libraries and OTP key material pre-loaded on the QPN enabled adapter. This adapter will then route the network traffic securely across the network to a paired QPN enabled Router or QPN enabled Stream Cipher that will have the shared OTP key also pre-loaded. The QPN enabled Router or QPN enabled StreamCipher will then route the data to the paired end-point to which the device was communicating after decrypting the network packets received from the QPN enabled Adapter Example IV In a secure digital network environment according to the present disclosure, underlying user devices, endpoints, systems, and infrastructure components must be built first with security policies and patterns that ultimately provide the assurance that the systems, data, and transmission of information is secure and risk averse.

In one embodiment, quantum-safe data systems (QPN) enabled technologies are used to secure a digital network environment against cyber security threats. OTP keys, "Secure by Design" principles and one or more traditional security implementation concepts are applied to achieve this, as described herein. The resulting secure digital network environment is exemplified herein as a QPN Ecosystem that delivers QPN Solutions.

Security and data privacy risk is the association (and weighted risk assessment probability) of a cyber security threat being successful via an attack vector. QPN Solutions are implemented leveraging a QPN Ecosystem by following "Secure by Design" principles. Traditional security implementation concepts are also implemented as part of QPN design, including "Defense in Depth, "Zero Trust", and "Behavior Analytics/Anomaly Detection" approaches. An assumption that "you will be attacked" forms the basis of all decisions made when building out a system to meet Secure by Design criteria.

"Secure By Design" software and hardware products and capabilities are designed to be foundationally secure. Malicious attacks on software should be assumed to occur. Care is taken to minimize impact. Security vulnerabilities are anticipated. Designs that work well do not rely on being secret. Security through obscurity is avoided. Secure by Design tactics and patterns provide solutions for enforcing the necessary authentication, authorization, confidentiality, data integrity, privacy, accountability, availability, safety, and non-repudiation.

"Defense in Depth (DID)" is a multi-layer controls approach for information security and is a methodology was meant to delay; not prevent the advance of an attack. DID, also known as the castle defense, is akin to putting a barrier in front of an adversary that they must penetrate or circumvent. The building of higher walls (more barriers, additional redundancies) can only go so far before another avenue of attack is discovered, or a taller ladder is built. Attack and threat intelligence should be shared, adaptive and behavioral characteristics understood. Building a higher wall or adding a second moat is not the answer, especially if the infiltrator is already inside.

The "Zero Trust" model is a shift from traditional perimeter-based security to a model that is user and device centric. "All users are untrusted". Identity and Access management (IAM) are at the core of a zero-trust implementation combined with advanced analytics, Artificial Intelligence (AI) and machine learning. Access management is critical, evaluating identity, ensuring that a user is who they say they are, using the devices they should be and accessing the network from authorized locations. All devices, applications, services, components, and systems with the QS Ecosystem follow the NIST Zero Trust security model, and leverage centrally managed policies stored within Q-PO providing an implementation of a NIST Zero Trust PDP—Policy Definition Point. Throughout the QS Ecosystems, devices, applications, and services provide localized policy enforcement within QS Policy Engines implementing NIST PEP—Policy Enforcement Point access control based upon both device and user identity and authorization policies.

"System Behavior Analytics" is primarily focused on the detection of insider threats, advanced persistent threats, targeted attacks, and fraudulent activity. Systems in a steady state operational environment can be foot-printed through patterns of behavior. These patterns are analyzed for anomalies that can indicate a potential threat. Automated threat responses built into the system suspend and/or sandbox the activities until verified and validated by an operator. Q-Appliances and Q-Devices run Q-Agent software which performs automated always on monitoring of Q-Appliances and Q-Devices and performs system behavior analytics. Upon identification of an anomalous activity "QPN Security Fabric" is a cyber security platform, providing visibility and protection of the organizations attack surface; integrating solutions leveraging threat intelligence while reducing management complexity; and AI and automation tools to provide network self-healing and automated incident and response protocols.

"SOAR", which stands for "Security Orchestration, Automation and Response" software technology, allows an organization to collect and monitor security events and execute automated workflow and playbook responses to incidents. This may be combined with other AI automation tools and orchestration. All Q-Devices, applications, and services track and log events and publish them to a centrally managed SIEM system which is accessible by SOAR AI automation tools and orchestration. In the event that there is an anomalous event that requires specific device changes, such as taking a quarantining a device or revoking device access from a specific user, the SOAR systems will perform this action remotely through the Q-Agent running on the device in question.

"SIEM", which stands for "Security Information and Event Management" is a set of technology tools that collect logging and event information in real-time across the enterprise to provide a consolidated view of all information security systems. QPN SIEM is integrated with SOAR and a QSOC (Quantum Security Operations Center), and forms part of the overall QPN Security Fabric. As stated above in the SOAR section, all Q-Devices, applications, and services track and log events and publish them to a centrally managed SIEM system, where AI and automated processes can perform workflows in response to different types of events.

"Continuous Monitoring & Managed Detection & Response (MDR)", is part of the QPN Security Fabric and includes the implementation of 24/7 security monitoring combined with MDR capabilities to provide additional threat hunting, correlation, and threat response actions in response to security alerts occurring within the security infrastructure.

"Stress Testing with Incident Response Planning and Playbook Development" refers to proactively conduct system stress testing and conduct attack simulations to test out the organizations Incident Response (IR) handling and incident response plans. IR playbooks are developed, and plans updated on a regular basis. Stress testing also includes vulnerability scanning, penetration testing and red team attack simulation and active exploits.

"QPN UEM" (Unified Endpoint Management) is combined with strong IAM to allow security team visibility into suspicious activity on company devices as well as allowable Bring Your Own Device (BYOD). BYODs not used at stricter levels of security management (e.g. Tier 1 and Tier 2 levels as described in Example 2). The ability to monitor and control inaccessible Internet of Things (IoT) and endpoint devices allows speedy investigation and response to incidents or loss, including device isolation and damage control. Managed Q-Devices (Tier 1 and Tier 2) run Q-Agent as a privileged process upon them. For unmanaged BYOD devices, Q-Agent can be installed as a software application to provide some levels of endpoint management, although not as sophisticated to that of managed devices.

"Audit, Security Governance, Policy and Certification" refers to managing security risks using an Information Security Management System (ISMS) that is regularly reviewed and updated. A QSE ISMS includes Security Governance, audit requirements, policy development and security controls implementation. In one embodiment, a QPN Solution of this type is based on ISO 27001 for its ISMS framework in addition to the NIST 800 series Cyber Security Frameworks.

"Data Classification, Retention Policy & Encryption" is for addressing data security risks and refers to the proper identification of information assets needed to determine what must be protected. Data assets are inventoried, controlled, and classified according to sensitivity, and encrypted while in motion and at rest. Highly sensitive information is separated from the rest of the business with multisig (multiple signatures) access controls and hardware security.

Security Threats Addressed by QPN Solutions

Attack vectors (passive and active) are methods of achieving unauthorized access to a network or system to allow a cyber-attack to take place. A cyber-attack may exploit a system vulnerability or weakness to manipulate the system, gain access, extract data, or deliver a malicious payload. They allow cybercriminals to exploit system vulnerabilities to gain access to sensitive data, personally identifiable information (PII), and other valuable information accessible after a data breach.

In one embodiment a solution (e.g. a QPN Solution embodied as part of a QPN Ecosystem) is provided to counter or mitigate "Passive Attack Vector" exploits, which typically relies on the lack of security awareness of users to obtain information and mount an active attack and include social engineering, phishing, and URL hijacking (typo squatting). The QPN Solution embodied in and leveraged from within a QPN Ecosystem that is designed to address a Passive Attack Vector can be implemented through the application of one or more components, systems and/or processes.

In another embodiment a solution (e.g. a QPN Solution embodied as part of a QPN Ecosystem) is provided to counter or mitigate a cyber security threat implemented through one or more attack vectors set out in FIG. 25. A QPN Solution embodied in and leveraged from within a QPN Ecosystem that is designed to address said attack vectors can be implemented through the application of one or more components, systems and/or processes.

In a further embodiment, a solution (e.g. a QPN Solution embodied as part of a QPN Ecosystem) is provided to counter or mitigate a Digital Harvesting Threat, namely those posed by Nation-state actors that are storing encrypted network and data transmissions (harvesting data), so that they can decrypt and gain access using quantum computers as and when they are available. A QPN Solution embodied in and leveraged from within a QPN Ecosystem that is designed to address such threats can be implemented through the application of one or more components, systems and/or processes.

In yet another embodiment, a solution (e.g. a QPN Solution embodied as part of a QPN Ecosystem) is provided to counter or mitigate an adversarial, or a nation-state threat, often sponsored by a foreign government launching cyber-attacks against another government, or the business, and infrastructure of a given nation. Such state sponsored attacks are carried out by groups conducting espionage. They employ stealth, subterfuge, and weaponized technologies to wage cyberwar against countries and organizations, and will be the first to develop or acquire quantum computing capabilities, as will well-funded criminal and terrorist organizations. Nation-state threats also involve advanced persistent threat (APT) groups, most often under government employ, who focus on long term cyber-attacks where the actors gain access to the network and remain undetected for a prolonged period. All of these threats are difficult to defend against as they are extremely well funded and utilize the most advanced technologies and highly trained personnel. A QPN Solution embodied in and leveraged from within a QPN Ecosystem that is designed to address such adversarial threats can be implemented through the application of one or more of its components, systems and/or processes.

Digital Harvesting and Adversarial Threats are examples of active (cyber security) threats. In an embodiment, a solution (e.g. a QPN Solution embodied as part of a QPN Ecosystem) is used to counter or mitigate one or more active threats as set out in FIG. 26. A QPN Solution embodied in and leveraged from within a QPN Ecosystem to address active threats can be implemented through the application of one or more of its components, systems and/or processes.

In another embodiment, a solution (e.g. a QPN Solution embodied as part of a QPN Ecosystem) is provided to counter or mitigate one or more active (cyber security) threats originating from a threat source set out in FIG. 27, including adversarial, accidental, structural and environmental threat sources. A QPN Solution embodied in and leveraged from within a QPN Ecosystem to address sources of active threats can be implemented through the application of one or more of its components, systems and/or processes.

In a further embodiment, a solution (e.g. a QPN Solution embodied as part of a QPN Ecosystem) is provided to counter or mitigate one or more malicious software threats such as botnets, Trojans and other similar means of launching malicious software to affect Internet of Things (IoT) systems. A QPN Solution embodied in and leveraged from within a QPN Ecosystem to address malicious software threats can be implemented through the application of one or more components, systems and/or processes.

Botnets, or networked computing robots are a collection (in many cases tens of thousands) of internet connected computers running any number of malicious software payloads. Botnets can remain dormant and undetected for long periods of time until their remote-control operators activate the software via a command-and-control system or server running in a remote data center cloud instance or other location. Botnets are a major threat to web applications, especially e-commerce, IoT devices and mobile devices. Botnets are capable of initiating Denial of Service (DOS) attacks, credential stealing and identity theft, mass SPAM delivery, brute force hacking, crypto mining, and delivery of ransomware. Exemplary botnets are cloud and mobil botnets, and other known botnets such as Emotet, TrickBot, Dridex, Joker, CryCryptor, and EventBot. A design feature of a secure digital network environment according to the present disclosure is the capability to detect botnet activity and attack by identifying abnormal activity and patterns in traffic (see FIG. 23).

FIG. 28 is a table listing one embodiment of QSE components, according to embodiments.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any modifications, variations, combinations, or equivalents that fall within the scope of the present invention.

What is claimed is:

1. A system configured to create a quantum-safe ecosystem (QSE), the QSE providing a quantum private network (QPN) using shared symmetric keys and quantum one-time pad (QPAD) ciphers, for communication between a first device and a second device, the system comprising:
a quantum identity and access management service (QIAM) configured to manage user and device identity, access, and authorization services within the QSE;
a first QPAD and a second QPAD, each configured to encrypt the communication between the first device and the second device,
wherein the first QPAD and the second QPAD are minted and centrally managed by a quantum key management system (QKMS) within the QSE,
wherein the first QPAD is stored on the first device and is uniquely associated with the first device, and
wherein the second QPAD is stored on the second device and is uniquely associated with the second device; and
a quantum gateway operatively connected to the QIAM, the quantum gateway configured for access by the first device and the second device and to facilitate the communication between the first device and the second device through the QSE.

2. The system according to claim 1, further comprising a quantum random number generator (QRNG), the QRNG configured to generate quantum-safe random numbers for use in the first QPAD and the second QPAD.

3. The system according to claim 1, wherein the first QPAD and the second QPAD each comprise multiple sets of true random number generator (TRNG) bytes of key data sequenced in a sequentially ordered fashion.

4. The system according to claim 1, further comprising one or more quantum universal endpoint managers (QUEM), wherein each QUEM is configured to manage devices deployed throughout the QSE.

5. The system according to claim 1, further comprising one or more quantum policy orchestrators (QPO), wherein each QPO is configured to manage and deliver zero trust policy services within the QSE and wherein each QPO is configured to orchestrate one or more of user, group, or other security policies for providing access and control to the QSE.

6. The system according to claim 1, further comprising one or more quantum user and endpoint device authorization (QAuth) services, wherein each QAuth is configured to interface with the QIAM to remotely manage one or more devices associated with the QSE.

7. The system according to claim 1, further comprising one or more firewalls, wherein each firewall is configured to provide capabilities including one or more zero trust access, ingress and/or egress, and network traffic inspection, the firewall providing the capabilities between devices, platforms, applications and services within and between different systems outside of the QSE.

8. The system according to claim 1, further comprising one or more endpoint management services (QAgent), wherein the QAgent is installed or operatively connected with a particular device and wherein the QAgent is operative to interact with the system for access of the QSE by the particular device.

9. The system according to claim 1, further comprising one or more quantum risk managers (QRM), wherein the QRM is configured to assess and manage risk within the QSE and one or more devices operative within the QSE.

10. The system according to claim 1, further comprising a QRouter deployed at a location remote from the system, wherein the QRouter is configured to secure a remote communication tunnel with the system.

11. The system according to claim 1, further comprising a QAdapter configured to bind with a specific remote device, wherein upon binding of the QAdapter to the specific remote device, the QAdapter communicates with the system for establishing the QPN for communication within the QSE by the specific remote device.

12. The system of claim 11, wherein the QAdapter is a hardware device comprising:
a removable media device comprising:
an external disk drive or persistent memory subsystem component storing:
a QPAD; and
executable code for enabling secure communication and functionality; and
a QSE client subsystem operable on the removable media device, eliminating a need for preinstallation of the QSE client subsystem on the removable media device,
wherein the removable media device is configured to:
be attached to a computing device via a connection interface;
enable a user to securely connect to the QSE using the QPAD;
utilize QPN software stored on the QAdapter to establish an encrypted network tunnel for communication;
support Bring Your Own Device (BYOD) solutions, or other types of computing devices by allowing the user to securely connect a BYOD device to a Quantum Secure Operations Center (QSOC) using the QPAD and the QPN; and
be bound to the BYOD device, thereby ensuring the removable media device can only be used in association with the BYOD device,
wherein, when connected to the BYOD device, the removable media device is further configured to:
authenticate the user, via the BYOD device, using the QPAD; and facilitate secure communication between the BYOD device and the QSOC using the encrypted network tunnel, and wherein the removable media device distinguishes its functionality from a preconfigured device by providing QSE-related functionalities directly through the QAdapter without requiring preinstallation on the removable media device.

13. The system of claim 1, wherein the first device comprises at least one of an application, an API, a service, a library, and/or an embedded system.

14. The system of claim 3, wherein the first QPAD and the second QPAD form a unique pair, and wherein the first QPAD and the second QPAD share identical key data.

15. A second system for quantum user and endpoint device authorization (QAuth), created by the system according to claim 1, comprising:

a quantum user and identity access management (QIAM) system configured to:

provision, manage, and validate user credentials and device fingerprints for secure authentication and authorization within a quantum-safe ecosystem (QSE);

one or more QAuth services configured to:

interface with the QIAM to support multi-factor authentication (MFA) mechanisms for users, devices, and services within the QSE;

manage operational characteristics of devices, services, APIs, libraries, and users; and enforce security policies through centralized or federated identity directories; and a quantum security operations center (QSOC) configured to:

operate QAuth services to remotely manage and enforce access policies for users and devices; and support authentication mechanisms using biometric data, the device fingerprints, and encrypted credentials stored in the first QPAD or the second QPAD.

16. A system, comprising:

a Quantum-Safe one-time pad (QPAD) implemented as an integrated cryptographic object comprising:

a plurality of one-time-use cryptographic keys generated from quantum-safe entropy sources;

metadata for managing key properties and states, wherein the metadata is extensible and comprises associated data encapsulating properties;

mechanisms for secure encryption and distribution of key material; and key data, comprising a structured sequence of random cryptographic key material, generated using quantum-safe random number generators (QRNGs), wherein the key data is consumable, expandable, and auditable.

17. The system of claim 16, wherein two QPADs form a unique QPAD pair and contain identical key data.

18. The system of claim 17, further comprising a first device and a second device configured to communicate over a quantum private network (QPN) using the unique QPAD pair.

19. A method for securely transmitting information from a first device to a second device, wherein on the first device, the method comprises:

decrypting a first quantum one-time pad (QPAD), wherein the first QPAD comprises:

a first key data; and a first usage property;

encrypting the information, using a first key data portion of the first key data, to obtain encrypted information;

modifying the first usage property to indicate that the first key data portion is consumed; and sending, to the second device, the encrypted information.

20. The method of claim 19, wherein on the second device, the method further comprises:

receiving the encrypted information;

decrypting a second QPAD, wherein the second QPAD comprises:

a second key data; and a second usage property;

decrypting the encrypted information using a second key data portion of the second key data; and modifying the second usage property to indicate that the second key data portion is consumed.

21. The method of claim 20, wherein on the first device, the method further comprises: sending, to the second device, a first device fingerprint with the encrypted information.

22. The method of claim 21, wherein on the second device, the method further comprises: authenticating the first device using the first device fingerprint.

* * * * *